US012299658B2

(12) United States Patent
Finch et al.

(10) Patent No.: US 12,299,658 B2
(45) Date of Patent: *May 13, 2025

(54) SECURE REAL-TIME TRANSACTIONS

(71) Applicant: Early Warning Services, LLC, Scottsdale, AZ (US)

(72) Inventors: Paul Finch, Scottsdale, AZ (US); Lou Anne Alexander, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,076

(22) Filed: Mar. 4, 2024

(65) Prior Publication Data
US 2024/0211913 A1 Jun. 27, 2024

Related U.S. Application Data

(63) Continuation of application No. 17/738,934, filed on May 6, 2022, now Pat. No. 11,922,387, which is a
(Continued)

(51) Int. Cl.
*G06Q 20/20* (2012.01)
*G06Q 20/02* (2012.01)
(Continued)

(52) U.S. Cl.
CPC ........... *G06Q 20/20* (2013.01); *G06Q 20/027* (2013.01); *G06Q 20/206* (2013.01);
(Continued)

(58) Field of Classification Search
None
See application file for complete search history.

(56) References Cited

U.S. PATENT DOCUMENTS

| 2,011,032 A | 8/1935 | Blanchard |
| 5,229,764 A | 7/1993 | Matchett et al. |

(Continued)

FOREIGN PATENT DOCUMENTS

| AU | 4034997 | 3/1998 |
| AU | 1757201 | 5/2001 |

(Continued)

OTHER PUBLICATIONS

Provident Bank, Universal Payment Identification Code (UPIC) guide (Year: 2016). 2016.
(Continued)

*Primary Examiner* — Fateh M Obaid
(74) *Attorney, Agent, or Firm* — BRYAN CAVE LEIGHTON PAISNER LLP

(57) ABSTRACT

A system including one or more processors, a merchant account database including a plurality of merchant identifiers being associated with a plurality of merchants, a plurality of account identifiers associated with the plurality of merchants, and a mapping associating the plurality of merchant identifiers with the plurality of account identifiers, a transaction database and one or more non-transitory computer-readable media storing computing instructions that, when executed by the one or more processors, cause the one or more processors to perform certain operations. The operations can include receiving, at the system and based on a consumer using a mobile device to initiate a payment for one or more items to be purchased from a merchant by the consumer for a payment amount, a message including a merchant identifier of the plurality of merchant identifiers. The operations also can include determining, at the system and using the merchant account database, first information including a second account identifier for a second account of the merchant at the second financial institution. The opera-
(Continued)

tions additionally can include sending the first information from the system to the first financial institution. The operations further can include receiving in real-time over a network, at the system and from the first financial institution, payment information regarding the payment to the second account from a first account of the consumer at the first financial institution to pay the merchant the payment amount for the one or more items. The operations additionally can include logging the payment information in the transaction database. The operations further can include sending in real-time over the network, from the system to the merchant, a notification of the payment from the consumer to the merchant. Other embodiments are described.

20 Claims, 19 Drawing Sheets

Related U.S. Application Data continuation of application No. 16/716,322, filed on Dec. 16, 2019, now Pat. No. 11,386,410, which is a continuation-in-part of application No. 15/873,549, filed on Jan. 17, 2018, now Pat. No. 11,062,290, and a continuation-in-part of application No. 15/873,463, filed on Jan. 17, 2018, now Pat. No. 10,963,856, and a continuation-in-part of application No. 15/873,508, filed on Jan. 17, 2018, now Pat. No. 10,956,888, and a continuation-in-part of application No. 15/873,481, filed on Jan. 17, 2018, now Pat. No. 11,037,121, and a continuation-in-part of application No. 15/873,440, filed on Jan. 17, 2018, now Pat. No. 10,970,695, and a continuation-in-part of application No. 15/873,533, filed on Jan. 17, 2018, now Pat. No. 11,037,122, said application No. 15/873,508 is a continuation-in-part of application No. 15/170,781, filed on Jun. 1, 2016, now Pat. No. 10,762,477, said application No. 15/873,440 is a continuation-in-part of application No. 15/170,781, filed on Jun. 1, 2016, now Pat. No. 10,762,477, said application No. 15/873,481 is a continuation-in-part of application No. 15/170,781, filed on Jun. 1, 2016, now Pat. No. 10,762,477, said application No. 15/873,549 is a continuation-in-part of application No. 15/170,781, filed on Jun. 1, 2016, now Pat. No. 10,762,477, said application No. 15/873,533 is a continuation-in-part of application No. 15/170,781, filed on Jun. 1, 2016, now Pat. No. 10,762,477, said application No. 15/873,463 is a continuation-in-part of application No. 15/170,781, filed on Jun. 1, 2016, now Pat. No. 10,762,477, which is a continuation of application No. 14/805,214, filed on Jul. 21, 2015, now Pat. No. 10,438,175.

(60) Provisional application No. 62/779,987, filed on Dec. 14, 2018.

(51) Int. Cl.
  *G06Q 20/32* (2012.01)
  *G06Q 20/36* (2012.01)
  *G06Q 20/38* (2012.01)

(52) U.S. Cl.
  CPC ....... *G06Q 20/3223* (2013.01); *G06Q 20/363* (2013.01); *G06Q 20/3674* (2013.01); *G06Q 20/38215* (2013.01); *G06Q 20/385* (2013.01)

(56) References Cited

U.S. PATENT DOCUMENTS

| | | |
|---|---|---|
| 5,265,007 A | 11/1993 | Barnhard, Jr. et al. |
| 5,282,249 A | 1/1994 | Cohen et al. |
| 5,283,829 A | 2/1994 | Anderson |
| 5,329,589 A | 7/1994 | Fraser et al. |
| 5,383,113 A * | 1/1995 | Kight ..................... G06Q 20/10 705/40 |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,889,863 A | 3/1999 | Weber |
| 5,899,980 A * | 5/1999 | Wilf ....................... G06Q 20/04 705/16 |
| 5,903,721 A | 5/1999 | Sixtus |
| 5,913,203 A | 6/1999 | Wong et al. |
| 5,915,023 A | 6/1999 | Bernstein |
| 5,920,847 A | 7/1999 | Kolling et al. |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |

(56) References Cited

U.S. PATENT DOCUMENTS

| | | | |
|---|---|---|---|
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 * | 4/2002 | Walker | G06Q 30/06 705/26.81 |
| 6,385,595 B1 | 5/2002 | Kolling et al. |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,891,953 B1 | 5/2005 | DeMello et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith et al. |
| 7,039,951 B1 | 5/2006 | Chaudhari et al. |
| 7,051,001 B1 | 5/2006 | Slater |
| 7,089,208 B1 | 8/2006 | Levchin et al. |
| 7,098,783 B2 | 8/2006 | Crichlow |
| 7,103,261 B2 | 9/2006 | Grecia |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 | 3/2007 | Nosek |
| 7,200,551 B1 | 4/2007 | Senez |
| 7,206,938 B2 | 4/2007 | Bender et al. |
| 7,227,950 B2 | 6/2007 | Faith et al. |
| 7,240,031 B1 | 7/2007 | Kight et al. |
| 7,249,098 B2 | 7/2007 | Milberger et al. |
| 7,254,235 B2 | 8/2007 | Boudreault et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,343,014 B2 | 3/2008 | Sovio et al. |
| 7,349,871 B2 | 3/2008 | Labrou et al. |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |
| 7,475,039 B2 | 1/2009 | Remington et al. |
| 7,475,808 B1 | 1/2009 | Bishop et al. |
| 7,478,066 B2 | 1/2009 | Remington et al. |
| 7,499,887 B2 | 3/2009 | Boyle et al. |
| 7,500,602 B2 | 3/2009 | Gray |
| 7,505,937 B2 | 3/2009 | Dilip et al. |
| 7,519,560 B2 | 4/2009 | Lam et al. |
| 7,526,650 B1 | 4/2009 | Wimmer |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,636,668 B1 | 12/2009 | Alves et al. |
| 7,644,037 B1 | 1/2010 | Ostrovsky |
| 7,653,591 B1 | 1/2010 | Dabney |
| 7,657,497 B2 | 2/2010 | Nandy |
| 7,677,438 B2 | 3/2010 | DeJean et al. |
| 7,685,067 B1 | 3/2010 | Britto et al. |
| 7,689,482 B2 | 3/2010 | Lam et al. |
| 7,693,791 B2 | 4/2010 | Hahn-Carlson et al. |
| 7,702,579 B2 | 4/2010 | Neely et al. |
| 7,707,082 B1 | 4/2010 | Lapstun et al. |
| 7,707,107 B2 | 4/2010 | Gebb et al. |
| 7,711,690 B1 | 5/2010 | Garrison et al. |
| 7,716,127 B2 | 5/2010 | Gebb et al. |
| 7,716,132 B1 | 5/2010 | Spies et al. |
| 7,720,754 B1 | 5/2010 | Gutierrez-Sheris |
| 7,720,756 B2 | 5/2010 | Kavounas |
| 7,734,543 B2 | 6/2010 | Braco |
| 7,752,130 B2 | 7/2010 | Byrd et al. |
| 7,756,785 B2 | 7/2010 | Gebb et al. |
| 7,756,786 B2 | 7/2010 | Trende et al. |
| 7,765,156 B2 | 7/2010 | Staniar et al. |
| 7,769,687 B2 | 8/2010 | Gebb et al. |
| 7,769,998 B2 | 8/2010 | Lynch et al. |
| 7,774,271 B1 | 8/2010 | Edwards et al. |
| 7,778,901 B2 | 8/2010 | Ganesan et al. |
| 7,783,567 B1 | 8/2010 | Kleiman et al. |
| 7,792,749 B2 | 9/2010 | Ganesan |
| 7,809,650 B2 | 10/2010 | Bruesewitz et al. |
| 7,840,520 B2 | 11/2010 | Nandy |
| 7,848,972 B1 | 12/2010 | Sharma |
| 7,856,384 B1 | 12/2010 | Kulasooriya et al. |
| 7,870,070 B2 | 1/2011 | Meier et al. |
| 7,873,573 B2 | 1/2011 | Realini |
| 7,877,325 B2 | 1/2011 | Bishop et al. |
| 7,885,869 B2 | 2/2011 | Uehara et al. |
| 7,899,744 B2 | 3/2011 | Bishop et al. |
| 7,904,385 B2 | 3/2011 | Bishop et al. |
| 7,908,214 B2 | 3/2011 | Bishop et al. |
| 7,925,585 B2 | 4/2011 | Bishop et al. |
| 7,937,312 B1 | 5/2011 | Woolston |
| 7,941,367 B2 | 5/2011 | Bishop et al. |
| 7,941,372 B2 | 5/2011 | Bishop et al. |
| 7,942,321 B2 | 5/2011 | Linton et al. |
| 7,945,491 B2 | 5/2011 | Sharma |
| 7,953,660 B2 | 5/2011 | Ganesan et al. |
| 7,958,030 B2 | 6/2011 | Kemper et al. |
| 7,958,049 B2 | 6/2011 | Jamison et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,970,706 B2 | 6/2011 | Keene |
| 7,979,348 B2 | 7/2011 | Thomas et al. |
| 7,979,349 B2 | 7/2011 | Bishop et al. |
| 7,996,307 B2 | 8/2011 | Bishop et al. |
| 7,996,310 B1 | 8/2011 | Edwards et al. |
| 8,001,612 B1 | 8/2011 | Wieder |
| 8,020,005 B2 | 9/2011 | Mani et al. |
| 8,041,606 B2 | 10/2011 | Mascavage, III et al. |
| 8,050,997 B1 | 11/2011 | Nosek et al. |
| 8,060,389 B2 | 11/2011 | Johnson |
| 8,069,115 B2 | 11/2011 | Schoenberg et al. |
| 8,073,772 B2 | 12/2011 | Bishop et al. |
| 8,073,773 B2 | 12/2011 | Kozee et al. |
| 8,086,497 B1 | 12/2011 | Oakes, III |

(56) References Cited

U.S. PATENT DOCUMENTS

| | | | |
|---|---|---|---|
| 8,103,584 B2 | 1/2012 | Bishop et al. |
| 8,103,585 B2 | 1/2012 | Bishop et al. |
| 8,109,435 B2 | 2/2012 | Mayo et al. |
| 8,112,354 B2 | 2/2012 | Lalwani |
| 8,121,894 B2 | 2/2012 | Mason |
| 8,121,945 B2 | 2/2012 | Rackley et al. |
| 8,123,124 B2 | 2/2012 | Salazar et al. |
| 8,126,793 B2 | 2/2012 | Jones |
| 8,165,934 B2 | 4/2012 | Manista et al. |
| 8,165,958 B1 | 4/2012 | McLaughlin et al. |
| 8,170,055 B2 * | 5/2012 | Fang ................ H04M 15/00 370/466 |
| 8,180,706 B2 | 5/2012 | Bishop et al. |
| 8,190,514 B2 | 5/2012 | Bishop et al. |
| 8,195,565 B2 | 6/2012 | Bishop et al. |
| 8,229,850 B2 | 7/2012 | Dilip et al. |
| 8,234,212 B2 | 7/2012 | Bishop et al. |
| 8,244,609 B2 | 8/2012 | Prakash et al. |
| 8,249,965 B2 | 8/2012 | Tumminaro |
| 8,249,983 B2 | 8/2012 | Dilip et al. |
| 8,255,278 B1 | 8/2012 | Young et al. |
| 8,255,327 B2 | 8/2012 | Kemper et al. |
| 8,255,336 B2 | 8/2012 | Dilip et al. |
| 8,266,028 B2 | 9/2012 | Bulman et al. |
| 8,266,065 B2 | 9/2012 | Dilip et al. |
| 8,275,704 B2 | 9/2012 | Bishop et al. |
| 8,290,835 B2 | 10/2012 | Homer et al. |
| 8,290,862 B2 | 10/2012 | Sheehan et al. |
| 8,290,863 B2 | 10/2012 | Sheehan et al. |
| 8,290,865 B2 | 10/2012 | Lawrence |
| 8,311,913 B2 | 11/2012 | Marchetti et al. |
| 8,311,914 B2 | 11/2012 | Marchetti et al. |
| 8,311,937 B2 | 11/2012 | Marchetti et al. |
| 8,311,942 B1 | 11/2012 | Mason |
| 8,321,341 B2 | 11/2012 | Nandy |
| 8,310,346 B2 | 12/2012 | Burbridge et al. |
| 8,341,046 B2 | 12/2012 | Marchetti et al. |
| 8,342,407 B2 | 1/2013 | Williams et al. |
| 8,352,365 B1 | 1/2013 | Goldberg et al. |
| 8,370,639 B2 | 2/2013 | Azar et al. |
| 8,374,932 B2 | 2/2013 | Marchetti et al. |
| 8,380,177 B2 | 2/2013 | Laracey |
| 8,380,591 B1 | 2/2013 | Kazenas et al. |
| 8,380,622 B2 | 2/2013 | Bushman et al. |
| 8,401,939 B2 | 3/2013 | Lam et al. |
| 8,402,555 B2 | 3/2013 | Grecia |
| 8,407,124 B2 | 3/2013 | Uehara et al. |
| 8,407,141 B2 | 3/2013 | Mullen et al. |
| 8,417,628 B2 | 4/2013 | Poplawski et al. |
| 8,423,460 B2 | 4/2013 | Kay et al. |
| 8,433,629 B2 | 4/2013 | Murtaugh et al. |
| 8,458,086 B2 | 6/2013 | Bishop et al. |
| 8,458,774 B2 | 6/2013 | Ganesan |
| 8,467,766 B2 | 6/2013 | Rackley et al. |
| 8,484,104 B1 | 7/2013 | Hurlbutt et al. |
| 8,498,914 B2 | 7/2013 | Hazelhurst |
| 8,521,657 B2 | 8/2013 | Kuebert et al. |
| 8,527,413 B2 | 9/2013 | Heller |
| 8,532,021 B2 | 9/2013 | Tumminaro |
| 8,533,079 B2 | 9/2013 | Sharma |
| 8,533,860 B1 | 9/2013 | Grecia |
| 8,549,601 B2 | 10/2013 | Ganesan |
| 8,560,417 B2 | 10/2013 | Mullen et al. |
| 8,596,527 B2 | 12/2013 | Bishop et al. |
| 8,606,640 B2 | 12/2013 | Brody et al. |
| 8,615,457 B2 | 12/2013 | Mullen et al. |
| 8,634,559 B2 | 1/2014 | Brown et al. |
| 8,646,685 B2 | 2/2014 | Bishop et al. |
| 8,666,865 B2 | 3/2014 | Mullen et al. |
| 8,706,641 B2 | 4/2014 | Bruesewitz et al. |
| 8,713,325 B2 | 4/2014 | Ganesan |
| 8,719,905 B2 | 5/2014 | Ganesan |
| 8,738,526 B2 | 5/2014 | Nosek et al. |
| 8,745,699 B2 | 6/2014 | Ganesan |
| 8,751,347 B2 | 6/2014 | Mullen et al. |
| 8,751,381 B2 | 6/2014 | Musser et al. |
| 8,768,838 B1 | 7/2014 | Hoffman |
| 8,769,784 B2 | 7/2014 | Ganesan et al. |
| 8,775,306 B2 | 7/2014 | Nosek et al. |
| 8,788,389 B1 | 7/2014 | Fernandes |
| 8,789,153 B2 | 7/2014 | Ganesan |
| 8,794,509 B2 | 8/2014 | Bishop et al. |
| 8,806,592 B2 | 8/2014 | Ganesan |
| 8,814,039 B2 | 8/2014 | Bishop et al. |
| 8,820,633 B2 | 9/2014 | Bishop et al. |
| 8,887,247 B2 | 11/2014 | Ganesan |
| 8,887,308 B2 | 11/2014 | Grecia |
| 8,893,237 B2 | 11/2014 | Ganesan |
| 8,938,787 B2 | 1/2015 | Turgeman |
| 9,392,008 B1 | 7/2016 | Michel et al. |
| D769,296 S | 10/2016 | Grecia |
| 9,626,664 B2 | 4/2017 | Bouey et al. |
| 9,691,056 B2 | 6/2017 | Bouey et al. |
| 9,928,490 B1 * | 3/2018 | Vancini ................ G06Q 20/10 |
| 9,965,760 B2 | 5/2018 | Leber |
| 10,049,349 B1 * | 8/2018 | Grassadonia .......... G06Q 20/40 |
| 10,078,821 B2 | 9/2018 | Bouey et al. |
| 10,318,936 B2 | 6/2019 | Muthu et al. |
| D857,054 S | 8/2019 | Grecia |
| D857,712 S | 8/2019 | Grecia |
| 10,395,223 B2 | 8/2019 | Muthu et al. |
| 10,395,247 B2 | 8/2019 | Gilliam et al. |
| 10,410,217 B1 | 9/2019 | Duke et al. |
| 10,607,217 B2 | 3/2020 | Anderson |
| 10,755,282 B1 | 8/2020 | Duke et al. |
| 11,010,766 B1 | 5/2021 | Duke et al. |
| 11,037,167 B1 | 6/2021 | Duke et al. |
| 11,042,877 B2 | 6/2021 | Wolfs et al. |
| 11,055,722 B1 | 7/2021 | Duke et al. |
| 11,151,522 B2 | 10/2021 | Bartrim et al. |
| 11,151,523 B2 | 10/2021 | Bartrim et al. |
| 11,157,884 B2 | 10/2021 | Bartrim et al. |
| 11,282,074 B2 | 3/2022 | Kassemi |
| 11,295,283 B1 | 4/2022 | Hecht |
| 11,373,182 B2 | 6/2022 | Gilliam et al. |
| 11,979,370 B2 * | 5/2024 | McDonald ............. G06F 21/52 |
| 2002/0007320 A1 | 1/2002 | Hogan et al. |
| 2002/0013768 A1 * | 1/2002 | Ganesan ............ G06Q 20/102 705/40 |
| 2002/0023054 A1 * | 2/2002 | Gillespie ............. G06Q 20/12 705/39 |
| 2002/0029193 A1 * | 3/2002 | Ranjan ................ G06Q 30/06 705/38 |
| 2002/0046185 A1 * | 4/2002 | Villart ................ G06Q 30/06 705/64 |
| 2002/0052852 A1 * | 5/2002 | Bozeman ............. G06Q 20/24 705/64 |
| 2002/0091635 A1 | 7/2002 | Dilip et al. |
| 2002/0128932 A1 | 9/2002 | Yung et al. |
| 2002/0143634 A1 | 10/2002 | Kumar et al. |
| 2002/0194119 A1 | 12/2002 | Wright et al. |
| 2002/0194503 A1 | 12/2002 | Faith et al. |
| 2003/0014316 A1 | 1/2003 | Jaalinoja et al. |
| 2003/0078884 A1 | 4/2003 | Bauman |
| 2003/0097331 A1 | 5/2003 | Cohen |
| 2003/0115151 A1 | 6/2003 | Wheeler et al. |
| 2003/0126094 A1 | 7/2003 | Fisher et al. |
| 2003/0130919 A1 | 7/2003 | Templeton et al. |
| 2003/0216996 A1 | 11/2003 | Cummings et al. |
| 2003/0220875 A1 | 11/2003 | Lam et al. |
| 2003/0220876 A1 | 11/2003 | Burger et al. |
| 2003/0236728 A1 | 12/2003 | Sunderji et al. |
| 2004/0030645 A1 | 2/2004 | Monaghan |
| 2004/0034594 A1 | 2/2004 | Thomas et al. |
| 2004/0089711 A1 | 5/2004 | Sandru |
| 2004/0138955 A1 | 7/2004 | Song et al. |
| 2004/0139014 A1 | 7/2004 | Song et al. |
| 2004/0158522 A1 | 8/2004 | Brown et al. |
| 2004/0193522 A1 | 9/2004 | Binet et al. |
| 2004/0230489 A1 | 11/2004 | Goldthwaite et al. |
| 2004/0259626 A1 | 12/2004 | Akram et al. |
| 2005/0008148 A1 | 1/2005 | Jacobson |
| 2005/0010523 A1 | 1/2005 | Myklebust et al. |
| 2005/0010786 A1 | 1/2005 | Michener et al. |

(56) References Cited

U.S. PATENT DOCUMENTS

| | | |
|---|---|---|
| 2005/0069135 A1 | 3/2005 | Brickell |
| 2005/0071283 A1 | 3/2005 | Randle et al. |
| 2005/0080716 A1 | 4/2005 | Belyi et al. |
| 2005/0125347 A1 | 6/2005 | Akialis et al. |
| 2005/0137948 A1 | 6/2005 | Kissner et al. |
| 2005/0149455 A1* | 7/2005 | Bruesewitz ............ G06Q 20/40 705/64 |
| 2005/0187873 A1 | 8/2005 | Labrou |
| 2005/0246292 A1 | 11/2005 | Sarcanin |
| 2005/0273842 A1 | 12/2005 | Wright et al. |
| 2005/0274793 A1 | 12/2005 | Cantini et al. |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0022048 A1 | 2/2006 | Johnson |
| 2006/0080243 A1 | 4/2006 | Kemper et al. |
| 2006/0080727 A1 | 4/2006 | Hammons et al. |
| 2006/0085314 A1 | 4/2006 | Grim et al. |
| 2006/0085357 A1 | 4/2006 | Pizarro |
| 2006/0106717 A1 | 5/2006 | Randle et al. |
| 2006/0116949 A1 | 6/2006 | Wehunt et al. |
| 2006/0116960 A1 | 6/2006 | Gillin et al. |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0224470 A1 | 10/2006 | Ruano et al. |
| 2006/0280339 A1 | 12/2006 | Cho |
| 2006/0282381 A1 | 12/2006 | Ritchie |
| 2006/0287004 A1 | 12/2006 | Fuqua |
| 2006/0287963 A1 | 12/2006 | Steeves et al. |
| 2007/0012757 A1 | 1/2007 | Mayo et al. |
| 2007/0046456 A1 | 3/2007 | Edwards et al. |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0168281 A1 | 7/2007 | Bishop et al. |
| 2007/0174189 A1 | 7/2007 | Bishop et al. |
| 2007/0179885 A1 | 8/2007 | Bird et al. |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0203821 A1 | 8/2007 | DuFour |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0040171 A1 | 2/2008 | Albers |
| 2008/0046362 A1 | 2/2008 | Easterly |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0091596 A1 | 4/2008 | Labaton |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0120129 A1 | 5/2008 | Seubert et al. |
| 2008/0127319 A1 | 5/2008 | Galloway et al. |
| 2008/0140564 A1 | 6/2008 | Tal et al. |
| 2008/0141033 A1 | 6/2008 | Ginter et al. |
| 2008/0147536 A1 | 6/2008 | Breen |
| 2008/0167962 A1 | 7/2008 | Lawe |
| 2008/0177661 A1 | 7/2008 | Mehra |
| 2008/0189209 A1 | 8/2008 | Loomis et al. |
| 2008/0208737 A1 | 8/2008 | Dilip et al. |
| 2008/0208743 A1 | 8/2008 | Arthur et al. |
| 2008/0210751 A1 | 9/2008 | Kim |
| 2008/0210752 A1 | 9/2008 | March |
| 2008/0222048 A1 | 9/2008 | Higgins et al. |
| 2008/0227471 A1 | 9/2008 | Dankar et al. |
| 2008/0238610 A1 | 10/2008 | Rosenberg |
| 2008/0242274 A1 | 10/2008 | Swanburg et al. |
| 2008/0244271 A1 | 10/2008 | Yu |
| 2008/0244277 A1 | 10/2008 | Orsini et al. |
| 2008/0249936 A1 | 10/2008 | Miller et al. |
| 2008/0249937 A1 | 10/2008 | Walls |
| 2008/0255993 A1 | 10/2008 | Blinbaum |
| 2008/0294563 A1 | 11/2008 | Boutahar et al. |
| 2008/0306872 A1 | 12/2008 | Felsher |
| 2008/0319887 A1 | 12/2008 | Pizzi et al. |
| 2009/0006861 A1 | 1/2009 | Bemmel |
| 2009/0006920 A1 | 1/2009 | Munson et al. |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0048971 A1 | 2/2009 | Hathaway et al. |
| 2009/0068982 A1 | 3/2009 | Chen et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0089193 A1 | 4/2009 | Paintin |
| 2009/0089205 A1 | 4/2009 | Bayne |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0125446 A1 | 5/2009 | Saunders et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0192873 A1 | 7/2009 | Marble |
| 2009/0204457 A1 | 8/2009 | Buhrmann et al. |
| 2009/0204815 A1 | 8/2009 | Dennis et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |

(56) References Cited

U.S. PATENT DOCUMENTS

| | | | |
|---|---|---|---|
| 2009/0271277 A1* | 10/2009 | Bishop | G06Q 40/00 705/21 |
| 2009/0271278 A1 | 10/2009 | Bishop et al. | |
| 2009/0271303 A1 | 10/2009 | Wang et al. | |
| 2009/0282259 A1 | 11/2009 | Skorik et al. | |
| 2009/0287564 A1 | 11/2009 | Bishop et al. | |
| 2009/0287565 A1 | 11/2009 | Bishop et al. | |
| 2009/0287601 A1 | 11/2009 | Tumminaro et al. | |
| 2009/0289106 A1 | 11/2009 | Bishop et al. | |
| 2009/0299841 A1 | 12/2009 | Bishop et al. | |
| 2009/0307072 A1* | 12/2009 | Morales-Lema | G06Q 30/02 705/14.23 |
| 2009/0319425 A1 | 12/2009 | Tumminaro et al. | |
| 2009/0327133 A1 | 12/2009 | Aharoni et al. | |
| 2010/0030687 A1 | 2/2010 | Panthaki et al. | |
| 2010/0031022 A1 | 2/2010 | Kramer | |
| 2010/0042537 A1 | 2/2010 | Smith et al. | |
| 2010/0042539 A1 | 2/2010 | Dheer et al. | |
| 2010/0057622 A1 | 3/2010 | Faith et al. | |
| 2010/0063935 A1 | 3/2010 | Thomas et al. | |
| 2010/0070405 A1 | 3/2010 | Joa | |
| 2010/0094765 A1 | 4/2010 | Nandy | |
| 2010/0100480 A1 | 4/2010 | Altman et al. | |
| 2010/0115610 A1 | 5/2010 | Tredoux et al. | |
| 2010/0127822 A1 | 5/2010 | Devadas | |
| 2010/0131415 A1 | 5/2010 | Sartipi | |
| 2010/0138243 A1 | 6/2010 | Carroll | |
| 2010/0161736 A1 | 6/2010 | Picknelly | |
| 2010/0198645 A1 | 8/2010 | Heiss et al. | |
| 2010/0198729 A1 | 8/2010 | Kavounas | |
| 2010/0269166 A1 | 10/2010 | Awad et al. | |
| 2010/0274729 A1 | 10/2010 | Holm et al. | |
| 2010/0293090 A1 | 11/2010 | Domenikos et al. | |
| 2010/0306107 A1 | 12/2010 | Nahari | |
| 2010/0320266 A1 | 12/2010 | White | |
| 2011/0055078 A1 | 3/2011 | Nandy | |
| 2011/0055083 A1 | 3/2011 | Grinhute | |
| 2011/0066523 A1 | 3/2011 | Harrison | |
| 2011/0066551 A1 | 3/2011 | Bruesewitz et al. | |
| 2011/0078078 A1 | 3/2011 | Meier et al. | |
| 2011/0110508 A1 | 5/2011 | LaFreniere et al. | |
| 2011/0112945 A1 | 5/2011 | Cullen, III et al. | |
| 2011/0112954 A1 | 5/2011 | Bruesewitz et al. | |
| 2011/0131130 A1 | 6/2011 | Griffin et al. | |
| 2011/0145149 A1 | 6/2011 | Valdes et al. | |
| 2011/0161233 A1 | 6/2011 | Tieken | |
| 2011/0173116 A1 | 7/2011 | Yan et al. | |
| 2011/0173122 A1 | 7/2011 | Singhal | |
| 2011/0184868 A1 | 7/2011 | Lacerte et al. | |
| 2011/0191160 A1 | 8/2011 | Blackhurst et al. | |
| 2011/0196782 A1 | 8/2011 | Allen et al. | |
| 2011/0202407 A1 | 8/2011 | Buhrmann et al. | |
| 2011/0202415 A1 | 8/2011 | Casares | |
| 2011/0202982 A1 | 8/2011 | Alexander et al. | |
| 2011/0247058 A1 | 10/2011 | Kisters | |
| 2011/0251869 A1 | 10/2011 | Shekhter | |
| 2011/0251952 A1 | 10/2011 | Kelly et al. | |
| 2011/0258111 A1 | 10/2011 | Raj et al. | |
| 2011/0264543 A1 | 10/2011 | Taveau et al. | |
| 2011/0264583 A1 | 10/2011 | Cooper et al. | |
| 2011/0270749 A1 | 11/2011 | Bennett et al. | |
| 2011/0270756 A1 | 11/2011 | Tulllis et al. | |
| 2011/0276473 A1 | 11/2011 | Blok | |
| 2011/0276479 A1 | 11/2011 | Thomas | |
| 2011/0282778 A1 | 11/2011 | Wright et al. | |
| 2011/0295746 A1 | 12/2011 | Thomas et al. | |
| 2011/0313921 A1 | 12/2011 | Dheer et al. | |
| 2011/0320347 A1 | 12/2011 | Tumminaro et al. | |
| 2012/0005749 A1 | 1/2012 | Zoldi et al. | |
| 2012/0016731 A1 | 1/2012 | Smith et al. | |
| 2012/0018511 A1 | 1/2012 | Hammad | |
| 2012/0041876 A1 | 2/2012 | Nosek et al. | |
| 2012/0066121 A1 | 3/2012 | Shahbazi et al. | |
| 2012/0084201 A1 | 4/2012 | Ostrovsky | |
| 2012/0095912 A1 | 4/2012 | James et al. | |
| 2012/0109802 A1 | 5/2012 | Griffin et al. | |
| 2012/0116953 A1 | 5/2012 | Klein et al. | |
| 2012/0130898 A1 | 5/2012 | Snyder et al. | |
| 2012/0173409 A1 | 7/2012 | Hu | |
| 2012/0173417 A1 | 7/2012 | Lohman et al. | |
| 2012/0203695 A1 | 8/2012 | Morgan et al. | |
| 2012/0209766 A1 | 8/2012 | Kitchen et al. | |
| 2012/0215688 A1 | 8/2012 | Musser | |
| 2012/0231814 A1 | 9/2012 | Calman et al. | |
| 2012/0260322 A1 | 10/2012 | Logan | |
| 2012/0265687 A1 | 10/2012 | Dilip et al. | |
| 2012/0278239 A1 | 11/2012 | Nosek et al. | |
| 2012/0284154 A1 | 11/2012 | Creighton et al. | |
| 2012/0284175 A1 | 11/2012 | Wilson et al. | |
| 2012/0290453 A1 | 11/2012 | Manista et al. | |
| 2013/0018791 A1 | 1/2013 | Mendocino et al. | |
| 2013/0018793 A1 | 1/2013 | Wong et al. | |
| 2013/0024360 A1 | 1/2013 | Ballout | |
| 2013/0036000 A1 | 2/2013 | Giordano et al. | |
| 2013/0036048 A1 | 2/2013 | Campos et al. | |
| 2013/0054452 A1 | 2/2013 | Au et al. | |
| 2013/0060708 A1 | 3/2013 | Oskolkov et al. | |
| 2013/0073455 A1 | 3/2013 | McLaughlin et al. | |
| 2013/0073462 A1 | 3/2013 | Zanzot et al. | |
| 2013/0080333 A1 | 3/2013 | Kamotskyy et al. | |
| 2013/0080368 A1 | 3/2013 | Nandy | |
| 2013/0085936 A1 | 4/2013 | Law et al. | |
| 2013/0097078 A1 | 4/2013 | Wong et al. | |
| 2013/0103576 A1 | 4/2013 | Ackley | |
| 2013/0110658 A1 | 5/2013 | Lyman et al. | |
| 2013/0110678 A1 | 5/2013 | Vigier et al. | |
| 2013/0110724 A1 | 5/2013 | Edwards | |
| 2013/0117178 A1 | 5/2013 | Mullen et al. | |
| 2013/0124364 A1 | 5/2013 | Mittal | |
| 2013/0124405 A1 | 5/2013 | Hamzeh | |
| 2013/0124406 A1 | 5/2013 | Poplawski et al. | |
| 2013/0138557 A1 | 5/2013 | Mullen et al. | |
| 2013/0151384 A1 | 6/2013 | Mullen et al. | |
| 2013/0159070 A1 | 6/2013 | Salamone | |
| 2013/0179281 A1 | 7/2013 | White et al. | |
| 2013/0179352 A1 | 7/2013 | Dwyre et al. | |
| 2013/0185214 A1 | 7/2013 | Azen et al. | |
| 2013/0197998 A1 | 8/2013 | Buhrmann et al. | |
| 2013/0212010 A1 | 8/2013 | Mullen et al. | |
| 2013/0226627 A1 | 8/2013 | Kubovcik et al. | |
| 2013/0226801 A1 | 8/2013 | Lyons et al. | |
| 2013/0232071 A1 | 9/2013 | Dilip et al. | |
| 2013/0232075 A1 | 9/2013 | Monaghan et al. | |
| 2013/0238488 A1 | 9/2013 | Bouey et al. | |
| 2013/0238489 A1 | 9/2013 | Bouey et al. | |
| 2013/0238490 A1 | 9/2013 | Bouey et al. | |
| 2013/0238491 A1 | 9/2013 | Bouey et al. | |
| 2013/0238492 A1 | 9/2013 | Muthu et al. | |
| 2013/0246280 A1 | 9/2013 | Kirsch | |
| 2013/0262296 A1 | 10/2013 | Thomas et al. | |
| 2013/0262311 A1 | 10/2013 | Buhrmann et al. | |
| 2013/0268839 A1 | 10/2013 | Lefebvre et al. | |
| 2013/0282588 A1 | 10/2013 | Hruska | |
| 2013/0293363 A1 | 11/2013 | Plymouth | |
| 2013/0297501 A1 | 11/2013 | Monk | |
| 2014/0006184 A1 | 1/2014 | Godsey | |
| 2014/0006281 A1 | 1/2014 | Leber | |
| 2014/0040069 A1 | 2/2014 | Tomasofsky et al. | |
| 2014/0046820 A1 | 2/2014 | Sunderji et al. | |
| 2014/0058862 A1 | 2/2014 | Celkonas | |
| 2014/0059693 A1 | 2/2014 | Stecher | |
| 2014/0067677 A1 | 3/2014 | Ali et al. | |
| 2014/0081783 A1 | 3/2014 | Paranjape et al. | |
| 2014/0114838 A1 | 4/2014 | Nunes | |
| 2014/0164246 A1 | 6/2014 | Thomas et al. | |
| 2014/0187205 A1 | 7/2014 | Dankar et al. | |
| 2014/0188586 A1 | 7/2014 | Carpenter et al. | |
| 2014/0188697 A1 | 7/2014 | Bruesewitz et al. | |
| 2014/0188728 A1 | 7/2014 | Dheer et al. | |
| 2014/0195425 A1 | 7/2014 | Campos et al. | |
| 2014/0244493 A1 | 8/2014 | Kenyon et al. | |
| 2014/0244515 A1 | 8/2014 | Garfinkle et al. | |
| 2014/0310142 A1 | 10/2014 | Mak | |
| 2014/0337230 A1 | 11/2014 | Bacastow | |

(56) References Cited

U.S. PATENT DOCUMENTS

| | | |
|---|---|---|
| 2014/0351137 A1 | 11/2014 | Chisholm |
| 2014/0365350 A1 | 12/2014 | Shvarts |
| 2014/0372308 A1 | 12/2014 | Sheets |
| 2015/0026061 A1 | 1/2015 | Siegel et al. |
| 2015/0039498 A1 | 2/2015 | Weiss |
| 2015/0046181 A1* | 2/2015 | Adjaoute ............ G06Q 10/10 705/2 |
| 2015/0046216 A1 | 2/2015 | Adjaoute |
| 2015/0046224 A1* | 2/2015 | Adjaoute ......... G06Q 30/0202 705/7.31 |
| 2015/0066738 A1 | 3/2015 | Tian et al. |
| 2015/0066765 A1 | 3/2015 | Banks et al. |
| 2015/0073975 A1 | 3/2015 | Bornhofen et al. |
| 2015/0073977 A1 | 3/2015 | Ghosh et al. |
| 2015/0081324 A1 | 3/2015 | Adjaoute |
| 2015/0089568 A1 | 3/2015 | Sprague et al. |
| 2015/0112866 A1 | 4/2015 | Muthu et al. |
| 2015/0150110 A1 | 5/2015 | Canning |
| 2015/0186994 A1* | 7/2015 | He ..................... G06Q 40/02 705/44 |
| 2015/0193776 A1 | 7/2015 | Douglas et al. |
| 2015/0332273 A1 | 11/2015 | Bruno |
| 2015/0348030 A1 | 12/2015 | Cauwenberghs et al. |
| 2015/0363783 A1 | 12/2015 | Ronca |
| 2016/0034932 A1 | 2/2016 | Sion et al. |
| 2016/0078443 A1 | 3/2016 | Tomasofsky et al. |
| 2016/0078444 A1 | 3/2016 | Tomasofsky et al. |
| 2016/0092872 A1 | 3/2016 | Prakash et al. |
| 2016/0104133 A1 | 4/2016 | Davis et al. |
| 2016/0140538 A1 | 5/2016 | Einhorn |
| 2016/0188317 A1 | 6/2016 | Hilliar et al. |
| 2016/0203490 A1 | 7/2016 | Gupta et al. |
| 2016/0253663 A1 | 9/2016 | Clark |
| 2016/0267280 A1 | 9/2016 | Mansour et al. |
| 2016/0283918 A1 | 9/2016 | Weinflash |
| 2016/0300206 A1 | 10/2016 | Novac et al. |
| 2016/0300207 A1 | 10/2016 | Novac et al. |
| 2016/0300225 A1 | 10/2016 | Novac et al. |
| 2016/0300226 A1 | 10/2016 | Novac et al. |
| 2016/0321625 A1* | 11/2016 | Gilliam, III ......... G06Q 20/10 |
| 2016/0343043 A1 | 11/2016 | Hicks et al. |
| 2016/0358140 A1 | 12/2016 | Pigg et al. |
| 2017/0024719 A1 | 1/2017 | Finch et al. |
| 2017/0024744 A1* | 1/2017 | Finch ............... G06Q 20/401 |
| 2017/0024828 A1 | 1/2017 | Michel et al. |
| 2017/0039534 A1 | 2/2017 | Smythe |
| 2017/0103399 A1* | 4/2017 | Napsky ............. G06Q 20/3226 |
| 2017/0140374 A1 | 5/2017 | O'Brien |
| 2017/0200155 A1 | 7/2017 | Fourez et al. |
| 2017/0221056 A1 | 8/2017 | Karpenko et al. |
| 2017/0221066 A1 | 8/2017 | Ledford et al. |
| 2017/0344960 A1 | 11/2017 | Garlick et al. |
| 2017/0344964 A1 | 11/2017 | Garlick et al. |
| 2017/0344983 A1 | 11/2017 | Muftic |
| 2018/0046994 A1 | 2/2018 | Maenpaa et al. |
| 2018/0181962 A1 | 6/2018 | Barnhardt et al. |
| 2019/0012647 A1 | 1/2019 | Bouey et al. |
| 2019/0034930 A1 | 1/2019 | Wolfs et al. |
| 2019/0043052 A1 | 2/2019 | Ledford et al. |
| 2019/0066109 A1 | 2/2019 | Jia et al. |
| 2019/0095919 A1 | 3/2019 | Legault et al. |
| 2019/0318354 A1* | 10/2019 | Weinflash ............ G06Q 20/14 |
| 2019/0340590 A1 | 11/2019 | Davey et al. |
| 2019/0340607 A1 | 11/2019 | Lynn |
| 2019/0394041 A1 | 12/2019 | Jain et al. |
| 2020/0118089 A1 | 4/2020 | Bartrim et al. |
| 2020/0118090 A1 | 4/2020 | Bartrim et al. |
| 2020/0118091 A1 | 4/2020 | Bartrim et al. |
| 2020/0211028 A1 | 7/2020 | Uju |
| 2020/0302433 A1 | 9/2020 | Green |
| 2020/0356997 A1 | 11/2020 | Barnhardt et al. |
| 2020/0364720 A1 | 11/2020 | Lally et al. |
| 2021/0056196 A1 | 2/2021 | Jain et al. |
| 2021/0141888 A1 | 5/2021 | Hires |
| 2021/0374748 A1 | 12/2021 | Wolfs et al. |
| 2021/0398113 A1 | 12/2021 | Bernert et al. |
| 2022/0129902 A1 | 4/2022 | Edwards et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 865010 | 9/1998 |
| EP | 820620 | 3/1999 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | H11265413 | 9/1999 |
| JP | 2000311209 | 11/2000 |
| JP | 2002049872 | 2/2002 |
| JP | 2002298041 | 10/2002 |
| JP | 2003308437 | 10/2003 |
| JP | 2004192437 | 7/2004 |
| JP | 2004532448 | 10/2004 |
| JP | 2005512173 | 4/2005 |
| JP | 2006285329 | 10/2006 |
| JP | 2007128192 | 5/2007 |
| JP | 2008102914 | 5/2008 |
| JP | 2008262601 | 10/2008 |
| JP | 2014132474 | 7/2014 |
| KR | 1020120075590 | 7/2012 |
| KR | 1020140099676 | 8/2014 |
| KR | 101457750 B1 | 11/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 2001033522 | 5/2001 |
| WO | 2001055984 | 8/2001 |
| WO | 2001067364 | 9/2001 |
| WO | 2002025534 | 3/2002 |
| WO | 2002025605 | 3/2002 |
| WO | 2002035429 | 5/2002 |

(56) References Cited

FOREIGN PATENT DOCUMENTS

| | | |
|---|---|---|
| WO | 2002069561 | 9/2002 |
| WO | 2002073483 | 9/2002 |
| WO | 2003091849 | 11/2003 |
| WO | 2004099910 | 11/2004 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010039101 | 4/2010 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2012151660 A1 | 11/2012 |
| WO | 2013076436 A1 | 5/2013 |
| WO | 2015154119 | 10/2015 |
| WO | 2017011596 | 1/2017 |
| WO | 2017014815 | 1/2017 |

OTHER PUBLICATIONS

Gajek, Sebastian, et al., "TruWallet: Trustworthy and Migratable Wallet-Based Web Authentication," Proceedings of the 2009 ACM Workshop on Scalable Trusted Computing, 2009, (year: 2009). 2009.
Hosseini, Z.Z. and Barkhordari, E., "Enhancement of Security with the Help of Real Time Authentication and One Time Password in e-Commerce Transactions," The 5th Conference on Information and Knowledge TEchnology, SHiraz, Iran, 2013, pp. 268-273 2013.
International Search Report for PCT/US2016/042163, dated Sep. 26, 2016. 2016.
International Search Report and Written Opinion for PCT/US2016/026000, dated Jul. 13, 2016. Jul. 13, 2016.
International Search Report and Written Opinion for PCT/US11/33828, dated Jul. 12, 2011, 11 pages. Jul. 12, 2011.
International Search Report for PCT/US10/36231, dated Nov. 8, 2010, 8 pages. Nov. 8, 2010.
International Search Report for PCT/US10/36233, dated Jul. 28, 2010, 7 pages. Jul. 28, 2010.
International Search Report for PCT/US10/36229, dated Jul. 28, 2010, 12 pages. Jul. 28, 2010.
International Search Report for PCT/US10/35465, dated Jul. 13, 2010, 7 pages. Jul. 13, 2010.
International Search Report for PCT/US09/48490, dated Jul. 31, 2009, 1 page. Jul. 31, 2009.
"Greg's diary", Aug. 2009, available at http://www.lemis.com/grog/diary-aug2009.php?dirdate=20090807&imagesizes=11111111111111111113#Photo-19 Aug. 1, 2009.
Trusted Computing Platform Alliance (TCPA), Main Specification Version 1. 1b, Published by the Trusted Computing Group, 2003, 332 pages Jan. 1, 2003.
Benson, Carol Coye, "Faster, Better, Cheaper—Like it or Not," http://paymentsviews.com/2013/03/13/faster-better-cheaper-like-it-or-not/, Mar. 13, 2013. Mar. 13, 2013.

Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015]. 2015.
Gayle C. Avery, Ellen Baker; Reframing the Infomated Household—Workplace; Information & Organization, 2002, vol. 12, Aug. 2001. 2001.
Mark Bernkopf; Electronic Cash and Monetary Policy; First Monday, vol. 1, No. 1-6, May 1996. 1996.
Electronic Payment Systems In European Countries; Country Synthesis Report; Böhle, Rader, Riehm, Institut far Technikfolgenabschatzung and Systemanalyse for the European Science and Technology Observatory Network (ESTO); Final Version, Sep. 1999. 1999.
Mark E. Budnitz; Electronic Money in the 1990s: A Net Benefit or Merely a Trade-Off ?; 9 Ga. St. U. L. Rev. 747, 1992-1993. 1993.
Chida, Mambo, Shizuya; Digital Money—A Survey; Revised Aug. 21, 2001; Interdisciplinary Information Sciences. vol. 7, No. 2, pp. 135-165 (2001). 2001.
Harold L. Frohman, William R. Ledder; Defense Transportation's EDI Program: A Security Risk Assessment; PL205LN5; Logistics Management Institute; May 1993. 1993.
Aryya Gangopadhyay; Managing Business with Electronic Commerce: Issues & Trends; Idea Group Publishing (2002). 2002.
Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002. 2002.
Lorin M. Hitt and Frances X. Frei; Do Better Customers Utilize Electronic Distribution Channels? The Case of PC Banking; Dec. 2001. 2001.
Eun Kim, Petra Schubert, Dorian Seltz and Bumtae Kim; The EBMG Reference Model on Electronic Markets: The Korean Case of JODAL (2007). 2007.
Glenbrook Partners; PayPal in the Air!—A look at PayPal Mobile; Payment News; Glenbrook eCommerce Market Analysis Reports (2006). 2006.
Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006. 2006.
John R. Palumbo; Naval Postgraduate School, Monterey, California; Thesis, Financial Transaction Mechanisms for World Wide Web Applications, Mar. 1996. 1996.
Hua-Fu Pao; Naval Postgraduate School, Monterey, California; Thesis, Security Management of Electronic Data Interchange; Jun. 1993. 1993.
Tobern P. Pedersen; Electronic Payments of Small Amounts; Aarhus University (1998). 1998.
Eveline Franco Veloso; The Business Revolution through B2B Market Tone and its Impacts over the Financial System gong into 21st Century; The Institute of Brazilian Business and Management Issues; XII Minerva Program—Fall 2000, 2000. 2000.
Alladi Venkatesh and Nicholas Vitalari; Households and Technology: The Case of Home Computers—Some Conceptual and Theoretical Issues; originally appeared in M.L. Roberts and L. Wortzel (eds.) Marketing to the Changing Household, Ballinger Publishing, 1985, pp. 187-203. 1985.
A. Vilmos and S. Narnouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic. 2003.
Raja Mohn Rosli bin Raja Zulkifli; Building a World Class Infrastructure to Support E-Commerce in Malaysia; 1997 Telekom Malaysia, 1997. 1997.
Chang et al., "Smart Phone for Mobile Commerce," Computer Standards & Interfaces 31.4, pp. 740-747, 2009. 2009.
NACHA (Business-to-Business EIPP: Presentment Models and Payment Options, http://euro.ecom.cmu.edu/resources/elibrary/epay/B2BPaymentOptions.pdf, 2001), (Year: 2001). 2001.

(56) References Cited

OTHER PUBLICATIONS

International Trade Administration (export.gov), "Chapter 1: Methods of Payment in International Trade," https://2016.export.gov/tradefinanceguide/eg_main_043221.asp, Nov. 7, 2012 (Year: 2012). 2012.

NoPass, "No Password Login | Touch ID Fingerprint iPhone App," available at https://web.archive.org/web/20150328095715/http://www.nopassapp.com/, Mar. 28, 2015. 2015.

Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014. 2014.

NoPass, "Register," available at https://web.archive.org/web/20141222172212/http://www.nopassapp.com/register/, Dec. 22, 2014. 2014.

NoPass, "Login," available at https://web.archive.org/web/20141222170523/http://www.nopassapp.com/login/, Dec. 22, 2014. 2014.

Apple, "iOS Security," available at https://web.archive.org/web/20140226213513/http://images.apple.com/iphone/business/docs/iOS_Security_Feb14.pdf, Feb. 2014. 2014.

EBay Developers Program, "eBay Web Services XML API Guide," 2005. 2005.

Federal Financial Institutions Examination Council (Wholesale Payment System, https://ithandbook.ffiec.gov/media/274899/ffiec_itbooklet_wholesalepaymentsystems.pdf, Section 4, Jul. 2004. 2004.

Oldfield et al., "The Place of Risk Management in Financial Institutions," The Wharton School, Financial Institutional Center, University of Pennsylvania, 1995. 1995.

The PayPal Account, Chapter 2, link.springer.com, Apr. 30, 2007. 2007.

* cited by examiner

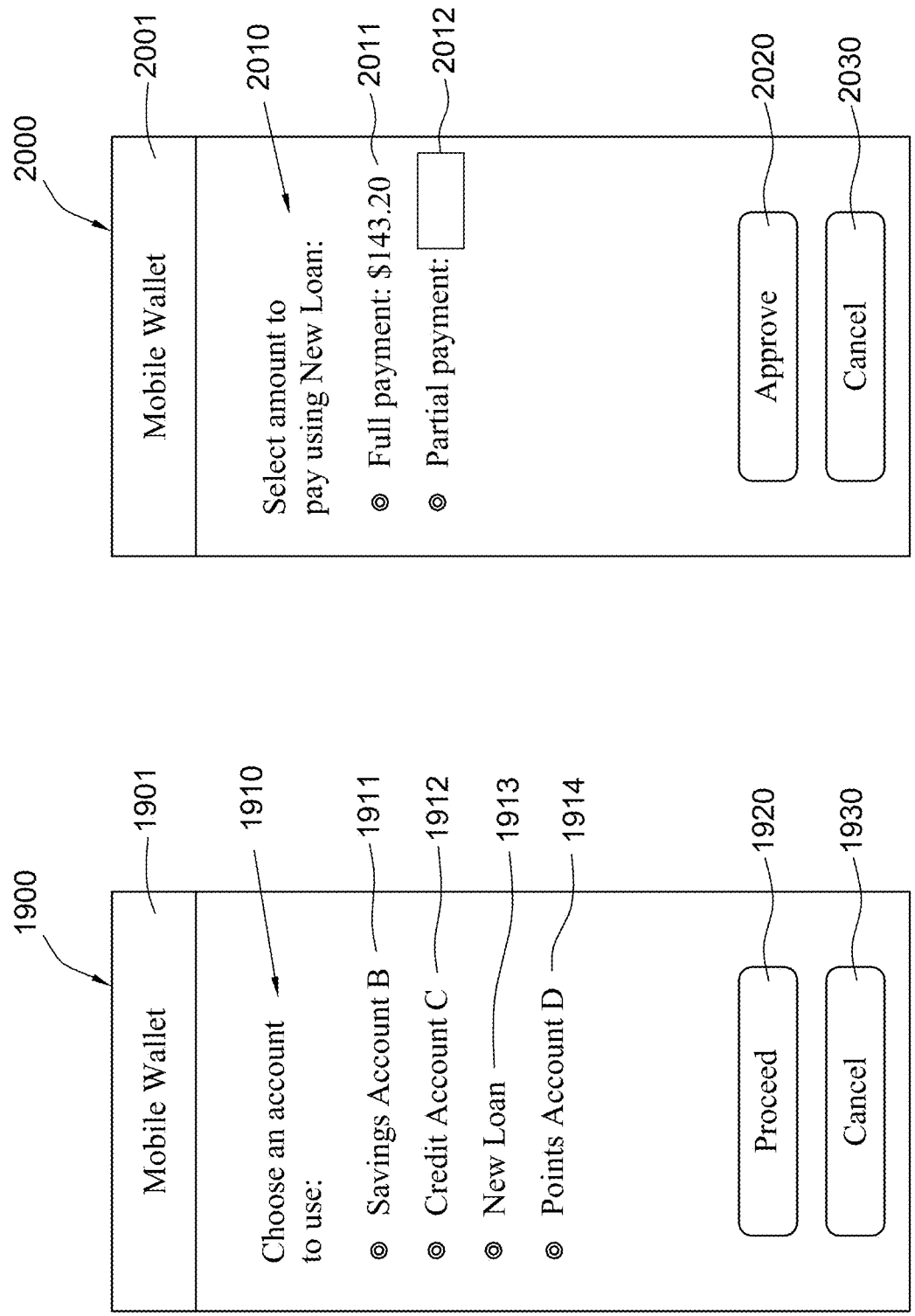

SECURE REAL-TIME TRANSACTIONS

CROSS-REFERENCE TO RELATED APPLICATIONS

This application is a continuation of U.S. patent application Ser. No. 17/738,934, filed May 6, 2022, which is a continuation of U.S. patent application Ser. No. 16/716,322, filed Dec. 16, 2019, which is a continuation-in-part of U.S. patent application Ser. No. 15/873,549, filed Jan. 17, 2018; U.S. patent application Ser. No. 15/873,533, filed Jan. 17, 2018; U.S. patent application Ser. No. 15/873,508, filed Jan. 17, 2018; U.S. patent application Ser. No. 15/873,481, filed Jan. 17, 2018; U.S. patent application Ser. No. 15/873,463, filed Jan. 17, 2018; and U.S. patent application Ser. No. 15/873,440, filed Jan. 17, 2018. U.S. patent application Ser. Nos. 15/873,549, 15/873,533, 15/873,508, 15/873,481, 15/873,463, and 15/873,440 are each a continuation-in-part of U.S. patent application Ser. No. 15/170,781, filed Jun. 1, 2016, which is a continuation of U.S. patent application Ser. No. 14/805,214, filed Jul. 21, 2015. U.S. patent application Ser. No. 16/716,322 also claims the benefit of U.S. Provisional Application No. 62/779,987, filed Dec. 14, 2018. U.S. Provisional Application No. 62/779,987 and U.S. patent application Ser. Nos. 17/738,934, 16/716,322, 15/873,549, 15/873,533, 15/873,508, 15/873,481, 15/873,463, 15/873,440, 15/170,781, and 14/805,214 are incorporated herein by reference in their entirety.

TECHNICAL FIELD

This disclosure relates generally to secure processing of transactions, and relates more particularly to providing secure transactions with offline devices.

BACKGROUND

In a typical transaction involving a mobile device, a mobile wallet application in the mobile device generally needs to communicate (e.g., through the Internet) with a mobile wallet provider during the transaction, such as to initiate the transaction and/or to authorize the transaction. When the mobile device is unable access the mobile wallet provider, such as due to the mobile device being unable to access the Internet, the transaction generally cannot proceed.

BRIEF DESCRIPTION OF THE DRAWINGS

To facilitate further description of the embodiments, the following drawings are provided in which:

FIG. 19 illustrates an exemplary user interface display to allow the consumer of FIG. 1 to select another account for the payment transaction when the approved account has insufficient funds;

FIG. 20 illustrates an exemplary user interface display to allow the consumer of FIG. 1 to select the amount to pay using the other account selected the user interface display of FIG. 19;

Figure 1:
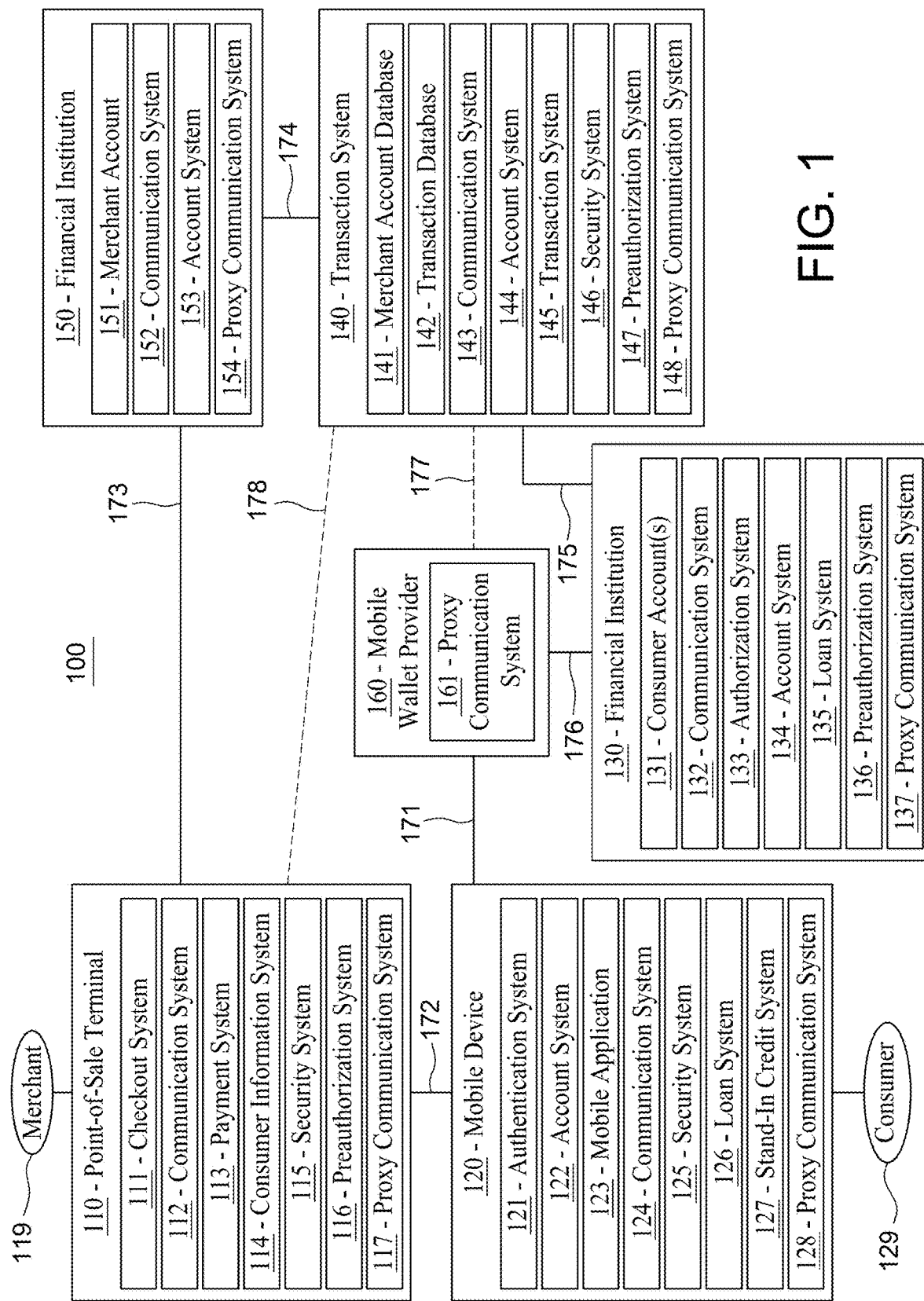
FIG. 1 illustrates a block diagram of a system that can be employed for a secure real-time payment transaction network, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order.

It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

DESCRIPTION OF EXAMPLES OF EMBODIMENTS

Various embodiments include a system including one or more processing modules and one or more non-transitory memory storage modules storing computing instructions configured to run on the one or more processing modules and perform certain acts. The acts can include receiving, at a first financial institution from a mobile device of a consumer, a first request to pay a merchant for a payment amount from a first account of the consumer maintained by the first financial institution. The first request can include first information including a merchant identifier, a transaction identifier, and the payment amount. The first information can be sent to the first financial institution from a mobile application running on a mobile device used by the consumer at a store of the merchant to pay for one or more items to be purchased from the merchant by the consumer for the payment amount. The merchant identifier can be associated with the merchant. The mobile application can be associated with the first account. The acts also can include determining, at the first financial institution, second information including an account identifier of a second account of the merchant maintained by a second financial institution, at least partially based on the merchant identifier and third information obtained from a first system. The first system can be in data communication with the first financial institution and the second financial institution. The first system can be maintained by an entity that is different from the first financial institution and the second financial institution. The acts additionally can include authorizing, at the first financial institution, a payment from the first account to the second account. The acts further can include sending, from the first financial institution to the first system, payment information regarding a payment to be made to the second account from the first account. The payment information can be routed through the first system to the second financial institution such that the second financial institution, upon receiving the payment information, notifies the merchant to satisfy an expectation of the merchant for payment from the consumer. The payment information can include the transaction identifier, the account identifier of the second account, and the payment amount.

A number of embodiments include a method being implemented via one or more processing modules and one or more non-transitory memory storage modules storing computing instructions configured to run on the one or more processing modules. The method can include receiving, at a first financial institution from a mobile device of a consumer, a first request to pay a merchant for a payment amount from a first account of the consumer maintained by the first financial institution. The first request can include first information including a merchant identifier, a transaction identifier, and the payment amount. The first information can be sent to the first financial institution from a mobile application running on a mobile device used by the consumer at a store of the merchant to pay for one or more items to be purchased from the merchant by the consumer for the payment amount. The merchant identifier can be associated with the merchant. The mobile application can be associated with the first account. The method also can include determining, at the first financial institution, second information including an account identifier of a second account of the merchant maintained by a second financial institution, at least partially based on the merchant identifier and third information obtained from a first system. The first system can be in data communication with the first financial institution and the second financial institution. The first system can be maintained by an entity that is different from the first financial institution and the second financial institution. The method additionally can include authorizing, at the first financial institution, a payment from the first account to the second account. The method further can include sending, from the first financial institution to the first system, payment information regarding a payment to be made to the second account from the first account. The payment information can be routed through the first system to the second financial institution such that the second financial institution, upon receiving the payment information, notifies the merchant to satisfy an expectation of the merchant for payment from the consumer. The payment information can include the transaction identifier, the account identifier of the second account, and the payment amount.

Additional embodiments include a system including one or more processing modules and one or more non-transitory memory storage modules storing computing instructions configured to run on the one or more processing modules and perform certain acts. The acts can include receiving, at a first system from a first entity, a request including a merchant identifier. The merchant identifier can be associated with a merchant. The first system can be in data communication with a first financial institution and a second financial institution. The first system can be maintained by an entity that is different from the first financial institution and the second financial institution. The first financial institution can maintain a first account of a consumer. The first system can be in data communication with a merchant account database. The acts also can include determining, at the first system, using the merchant account database, first information including an account identifier of a second account of the merchant maintained by a second financial institution. The account identifier can be associated with the merchant identifier in the merchant account database. The acts additionally can include sending the first information from the first system to the first financial institution. The acts further can include receiving, at the first system from the first financial institution, payment information regarding a payment to be made to the second account from the first account to pay the merchant for one or more items to be purchased from the merchant by the consumer for the payment amount. The consumer can use a mobile device at a store of the merchant to pay for the one or more items. The mobile device can run a mobile application associated with the first account. The payment information can include a transaction identifier, the account identifier of the second account, and the payment amount. The acts additionally can include sending, from the first system to the second financial institution, the payment information such that the second financial institution, upon receiving the payment information, notifies the merchant to satisfy an expectation of the merchant for payment from the consumer.

Further embodiments include a method being implemented via one or more processing modules and one or more non-transitory memory storage modules storing computing instructions configured to run on the one or more processing modules. The method can include receiving, at a first system from a first entity, a request including a merchant identifier. The merchant identifier can be associated with a merchant. The first system can be in data communication with a first financial institution and a second financial institution. The first system can be maintained by an entity that is different from the first financial institution and the second financial institution. The first financial institution can maintain a first account of a consumer. The first system can be in data communication with a merchant account database. The method also can include determining, at the first system, using the merchant account database, first information including an account identifier of a second account of the merchant maintained by a second financial institution. The account identifier can be associated with the merchant identifier in the merchant account database. The method additionally can include sending the first information from the first system to the first financial institution. The method further can include receiving, at the first system from the first financial institution, payment information regarding a payment to be made to the second account from the first account to pay the merchant for one or more items to be purchased from the merchant by the consumer for the payment amount. The consumer can use a mobile device at a store of the merchant to pay for the one or more items. The mobile device can run a mobile application associated with the first account. The payment information can include a transaction identifier, the account identifier of the second account, and the payment amount. The method additionally can include sending, from the first system to the second financial institution, the payment information such that the second financial institution, upon receiving the payment information, notifies the merchant to satisfy an expectation of the merchant for payment from the consumer.

Still further embodiments include one or more non-transitory memory storage units including computer instructions that, when executed by one or more processors, perform various acts. The acts can include receiving, at a first system from a first entity, a request including a merchant identifier. The merchant identifier can be associated with a merchant. The first system can be in data communication with a first financial institution and a second financial institution. The first system can be maintained by an entity that is different from the first financial institution and the second financial institution. The first financial institution can maintain a first account of a consumer. The first system can be in data communication with a merchant account database. The acts also can include determining, at the first system, using the merchant account database, first information including an account identifier of a second account of the merchant maintained by a second financial institution. The account identifier can be associated with the merchant identifier in the merchant account database. The acts additionally can include sending the first information from the first system to the first financial institution. The acts further can include receiving, at the first system from the first financial institution, payment information regarding a payment to be made to the second account from the first account to pay the merchant for one or more items to be purchased from the merchant by the consumer for the payment amount. The consumer can use a mobile device at a store of the merchant to pay for the one or more items. The mobile device can run a mobile application associated with the first account. The payment information can include a transaction identifier, the account identifier of the second account, and the payment amount. The acts additionally can include sending, from the first system to the second financial institution, the payment information such that the second financial institution, upon receiving the payment information, notifies the merchant to satisfy an expectation of the merchant for payment from the consumer.

Additional embodiments include a method being implemented via one or more processing modules and one or more non-transitory memory storage modules storing computing instructions configured to run on the one or more processing modules. The method can include performing, at a mobile device, a preliminary identity authentication of a consumer using the mobile device. The method also can include receiving at the mobile device first information from a point-of-sale terminal. The first information can include a merchant identifier, a transaction identifier, and a payment amount. The merchant identifier can uniquely correspond to the point-of-sale terminal at a store of a merchant. The mobile device can run a mobile application that is associated with a first account of the consumer using the mobile device. The first account of the consumer can be maintained by a first financial institution. The method further can include sending, from the mobile device to the first financial institution, a first request to pay the merchant for the payment amount from the first account for one or more items to be purchased from the merchant by the consumer. The first request can include the first information, such that the first financial institution, upon receiving the first request, determines second information including an account identifier of a second account of the merchant maintained by a second financial institution, at least partially based on the merchant identifier and third information obtained from a first system, and such that the first financial institution sends to the first system payment information regarding a payment to be made to the second account from the first account. The payment information can be routed through the first system to the second financial institution such that the second financial institution, upon receiving the payment information, can notifies the merchant to satisfy an expectation of the merchant for payment from the consumer. The first system can be in data communication with the first financial institution and the second financial institution. The first system can be maintained by an entity that is different from the first financial institution and the second financial institution. The payment information can include the transaction identifier, the account identifier of the second account, and the payment amount. The payment information further can include one of: (a) a settlement credit push of funds for the payment amount from the first account to the second account, or (b) an irrevocable promise to pay the payment amount from the first account to the second account.

The method additionally can include, after sending the first request to pay the merchant and before the payment information is sent to the first system from the first financial institution: receiving, at the mobile device from the first financial institution, an additional authentication request to perform an additional identity authentication of the consumer using the mobile device; performing, at the mobile device, the additional identity authentication of the consumer using the mobile device; and sending, from the mobile device to the first financial institution, a response to the additional authentication request.

Performing the additional identity authentication of the consumer can include performing the additional authentication of the consumer based at least in part on at least one of: determining biometrics of the consumer using the mobile device; or requesting the consumer to enter additional information in the mobile device.

The method further can include prior to sending the first request to pay the merchant: sending, from the mobile device to the first financial institution, a preliminary request for account information; and receiving, at the mobile device from the first financial institution, the account information comprising an account balance and an account status of the first account. The account information can include an account balance and an account status of the first account.

Further embodiments include a method being implemented via one or more processing modules and one or more non-transitory memory storage modules storing computing instructions configured to run on the one or more processing modules. The method can include determining, at a point-of-sale terminal at a store of a merchant, a payment amount for one or more items to be purchased from the merchant by a consumer. The method also can include sending first information from the point-of-sale terminal to a mobile device used by the consumer. The first information can include a merchant identifier, a transaction identifier, and the payment amount. The merchant identifier can uniquely correspond to the point-of-sale terminal at the store of the merchant. The mobile device can run a mobile application that is associated with a first account of the consumer using the mobile device. The first account of the consumer can be maintained by a first financial institution. The mobile device, upon receiving the first information, can send a first request to pay the merchant for the payment amount from the first account. The first request can include the first information, such that the first financial institution, upon receiving the first request, determines second information including an account identifier of a second account of the merchant maintained by a second financial institution, at least partially based on the merchant identifier and third information obtained from a first system, and such that the first financial institution sends to the first system payment information regarding a payment to be made to the second account from the first account. The payment information can be routed through the first system to the second financial institution. The first system can be in data communication with the first financial institution and the second financial institution. The first system can be maintained by an entity that is different from the first financial institution and the second financial institution. The payment information can include the transaction identifier, the account identifier of the second account, and the payment amount. The payment information further can include one of: (a) a settlement credit push of funds for the payment amount from the first account to the second account, or (b) an irrevocable promise to pay the payment amount from the first account to the second account. The method further can include receiving, at the point-of-sale terminal from the second financial institution, a notification to satisfy an expectation of the merchant for payment from the consumer.

Sending the first information from the point-of-sale terminal to the mobile device can include sending the first information from the point-of-sale terminal to the mobile device using a proximity-based wireless data communication protocol.

The method additionally can include receiving, at the point-of-sale terminal from the mobile device, information about the consumer.

Still further embodiments include a method being implemented via one or more processing modules and one or more non-transitory memory storage modules storing computing instructions configured to run on the one or more processing modules. The method can include receiving, at a second financial institution from a first system, payment information regarding a payment to be made to a second account of a merchant maintained by the second financial institution from a first account of a consumer maintained by a first financial institution to pay the merchant for one or more items to be purchased from the merchant by the consumer for the payment amount. The payment information can be sent from the first financial institution to the first system and routed through the first system to the second financial institution. The first system can be in data communication with the first financial institution and the second financial institution. The first system can be maintained by an entity that is different from the first financial institution and the second financial institution. The consumer can use a mobile device at a store of the merchant to pay for the one or more items. The mobile device can run a mobile application associated with the first account. The payment information can include a transaction identifier, an account identifier of the second account, and the payment amount. The first financial institution can determine the account identifier of the second account based on a merchant identifier and based on third information obtained from the first system. The merchant identifier can uniquely correspond to a point-of-sale terminal at the store of a merchant. The mobile device can send a request to pay the merchant for the payment amount from the first account. The request can include first information including the merchant identifier, a transaction identifier, and the payment amount. The payment information further can include one of: (a) a settlement credit push of funds for the payment amount from the first account to the second account, or (b) an irrevocable promise to pay the payment amount from the first account to the second account. The method also can include sending, from the second financial institution to the point-of-sale terminal, a notification to satisfy an expectation of the merchant for payment from the consumer.

The method also can include, before sending the notification, crediting the second account with the payment amount.

Sending the notification to satisfy the expectation of the merchant for payment from the consumer can include notifying the merchant that funds for the payment amount are immediately available in the second account.

Additional embodiments include a system including one or more processors and one or more non-transitory computer-readable media storing computing instructions configured to run on the one more processors and perform various acts. The acts can include determining, at a point-of-sale terminal at a store of a merchant, a payment amount for one or more items to be purchased from the merchant by a consumer in a transaction. The acts also can include generating a transaction code including a merchant public identifier, the payment amount, a transaction identifier for the transaction, and a digital signature. The acts additionally can include providing the transaction code to a mobile device being used by the consumer, such that the mobile device verifies the digital signature and sends a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, and such that the first financial institution sends to the transaction system payment information regarding a payment to be made to the second account from the first account. The transaction system can be maintained by an entity that is different from the merchant, the first financial institution, and the second financial institution. The payment information can be routed through the transaction system to the second financial institution. The payment information can include the transaction identifier, the account identifier of the second account, and the payment amount. The acts further can include receiving, at the point-of-sale terminal, a notification of payment for the transaction in real-time while the consumer remains at the store of the merchant.

Further embodiments include a method being implemented via execution of computing instructions configured to run at one or more processors and stored at one or more non-transitory computer-readable media. The method can include determining, at a point-of-sale terminal at a store of a merchant, a payment amount for one or more items to be purchased from the merchant by a consumer in a transaction. The method also can include generating a transaction code including a merchant public identifier, the payment amount, a transaction identifier for the transaction, and a digital signature. The method additionally can include providing the transaction code to a mobile device being used by the consumer, such that the mobile device verifies the digital signature and sends a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, and such that the first financial institution sends to the transaction system payment information regarding a payment to be made to the second account from the first account. The transaction system can be maintained by an entity that is different from the merchant, the first financial institution, and the second financial institution. The payment information can be routed through the transaction system to the second financial institution. The payment information can include the transaction identifier, the account identifier of the second account, and the payment amount. The method further can include receiving, at the point-of-sale terminal, a notification of payment for the transaction in real-time while the consumer remains at the store of the merchant.

Additional embodiments include a system including one or more processors and one or more non-transitory computer-readable media storing computing instructions configured to run on the one more processors and perform various acts. The acts can include receiving, at a mobile device being used by a consumer, a transaction code from a point-of-sale terminal at a store of a merchant. The transaction code can include a merchant public identifier being associated with the merchant, a payment amount for one or more items to be purchased from the merchant by the consumer in a transaction, a transaction identifier for the transaction, and a digital signature. The acts also can include verifying the digital signature for the transaction code. The acts additionally can include sending, from the mobile device, a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, such that the first financial institution sends to the transaction system payment information regarding a payment to be made to the second account from the first account, such that the payment information is routed through the transaction system to the second financial institution, and such that the point-of-sale terminal receives a notification of payment for the transaction in real-time while the consumer remains at the store of the merchant. The transaction system can be maintained by an entity that is different from the merchant, the first financial institution, and the second financial institution. The payment information can include the transaction identifier, the account identifier of the second account, and the payment amount.

Further embodiments include a method being implemented via execution of computing instructions configured to run at one or more processors and stored at one or more non-transitory computer-readable media. The method can include receiving, at a mobile device being used by a consumer, a transaction code from a point-of-sale terminal at a store of a merchant. The transaction code can include a merchant public identifier being associated with the merchant, a payment amount for one or more items to be purchased from the merchant by the consumer in a transaction, a transaction identifier for the transaction, and a digital signature. The method also can include verifying the digital signature for the transaction code. The method additionally can include sending, from the mobile device, a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, such that the first financial institution sends to the transaction system payment information regarding a payment to be made to the second account from the first account, such that the payment information is routed through the transaction system to the second financial institution, and such that the point-of-sale terminal receives a notification of payment for the transaction in real-time while the consumer remains at the store of the merchant. The transaction system can be maintained by an entity that is different from the merchant, the first financial institution, and the second financial institution. The payment information can include the transaction identifier, the account identifier of the second account, and the payment amount.

Additional embodiments include a system including one or more processors and one or more non-transitory computer-readable media storing computing instructions configured to run on the one more processors and perform various acts. The acts can include receiving, at a first financial institution from a mobile device being used by a consumer, a request to pay a merchant for a payment amount from a first account of the consumer maintained by the first financial institution. The request to pay can include information including a merchant public identifier, a payment amount for one or more items to be purchased from the merchant by the consumer in a transaction, and a transaction identifier for the transaction. The mobile device can be used by the consumer at a store of the merchant to pay for the transaction. The information can be received by the mobile device from a point-of-sale terminal at the store of the merchant as part of a transaction code. The transaction code can be verified by the mobile device using a digital signature of the transaction code. The acts also can include retrieving, at the first financial institution from a transaction system, an account identifier for a second account of the merchant maintained by a second financial institution based on the merchant public identifier. The transaction system can be maintained by an entity that is different from the merchant, the first financial institution, and the second financial institution. The acts additionally can include sending, from the first financial institution to the transaction system, payment information regarding a payment to be made to the second account from the first account. The payment information can be routed through the transaction system to the second financial institution. The point-of-sale terminal can receive a notification of payment for the transaction in real-time while the consumer remains at the store of the merchant. The payment information can include the transaction identifier, the account identifier of the second account, and the payment amount.

Further embodiments include a method being implemented via execution of computing instructions configured to run at one or more processors and stored at one or more non-transitory computer-readable media. The method can include receiving, at a first financial institution from a mobile device being used by a consumer, a request to pay a merchant for a payment amount from a first account of the consumer maintained by the first financial institution. The request to pay can include information including a merchant public identifier, a payment amount for one or more items to be purchased from the merchant by the consumer in a transaction, and a transaction identifier for the transaction. The mobile device can be used by the consumer at a store of the merchant to pay for the transaction. The information can be received by the mobile device from a point-of-sale terminal at the store of the merchant as part of a transaction code. The transaction code can be verified by the mobile device using a digital signature of the transaction code. The method also can include retrieving, at the first financial institution from a transaction system, an account identifier for a second account of the merchant maintained by a second financial institution based on the merchant public identifier. The transaction system can be maintained by an entity that is different from the merchant, the first financial institution, and the second financial institution. The method additionally can include sending, from the first financial institution to the transaction system, payment information regarding a payment to be made to the second account from the first account. The payment information can be routed through the transaction system to the second financial institution. The point-of-sale terminal can receive a notification of payment for the transaction in real-time while the consumer remains at the store of the merchant. The payment information can include the transaction identifier, the account identifier of the second account, and the payment amount.

Additional embodiments include a system including one or more processors and one or more non-transitory computer-readable media storing computing instructions configured to run on the one more processors and perform various acts. The acts can include receiving, at a transaction system from a first entity, a request including a merchant public identifier associated with a merchant. The transaction system can be in data communication with a first financial institution that maintains a first account of a consumer and a second financial institution that maintains a second account of the merchant. The transaction system can be maintained by an entity that is different from the merchant, the first financial institution, and the second financial institution. The consumer can use a mobile device at a store of the merchant to pay for one or more items in a transaction. The mobile device can receive a transaction code from a point-of-sale terminal at the store. The transaction code can include a transaction identifier, a payment amount for the transaction, the merchant public identifier, and a digital signature. The transaction code can be verified by the mobile device using the digital signature of the transaction code. The acts also can include determining, at the transaction system, an account identifier of the second account based on the merchant public identifier using a merchant account database. The acts additionally can include sending the account identifier to the first financial institution. The acts further can include receiving, at the transaction system from the first financial institution, payment information regarding a payment to be made to the second account from the first account. The payment information can include the account identifier of the second account, the payment amount, and the transaction identifier. The acts additionally can include sending, from the transaction system to the second financial institution, the payment information, such that the point-of-sale terminal receives a notification of payment for the transaction in real-time while the consumer remains at the store of the merchant.

Further embodiments include a method being implemented via execution of computing instructions configured to run at one or more processors and stored at one or more non-transitory computer-readable media. The method can include receiving, at a transaction system from a first entity, a request including a merchant public identifier associated with a merchant. The transaction system can be in data communication with a first financial institution that maintains a first account of a consumer and a second financial institution that maintains a second account of the merchant. The transaction system can be maintained by an entity that is different from the merchant, the first financial institution, and the second financial institution. The consumer can use a mobile device at a store of the merchant to pay for one or more items in a transaction. The mobile device can receive a transaction code from a point-of-sale terminal at the store. The transaction code can include a transaction identifier, a payment amount for the transaction, the merchant public identifier, and a digital signature. The transaction code can be verified by the mobile device using the digital signature of the transaction code. The method also can include determining, at the transaction system, an account identifier of the second account based on the merchant public identifier using a merchant account database. The method additionally can include sending the account identifier to the first financial institution. The method further can include receiving, at the transaction system from the first financial institution, payment information regarding a payment to be made to the second account from the first account. The payment information can include the account identifier of the second account, the payment amount, and the transaction identifier. The method additionally can include sending, from the transaction system to the second financial institution, the payment information, such that the point-of-sale terminal receives a notification of payment for the transaction in real-time while the consumer remains at the store of the merchant.

Additional embodiments include a system including one or more processors and one or more non-transitory computer-readable media storing computing instructions configured to run on the one more processors and perform various acts. The acts can include performing, at a mobile device being used by a consumer, an identity authentication of the consumer. The acts also can include receiving, at the mobile device, first information from a point-of-sale terminal at a store of a merchant. The first information can include a merchant identifier, a transaction identifier, and a payment amount. The merchant identifier can be associated with the merchant. The payment amount can be for one or more items to be purchased from the merchant by the consumer in a transaction. The transaction identifier can be associated with the transaction. The acts additionally can include sending, from the mobile device, a request to pay the merchant for the payment amount from one or more first accounts of the consumer maintained by a first financial institution, such that the first financial institution, upon receiving the request to pay, retrieves from a transaction system an account identifier of a second account of the merchant maintained by a second financial institution based on the merchant identifier, such that the first financial institution sends to the transaction system payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. The one or more first accounts can include at least one non-demand deposit account. The transaction system can be maintained by an entity that is different from the merchant, the first financial institution, and the second financial institution. The payment information can include the transaction identifier, the account identifier of the second account, and the payment amount.

Further embodiments include a method being implemented via execution of computing instructions configured to run at one or more processors and stored at one or more non-transitory computer-readable media. The method can include performing, at a mobile device being used by a consumer, an identity authentication of the consumer. The method also can include receiving, at the mobile device, first information from a point-of-sale terminal at a store of a merchant. The first information can include a merchant identifier, a transaction identifier, and a payment amount. The merchant identifier can be associated with the merchant. The payment amount can be for one or more items to be purchased from the merchant by the consumer in a transaction. The transaction identifier can be associated with the transaction. The method additionally can include sending, from the mobile device, a request to pay the merchant for the payment amount from one or more first accounts of the consumer maintained by a first financial institution, such that the first financial institution, upon receiving the request to pay, retrieves from a transaction system an account identifier of a second account of the merchant maintained by a second financial institution based on the merchant identifier, such that the first financial institution sends to the transaction system payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. The one or more first accounts can include at least one non-demand deposit account. The transaction system can be maintained by an entity that is different from the merchant, the first financial institution, and the second financial institution. The payment information can include the transaction identifier, the account identifier of the second account, and the payment amount.

Additional embodiments include a system including one or more processors and one or more non-transitory computer-readable media storing computing instructions configured to run on the one more processors and perform various acts. The acts can include receiving, at a first financial institution from a mobile device being used by a consumer, a request to pay a merchant for a payment amount from one or more first accounts of the consumer maintained by the first financial institution. The one or more first accounts can include at least one non-demand deposit account. The request to pay can include information including a merchant identifier, a payment amount for one or more items to be purchased from the merchant by the consumer in a transaction, and a transaction identifier for the transaction. The mobile device can be used by the consumer at a store of the merchant to pay for the transaction. The information can be received by the mobile device from a point-of-sale terminal at the store of the merchant. The acts also can include retrieving, at the first financial institution from a transaction system, an account identifier for a second account of the merchant maintained by a second financial institution based on the merchant identifier. The transaction system can be maintained by an entity that is different from the merchant, the first financial institution, and the second financial institution. The acts additionally can include sending, from the first financial institution to the transaction system, payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. The payment information can include the transaction identifier, the account identifier of the second account, and the payment amount.

Further embodiments include a method being implemented via execution of computing instructions configured to run at one or more processors and stored at one or more non-transitory computer-readable media. The method can include receiving, at a first financial institution from a mobile device being used by a consumer, a request to pay a merchant for a payment amount from one or more first accounts of the consumer maintained by the first financial institution. The one or more first accounts can include at least one non-demand deposit account. The request to pay can include information including a merchant identifier, a payment amount for one or more items to be purchased from the merchant by the consumer in a transaction, and a transaction identifier for the transaction. The mobile device can be used by the consumer at a store of the merchant to pay for the transaction. The information can be received by the mobile device from a point-of-sale terminal at the store of the merchant. The method also can include retrieving, at the first financial institution from a transaction system, an account identifier for a second account of the merchant maintained by a second financial institution based on the merchant identifier. The transaction system can be maintained by an entity that is different from the merchant, the first financial institution, and the second financial institution. The method additionally can include sending, from the first financial institution to the transaction system, payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. The payment information can include the transaction identifier, the account identifier of the second account, and the payment amount.

Additional embodiments include a system including one or more processors and one or more non-transitory computer-readable media storing computing instructions configured to run on the one more processors and perform various acts. The acts can include receiving, at a transaction system from a first entity, a request including a merchant identifier associated with a merchant. The transaction system can be in data communication with a first financial institution that maintains one or more first accounts of a consumer and a second financial institution that maintains a second account of the merchant. The one or more first accounts can include at least one non-demand deposit account. The transaction system can be maintained by an entity that is different from the merchant, the first financial institution, and the second financial institution. The consumer can use a mobile device at a store of the merchant to authorize paying a payment amount for one or more items in a transaction using the one or more first accounts. The acts also can include determining, at the transaction system, an account identifier of the second account of the merchant maintained by a second financial institution using a merchant account database. The acts additionally can include sending the account identifier from the transaction system to the first financial institution. The acts further can include receiving, at the transaction system from the first financial institution, payment information regarding a payment to be made to the second account from the one or more first accounts. The payment information can include a transaction identifier, the account identifier of the second account, and the payment amount. The acts additionally can include sending, from the transaction system to the second financial institution, the payment information, such that a point-of-sale terminal at the store of the merchant receives a notification of payment for the transaction in real-time while the consumer remains at the store of the merchant.

Further embodiments include a method being implemented via execution of computing instructions configured to run at one or more processors and stored at one or more non-transitory computer-readable media. The method can include receiving, at a transaction system from a first entity, a request including a merchant identifier associated with a merchant. The transaction system can be in data communication with a first financial institution that maintains one or more first accounts of a consumer and a second financial institution that maintains a second account of the merchant. The one or more first accounts can include at least one non-demand deposit account. The transaction system can be maintained by an entity that is different from the merchant, the first financial institution, and the second financial institution. The consumer can use a mobile device at a store of the merchant to authorize paying a payment amount for one or more items in a transaction using the one or more first accounts. The method also can include determining, at the transaction system, an account identifier of the second account of the merchant maintained by a second financial institution using a merchant account database. The method additionally can include sending the account identifier from the transaction system to the first financial institution. The method further can include receiving, at the transaction system from the first financial institution, payment information regarding a payment to be made to the second account from the one or more first accounts. The payment information can include a transaction identifier, the account identifier of the second account, and the payment amount. The method additionally can include sending, from the transaction system to the second financial institution, the payment information, such that a point-of-sale terminal at the store of the merchant receives a notification of payment for the transaction in real-time while the consumer remains at the store of the merchant.

Additional embodiments include a system including one or more processors and one or more non-transitory computer-readable media storing computing instructions configured to run on the one more processors and perform various acts. The acts can include determining, at a point-of-sale terminal at a store of a merchant, a payment amount for one or more items to be purchased from the merchant by a consumer in a transaction. The acts also can include sending first information from the point-of-sale terminal to a mobile device used by the consumer. The first information can include a merchant identifier, a transaction identifier, and the payment amount, such that the mobile device sends a request to pay the merchant for the payment amount from one or more first accounts of the consumer maintained by a first financial institution, such that the first financial institution, upon receiving the request to pay, retrieves from a transaction system an account identifier of a second account of the merchant maintained by a second financial institution based on the merchant identifier, such that the first financial institution sends to the transaction system payment information regarding a payment to be made to the second account from the one or more first accounts, and such that the payment information is routed through the transaction system to the second financial institution. The one or more first accounts can include at least one non-demand deposit account. The transaction system can be maintained by an entity that is different from the merchant, the first financial institution, and the second financial institution. The payment information can include the transaction identifier, the account identifier of the second account, and the payment amount. The acts additionally can include receiving, at the point-of-sale terminal, a notification of payment for the transaction in real-time while the consumer remains at the store of the merchant.

Further embodiments include a method being implemented via execution of computing instructions configured to run at one or more processors and stored at one or more non-transitory computer-readable media. The method can include determining, at a point-of-sale terminal at a store of a merchant, a payment amount for one or more items to be purchased from the merchant by a consumer in a transaction. The method also can include sending first information from the point-of-sale terminal to a mobile device used by the consumer. The first information can include a merchant identifier, a transaction identifier, and the payment amount, such that the mobile device sends a request to pay the merchant for the payment amount from one or more first accounts of the consumer maintained by a first financial institution, such that the first financial institution, upon receiving the request to pay, retrieves from a transaction system an account identifier of a second account of the merchant maintained by a second financial institution based on the merchant identifier, such that the first financial institution sends to the transaction system payment information regarding a payment to be made to the second account from the one or more first accounts, and such that the payment information is routed through the transaction system to the second financial institution. The one or more first accounts can include at least one non-demand deposit account. The transaction system can be maintained by an entity that is different from the merchant, the first financial institution, and the second financial institution. The payment information can include the transaction identifier, the account identifier of the second account, and the payment amount. The method additionally can include receiving, at the point-of-sale terminal, a notification of payment for the transaction in real-time while the consumer remains at the store of the merchant.

Additional embodiments include a system including one or more processors and one or more non-transitory computer-readable media storing computing instructions configured to run on the one more processors and perform various acts. The acts can include receiving a preauthorization code at a mobile device while the mobile device is in data communication with a mobile wallet provider. The preauthorization code can include a preauthorization amount, an expiration time, and a digital signature. The acts also can include storing the preauthorization code in the mobile device. The acts additionally can include receiving, at the mobile device, an authorization from a user of the mobile device for a transaction having a transaction amount while the user is at a point-of-sale terminal of a first entity. The acts further can include determining that the mobile device is unable to communicate with the mobile wallet provider. The acts additionally can include verifying that the transaction amount is less than or equal to the preauthorization amount. The acts further can include, while the mobile device is unable to communicate with the mobile wallet provider, providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity. The transaction code can include the preauthorization code, a transaction identifier, and the transaction amount.

Further embodiments include a method being implemented via execution of computing instructions configured to run at one or more processors and stored at one or more non-transitory computer-readable media. The method can include receiving a preauthorization code at a mobile device while the mobile device is in data communication with a mobile wallet provider. The preauthorization code can include a preauthorization amount, an expiration time, and a digital signature. The method also can include storing the preauthorization code in the mobile device. The method additionally can include receiving, at the mobile device, an authorization from a user of the mobile device for a transaction having a transaction amount while the user is at a point-of-sale terminal of a first entity. The method further can include determining that the mobile device is unable to communicate with the mobile wallet provider. The method additionally can include verifying that the transaction amount is less than or equal to the preauthorization amount. The method further can include, while the mobile device is unable to communicate with the mobile wallet provider, providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity. The transaction code can include the preauthorization code, a transaction identifier, and the transaction amount.

Additional embodiments include a system including one or more processors and one or more non-transitory computer-readable media storing computing instructions configured to run on the one more processors and perform various acts. The acts can include receiving a transaction amount and a preauthorization code from a first entity. The preauthorization code can include a preauthorization amount, an expiration time, and a digital signature. The transaction amount is for a transaction authorized by a user of a mobile device at a point-of-sale terminal of the first entity. The transaction amount is less than or equal to the preauthorization amount. The mobile device received the preauthorization code and stored the preauthorization code in the mobile device while the mobile device was in data communication with a mobile wallet provider. The mobile device provided a transaction code to the point-of-sale terminal while the mobile device was unable to communicate with the mobile wallet provider. The transaction code includes the preauthorization code, a transaction identifier for the transaction, and the transaction amount. The acts also can include verifying the preauthorization code using the digital signature of the preauthorization code. The acts additionally can include sending an approval for the transaction to the first entity in real-time while the user remains at the point-of-sale terminal of the first entity.

Further embodiments include a method being implemented via execution of computing instructions configured to run at one or more processors and stored at one or more non-transitory computer-readable media. The method can include receiving a transaction amount and a preauthorization code from a first entity. The preauthorization code can include a preauthorization amount, an expiration time, and a digital signature. The transaction amount is for a transaction authorized by a user of a mobile device at a point-of-sale terminal of the first entity. The transaction amount is less than or equal to the preauthorization amount. The mobile device received the preauthorization code and stored the preauthorization code in the mobile device while the mobile device was in data communication with a mobile wallet provider. The mobile device provided a transaction code to the point-of-sale terminal while the mobile device was unable to communicate with the mobile wallet provider. The transaction code includes the preauthorization code, a transaction identifier for the transaction, and the transaction amount. The method also can include verifying the preauthorization code using the digital signature of the preauthorization code. The method additionally can include sending an approval for the transaction to the first entity in real-time while the user remains at the point-of-sale terminal of the first entity.

Additional embodiments include a system including one or more processors and one or more non-transitory computer-readable media storing computing instructions configured to run on the one more processors and perform various acts. The acts can include receiving a transaction code from a mobile device at a point-of-sale terminal of a first entity while the mobile device is unable to communicate with a mobile wallet provider. The transaction code can include a preauthorization code, a transaction identifier for a transaction authorized by a user of the mobile device at the point-of-sale terminal, and a transaction amount for the transaction. The mobile device received the preauthorization code and stored the preauthorization code in the mobile device while the mobile device was in data communication with the mobile wallet provider. The preauthorization code includes a preauthorization amount, an expiration time, and a digital signature. The transaction amount is less than or equal to the preauthorization amount. The acts also can include sending the transaction amount and the preauthorization code to a transaction system. The acts additionally can include receiving an approval for the transaction from the transaction system in real-time while the user remains at the point-of-sale terminal.

Further embodiments include a method being implemented via execution of computing instructions configured to run at one or more processors and stored at one or more non-transitory computer-readable media. The method can include receiving a transaction code from a mobile device at a point-of-sale terminal of a first entity while the mobile device is unable to communicate with a mobile wallet provider. The transaction code can include a preauthorization code, a transaction identifier for a transaction authorized by a user of the mobile device at the point-of-sale terminal, and a transaction amount for the transaction. The mobile device received the preauthorization code and stored the preauthorization code in the mobile device while the mobile device was in data communication with the mobile wallet provider. The preauthorization code includes a preauthorization amount, an expiration time, and a digital signature. The transaction amount is less than or equal to the preauthorization amount. The method also can include sending the transaction amount and the preauthorization code to a transaction system. The method additionally can include receiving an approval for the transaction from the transaction system in real-time while the user remains at the point-of-sale terminal.

Additional embodiments include a system including one or more processors and one or more non-transitory computer-readable media storing computing instructions configured to run on the one more processors and perform various acts. The acts can include receiving, at a mobile device from a point-of-sale terminal of a first entity, an identifier of the first entity, a transaction amount for a transaction, and a transaction identifier for the transaction. The acts also can include receiving an authorization from a user of the mobile device for the transaction while the user is at the point-of-sale terminal, the mobile device running a mobile application that is associated with a mobile wallet provider. The acts additionally can include determining that the mobile device is unable to communicate with the mobile wallet provider. The acts further can include generating an encrypted transaction code. The encrypted transaction code can include a preauthorization from the user to pay the first entity for the transaction amount from a first account of the user maintained by a first financial institution. The acts additionally can include sending the encrypted transaction code from the mobile device to the point-of-sale terminal to cause the encrypted transaction code to be sent through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, to cause the payment information to be routed through the transaction system to the second financial institution, and to cause the point-of-sale terminal to receive a notification of the payment for the transaction in real-time while the user remains at the point-of-sale terminal.

Further embodiments include a method being implemented via execution of computing instructions configured to run at one or more processors and stored at one or more non-transitory computer-readable media. The method can include receiving, at a mobile device from a point-of-sale terminal of a first entity, an identifier of the first entity, a transaction amount for a transaction, and a transaction identifier for the transaction. The method also can include receiving an authorization from a user of the mobile device for the transaction while the user is at the point-of-sale terminal, the mobile device running a mobile application that is associated with a mobile wallet provider. The method additionally can include determining that the mobile device is unable to communicate with the mobile wallet provider. The method further can include generating an encrypted transaction code. The encrypted transaction code can include a preauthorization from the user to pay the first entity for the transaction amount from a first account of the user maintained by a first financial institution. The method additionally can include sending the encrypted transaction code from the mobile device to the point-of-sale terminal to cause the encrypted transaction code to be sent through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, to cause the payment information to be routed through the transaction system to the second financial institution, and to cause the point-of-sale terminal to receive a notification of the payment for the transaction in real-time while the user remains at the point-of-sale terminal.

Additional embodiments include a system including one or more processors and one or more non-transitory computer-readable media storing computing instructions configured to run on the one more processors and perform various acts. The acts can include receiving, at a transaction system being situated along a proxy communication channel extending from a point-of-sale terminal of a first entity to a mobile wallet provider, an encrypted transaction code. The encrypted transaction code can be generated and sent to the point-of-sale terminal by a mobile device that runs a mobile application associated with the mobile wallet provider. The mobile device receives from a point-of-sale terminal an identifier of the first entity, a transaction amount of a transaction, and a transaction identifier for the transaction, receives an authorization from a user of the mobile device for the transaction while the user is at the point-of-sale terminal, and determines that the mobile device is unable to communicate with the mobile wallet provider. The encrypted transaction code includes a preauthorization from the user to pay the first entity for the transaction amount from a first account of the user maintained by a first financial institution. The acts also can include sending the encrypted transaction code through the proxy communication channel to the mobile wallet provider, to cause the mobile wallet provider to decrypt the encrypted transaction code and verify the preauthorization from the user. The acts additionally can include receiving, from the first financial institution, a request comprising the identifier of the first entity. The acts further can include determining an account identifier of a second account of the first entity maintained by a second financial institution based on the identifier of the first entity. The acts additionally can include sending the account identifier of the second account to the first financial institution. The acts further can include receiving, from the first financial institution, payment information regarding a payment to be made to the second account from the first account for the transaction. The acts additionally can include sending the payment information to the second financial institution, to cause the point-of-sale terminal to receive a notification in real-time while the user remains at the point-of-sale terminal.

Further embodiments include a method being implemented via execution of computing instructions configured to run at one or more processors and stored at one or more non-transitory computer-readable media. The method can include receiving, at a transaction system being situated along a proxy communication channel extending from a point-of-sale terminal of a first entity to a mobile wallet provider, an encrypted transaction code. The encrypted transaction code can be generated and sent to the point-of-sale terminal by a mobile device that runs a mobile application associated with the mobile wallet provider. The mobile device receives from a point-of-sale terminal an identifier of the first entity, a transaction amount of a transaction, and a transaction identifier for the transaction, receives an authorization from a user of the mobile device for the transaction while the user is at the point-of-sale terminal, and determines that the mobile device is unable to communicate with the mobile wallet provider. The encrypted transaction code includes a preauthorization from the user to pay the first entity for the transaction amount from a first account of the user maintained by a first financial institution. The method also can include sending the encrypted transaction code through the proxy communication channel to the mobile wallet provider, to cause the mobile wallet provider to decrypt the encrypted transaction code and verify the preauthorization from the user. The method additionally can include receiving, from the first financial institution, a request comprising the identifier of the first entity. The method further can include determining an account identifier of a second account of the first entity maintained by a second financial institution based on the identifier of the first entity. The method additionally can include sending the account identifier of the second account to the first financial institution. The method further can include receiving, from the first financial institution, payment information regarding a payment to be made to the second account from the first account for the transaction. The method additionally can include sending the payment information to the second financial institution, to cause the point-of-sale terminal to receive a notification in real-time while the user remains at the point-of-sale terminal.

Additional embodiments include a system including one or more processors and one or more non-transitory computer-readable media storing computing instructions configured to run on the one more processors and perform various acts. The acts can include sending, to a mobile device from a point-of-sale terminal of a first entity, an identifier of the first entity, a transaction amount of a transaction, and a transaction identifier for the transaction. The mobile device runs a mobile application that is associated with a mobile wallet provider, receives an authorization from a user of the mobile device for the transaction while the user is at the point-of-sale terminal, determines that the mobile device is unable to communicate with the mobile wallet provider, and generates an encrypted transaction code. The encrypted transaction code includes a preauthorization from the user to pay the first entity for the transaction amount from a first account of the user maintained by a first financial institution. The acts also can include receiving the encrypted transaction code from the mobile device. The acts additionally can include sending the encrypted transaction code through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, and to cause the payment information to be routed through the transaction system to the second financial institution. The acts further can include receiving, at the point-of-sale terminal, a notification of the payment for the transaction in real-time while the user remains at the point-of-sale terminal.

Further embodiments include a method being implemented via execution of computing instructions configured to run at one or more processors and stored at one or more non-transitory computer-readable media. The method can include sending, to a mobile device from a point-of-sale terminal of a first entity, an identifier of the first entity, a transaction amount of a transaction, and a transaction identifier for the transaction. The mobile device runs a mobile application that is associated with a mobile wallet provider, receives an authorization from a user of the mobile device for the transaction while the user is at the point-of-sale terminal, determines that the mobile device is unable to communicate with the mobile wallet provider, and generates an encrypted transaction code. The encrypted transaction code includes a preauthorization from the user to pay the first entity for the transaction amount from a first account of the user maintained by a first financial institution. The method also can include receiving the encrypted transaction code from the mobile device. The method additionally can include sending the encrypted transaction code through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, and to cause the payment information to be routed through the transaction system to the second financial institution. The method further can include receiving, at the point-of-sale terminal, a notification of the payment for the transaction in real-time while the user remains at the point-of-sale terminal.

Additional embodiments include a system including one or more processors. The system also includes a merchant account database including a plurality of merchant identifiers being associated with a plurality of merchants. A plurality of account identifiers can be associated with the plurality of merchants. A mapping can associate the plurality of merchant identifiers with the plurality of account identifiers. The system additional includes a transaction database. The system further includes one or more non-transitory computer-readable media storing computing instructions that, when executed by the one or more processors, cause the one or more processors to perform certain acts. The acts can include receiving, at the system and from a mobile device being used by a consumer, a request including a merchant identifier of the plurality of merchant identifiers. The merchant identifier can be associated with a merchant of the plurality of merchants. The consumer can use the mobile device to pay for one or more items to be purchased from the merchant by the consumer for a payment amount. The mobile device can obtain the merchant identifier using a data communication protocol. The system can be in data communication with a first financial institution and a second financial institution. The system can be maintained by an entity that is different from the merchant, the first financial institution, and the second financial institution. The acts also can include determining, at the system and using the merchant account database, first information including a second account identifier for a second account of the merchant at the second financial institution. The second account identifier can be associated with the merchant identifier in the merchant account database. The plurality of account identifiers can include the second account identifier. The acts additionally can include sending the first information from the system to the first financial institution. The acts further can include receiving in real time over a network, at the system and from the first financial institution, payment information regarding a payment to the second account from a first account of the consumer at the first financial institution to pay the merchant the payment amount for the one or more items. The payment information can include a transaction identifier, the second account identifier of the second account, and the payment amount. The acts additionally can include logging the payment information in the transaction database. The acts further can include sending in real time over the network, from the system to the merchant, a notification of the payment from the consumer to the merchant. The merchant does not receive a first account identifier of the first account of the consumer. The consumer does not receive the second account identifier of the second account of the merchant.

Further embodiments include a method implemented by one or more processors. The method can include receiving, at a system and from a mobile device being used by a consumer, a request comprising a merchant identifier. The merchant identifier can be associated with a merchant. The system can include a merchant account database and a transaction database. The merchant account database can include a plurality of merchant identifiers being associated with a plurality of merchants, a plurality of account identifiers associated with the plurality of merchants, and a mapping associating the plurality of merchant identifiers with the plurality of account identifiers. The plurality of merchants can include the merchant. The plurality of merchant identifiers can include the merchant identifier. The consumer can use the mobile device to pay for one or more items to be purchased from the merchant by the consumer for a payment amount. The mobile device can obtain the merchant identifier using a data communication protocol. The system can be in data communication with a first financial institution and a second financial institution. The system can be maintained by an entity that is different from the merchant, the first financial institution, and the second financial institution. The method also can include determining, at the system and using the merchant account database, first information comprising a second account identifier for a second account of the merchant maintained by the second financial institution. The second account identifier can be associated with the merchant identifier in the merchant account database. The plurality of account identifiers can include the second account identifier. The method additionally can include sending the first information from the system to the first financial institution. The method further can include receiving in real time over a network, at the system and from the first financial institution, payment information regarding a payment to the second account from a first account of the consumer at the first financial institution to pay the merchant the payment amount for the one or more items. The payment information can include a transaction identifier, the second account identifier of the second account, and the payment amount. The method additionally can include logging the payment information in the transaction database. The method further can include sending in real time over the network, from the system to the merchant, a notification of the payment from the consumer to the merchant. The merchant does not receive a first account identifier of the first account of the consumer. The consumer does not receive the second account identifier of the second account of the merchant.

Additional embodiments include one or more non-transitory computer-readable media comprising computer instructions that, when executed by one or more processors, perform certain acts. The acts can include receiving, at a system and from a mobile device being used by a consumer, a request comprising a merchant identifier. The merchant identifier can be associated with a merchant. The system can include a merchant account database and a transaction database. The merchant account database can include a plurality of merchant identifiers being associated with a plurality of merchants, a plurality of account identifiers associated with the plurality of merchants, and a mapping associating the plurality of merchant identifiers with the plurality of account identifiers. The plurality of merchants can include the merchant. The plurality of merchant identifiers can include the merchant identifier. The consumer can use the mobile device to pay for one or more items to be purchased from the merchant by the consumer for a payment amount. The mobile device can obtain the merchant identifier using a data communication protocol. The system can be in data communication with a first financial institution and a second financial institution. The system can be maintained by an entity that is different from the merchant, the first financial institution, and the second financial institution. The acts also can include determining, at the system and using the merchant account database, first information comprising a second account identifier for a second account of the merchant maintained by the second financial institution. The second account identifier can be associated with the merchant identifier in the merchant account database. The plurality of account identifiers can include the second account identifier. The acts additionally can include sending the first information from the system to the first financial institution. The acts further can include receiving in real time over a network, at the system and from the first financial institution, payment information regarding a payment to the second account from a first account of the consumer at the first financial institution to pay the merchant the payment amount for the one or more items. The payment information can include a transaction identifier, the second account identifier of the second account, and the payment amount. The acts additionally can include logging the payment information in the transaction database. The acts further can include sending in real time over the network, from the system to the merchant, a notification of the payment from the consumer to the merchant. The merchant does not receive a first account identifier of the first account of the consumer. The consumer does not receive the second account identifier of the second account of the merchant.

Further embodiments include a system including one or more processors. The system also can include a merchant account database including a plurality of merchant identifiers being associated with a plurality of merchants, a plurality of account identifiers associated with the plurality of merchants, and a mapping associating the plurality of merchant identifiers with the plurality of account identifiers. The system additionally can include a transaction database. The system further can include one or more non-transitory computer-readable media storing computing instructions that, when executed by the one or more processors, cause the one or more processors to perform certain operations. The operations can include receiving, at the system and based on a consumer using a mobile device to initiate a payment for one or more items to be purchased from a merchant by the consumer for a payment amount, a message including a merchant identifier of the plurality of merchant identifiers. The merchant identifier can be associated with the merchant of the plurality of merchants. The mobile device can obtain the merchant identifier using a data communication protocol. The system can be in data communication with a first financial institution and a second financial institution. The system can be maintained by an entity that is different from the merchant, the first financial institution, and the second financial institution. The operations also can include determining, at the system and using the merchant account database, first information including a second account identifier for a second account of the merchant at the second financial institution. The second account identifier can be associated with the merchant identifier in the merchant account database. The plurality of account identifiers can include the second account identifier. The operations additionally can include sending the first information from the system to the first financial institution. The operations further can include receiving in real-time over a network, at the system and from the first financial institution, payment information regarding the payment to the second account from a first account of the consumer at the first financial institution to pay the merchant the payment amount for the one or more items. The payment information can include information about the second account identifier of the second account and the payment amount. The operations additionally can include logging the payment information in the transaction database. The operations further can include sending in real-time over the network, from the system to the merchant, a notification of the payment from the consumer to the merchant. An account number of the first account of the consumer can remain undisclosed to the merchant.

Additional embodiments can include a method implemented by one or more processors. The method can include receiving, at a system and based on a consumer using a mobile device to initiate a payment for one or more items to be purchased from a merchant by the consumer for a payment amount, a message including a merchant identifier of a plurality of merchant identifiers associated with a plurality of merchants in a merchant account database. The merchant identifier can be associated with the merchant of the plurality of merchants. The merchant account database further can include a plurality of account identifiers associate with the plurality of merchants and a mapping associating the plurality of merchants identifiers with the plurality of account identifiers. The mobile device can obtain the merchant identifier using a data communication protocol. The system can be in data communication with a first financial institution and a second financial institution. The system can be maintained by an entity that is different from the merchant, the first financial institution, and the second financial institution. The method also can include determining, at the system and using the merchant account database, first information including a second account identifier for a second account of the merchant at the second financial institution. The second account identifier can be associated with the merchant identifier in the merchant account database. The plurality of account identifiers can include the second account identifier. The method additionally can include sending the first information from the system to the first financial institution. The method further can include receiving in real-time over a network, at the system and from the first financial institution, payment information regarding the payment to the second account from a first account of the consumer at the first financial institution to pay the merchant the payment amount for the one or more items. The payment information can include information about the second account identifier of the second account and the payment amount. The method additionally can include logging the payment information in a transaction database. The method further can include sending in real-time over the network, from the system to the merchant, a notification of the payment from the consumer to the merchant. An account number of the first account of the consumer can remain undisclosed to the merchant.

Further embodiments can include one or more non-transitory computer-readable media including computer instructions that, when executed by one or more processors, perform certain operations. The operations can include receiving, at a system and based on a consumer using a mobile device to initiate a payment for one or more items to be purchased from a merchant by the consumer for a payment amount, a message including a merchant identifier of a plurality of merchant identifiers associated with a plurality of merchants in a merchant account database. The merchant identifier can be associated with the merchant of the plurality of merchants. The merchant account database further can include a plurality of account identifiers associate with the plurality of merchants and a mapping associating the plurality of merchants identifiers with the plurality of account identifiers. The mobile device can obtain the merchant identifier using a data communication protocol. The system can be in data communication with a first financial institution and a second financial institution. The system can be maintained by an entity that is different from the merchant, the first financial institution, and the second financial institution. The operations also can include determining, at the system and using the merchant account database, first information including a second account identifier for a second account of the merchant at the second financial institution. The second account identifier can be associated with the merchant identifier in the merchant account database. The plurality of account identifiers can include the second account identifier. The operations additionally can include sending the first information from the system to the first financial institution. The operations further can include receiving in real-time over a network, at the system and from the first financial institution, payment information regarding the payment to the second account from a first account of the consumer at the first financial institution to pay the merchant the payment amount for the one or more items. The payment information can include information about the second account identifier of the second account and the payment amount. The operations additionally can include logging the payment information in a transaction database. The operations further can include sending in real-time over the network, from the system to the merchant, a notification of the payment from the consumer to the merchant. An account number of the first account of the consumer can remain undisclosed to the merchant.

Turning to the drawings, FIG. 1 illustrates a block diagram of a system 100 that can be employed for a secure real-time payment transaction network, according to an embodiment. System 100 is merely exemplary and embodiments of the system are not limited to the embodiments presented herein. The system can be employed in many different embodiments or examples not specifically depicted or described herein. In some embodiments, certain elements, systems, or modules of system 100 can perform various procedures, processes, and/or activities. In other embodiments, the procedures, processes, and/or activities can be performed by other suitable elements, systems, or modules of system 100.

Figure 7:
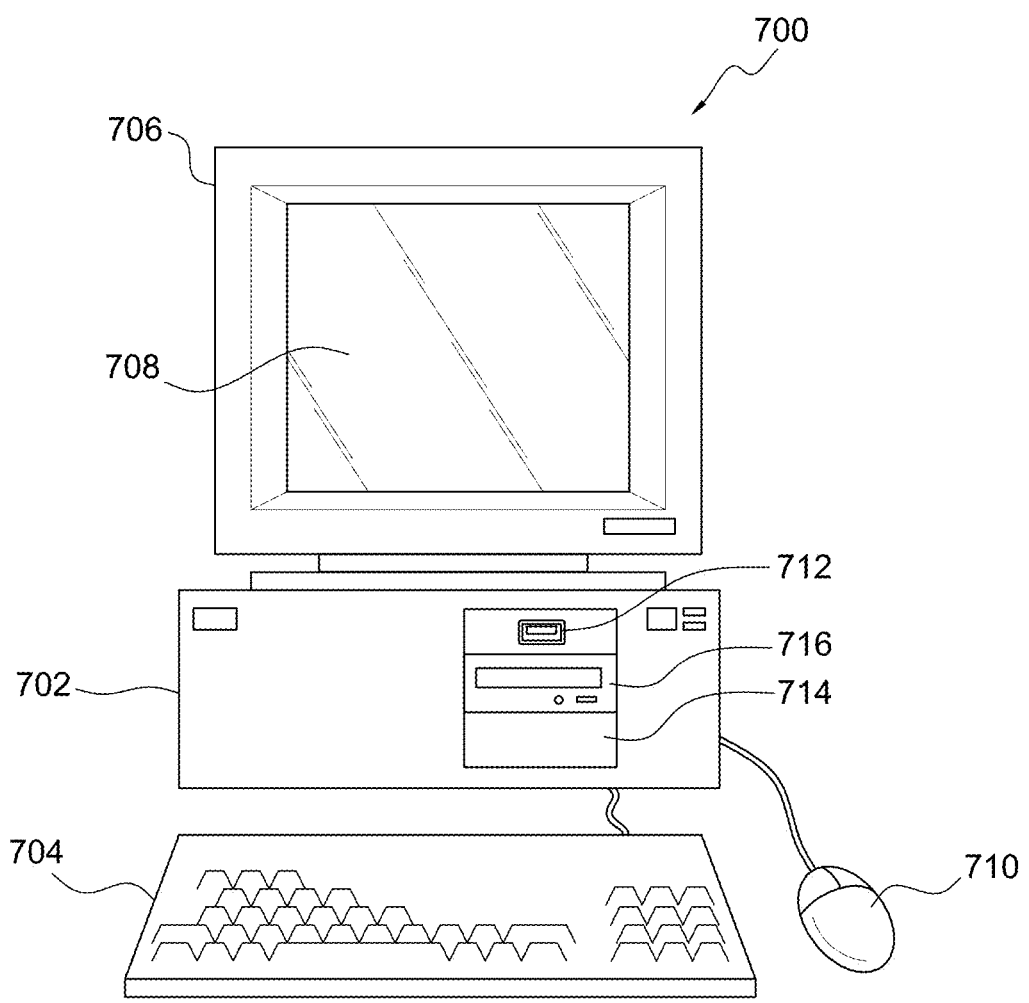
FIG. 7 illustrates a computer that is suitable for implementing an embodiment of components of the system of FIG. 1.

In some embodiments, system 100 can include one or more point-of-sale terminals, such as point-of-sale terminal 110; one or more mobile devices, such as mobile device 120; two or more financial institutions, such as financial institutions 130 and 150; and/or a transaction system 140. In other embodiments, system 100 also can include a wallet provider 160. In a number of embodiments, each of the point-of-sale terminals, the one or more mobile devices, the two or more financial institution, and the transaction system can be or include a computer system, such as computer system 700, as shown in FIG. 7 and described below, and can be a single computer, a single server, or a cluster or collection of computers or servers, or a cloud of computers or servers. In many embodiments, various components (e.g., 110, 120, 130, 140, 150, 160) of system 100 can be in data communication with various other components (e.g., 110, 120, 130, 140, 150, 160) of system 100, such as through one or more networks. The networks can be the Internet and/or other suitable public and/or private data communication networks.

In various embodiments, point-of-sale terminal 110 can be located within a store of a merchant, such as merchant 119. In several embodiments, the store can be a place of business, which can offer and/or sell items, such as products and/or services. In a number of embodiments, point-of-sale terminal 110 can be used to checkout a consumer 129 using mobile device 120 for one or more items to be purchased by consumer 129. In many embodiments, point-of-sale terminal 110 can include one or more systems, such as a checkout system 111, a communication system 112, a payment system 113, a consumer information system 114, a security system 115, a preauthorization system 116, a proxy communication system 117, and/or other suitable systems. For example, in various embodiments, checkout system 111 can be used to determine the payment amount, communication system 112 can communicate with other components of system 100, payment system 113 can determine whether consumer 129 has satisfactorily paid for the one or more items to be purchased, consumer information system 114 can store information regarding consumer 129, security system 115 can be used to generate a merchant security transaction code, preauthorization system 116 can handle a preauthorization code from mobile device 120 when mobile device 120 is offline, and/or proxy communication system 117 can handle proxy communications through point-of-sale terminal 110 when mobile device 120 is offline, as described below in further detail. In many embodiments, point-of-sale terminal 110 can be a register (e.g., cash register) that includes a card reader and communications with one or more card networks (e.g., STAR network, VISA network, etc.). In other embodiments, point-of-sale terminal 110 can be a register that is without a card reader or the ability to communicate with card networks.

In a number of embodiments, mobile device 120 can be used by consumer 129 to initiate a payment to merchant 119 for the one or more items to be purchased. In various embodiments, mobile device 120 can run a mobile application 123, such as a mobile wallet, which can be employed to facilitate paying merchant 119. In a number of embodiments, mobile device 120 and/or mobile application 123 can include one or more systems, such as an authentication system 121, an account system 122, a communication system 124, a security system 125, a loan system 126, a stand-in credit system 127, a proxy communication system 128, and/or other suitable systems. For example, in various embodiments, authentication system 121 can verify the identity of consumer 129, account system 122 can provide information regarding a consumer account of consumer 129, communication system 124 can communicate with other components of system 100, security system 125 can decipher and/or decode the merchant security transaction code and/or verify the digital signature of the merchant security transaction code, loan system 126 can present options and receive instructions regarding processing the transaction at least partially using a loan or credit charge, stand-in credit system 127 can handle a preauthorization code to facilitate payment when mobile device 120 is offline, and/or proxy communication system 128 can handle proxy communications with point-of-sale terminal 110 when mobile device 120 is offline, as described below in further detail.

In several embodiments, when consumer 129 using mobile device 120 is at point-of-sale terminal 110 to checkout, point-of-sale terminal 110 can determine the payment amount for the one or more items, and can communicate information to mobile device 120, such as the payment amount, a merchant identifier, and/or a transaction identifier. In some embodiments, the merchant identifier can uniquely identify point-of-sale terminal 110. For example, in some embodiments, each point-of-sale terminal can have a unique merchant identifier. In a number of embodiments, the merchant identifier can uniquely identify the merchant (e.g., merchant 119). For example, each merchant (e.g., merchant 119) can have a unique merchant identifier. In some embodiments, the merchant identifier can be a token that can be associated with merchant 119 and/or point-of-sale terminal 110. In many embodiments, when merchant 119 sets up, configures, and/or reconfigures, point-of-sale terminal 110, the merchant identifier can be created and/or assigned to point-of-sale terminal 110. In the same or different embodiments, one part of the merchant identifier can uniquely identify merchant 119, and another part of the merchant identifier can uniquely identify point-of-sale terminal 110, such that the part of the merchant identifier that uniquely identifies merchant 119 is the same for all point-of-sale terminals owned or used by merchant 119.

In various embodiments, mobile device 120 and point-of-sale terminal 110 can communicate with each other (either one-way or two-way) using a wireless data communication protocol. In some examples, the communication protocol can allow for one-way or two-way communication. For example, the wireless data communication protocol can be a proximity-based wireless data communication protocol, such as Near Field Communication (NFC), Bluetooth, Bluetooth Low Energy (BLE), iBeacon, etc. In other embodiments, mobile device 120 and/or point-of-sale terminal 110 can communicate with each other using another suitable form of communication. For example, in some embodiments, point-of-sale terminal 110 can provide a barcode (such as a QR (Quick Response) code), which can be scanned using a camera of mobile device 120, and/or mobile device 120 can provide a barcode (such as a QR code), which can be scanned using an optical scanner of point-of-sale terminal 110. In a number of embodiments, communication system 112 can provide communication functionality for point-of-sale terminal 110, and/or communication system 124 can provide communication functionality for mobile device 120.

In several embodiments, transaction system 140 can be in data communication with various financial institutions, such as financial institution 130 and/or financial institution 150, and can provide for interaction, facilitate communications, and/or facilitate transactions between the financial institutions, such as financial institutions 130 and 150. In a number of embodiments, transaction system 140 can include one or more systems, such as a communication system 143, an account system 144, a transaction system 145, a security system 146, a preauthorization system 147, a proxy communication system 148, and/or other suitable systems. In some embodiments, communication system 143 can be used to provide communications with the financial institutions (e.g., 130, 150). In many embodiments, transaction system 140 can include a merchant account database 141 and/or a transaction database 142, as described below in further detail. In some embodiments, account system 144 can interface with merchant account database 141, and/or transaction system 145 can interface with transaction database 142. In a number of embodiments, security system 146 can interface with security system 115 to facilitate providing a merchant security code, as described below in further detail. In several embodiments, preauthorization system 147 can handle a preauthorization code from mobile device 120 when mobile device 120 is offline, and/or proxy communication system 148 can handle proxy communications through transaction system 140 when mobile device 120 is offline, as described below in further detail. In many embodiments, transaction system 140 can include a network system that facilitates communications between the various financial institutions (e.g., financial institution 130 and financial institution 150). This network system can have any suitable topology, such as hub and spoke, peer-to-peer, or another suitable topology.

In a number of embodiments, the financial institutions (e.g., 130, 150) can be depository financial institutions, such as savings banks, credit unions, savings and loan associations, card issuing financial institutions, or other forms of financial institutions. In a number of embodiments, financial institution 130 can include one or more consumer accounts 131 associated with consumer 129. In various embodiments, consumer accounts 131 can include one or more demand deposit accounts (e.g., a checking account, savings account, or cash balance account), and non-demand deposit accounts (i.e., an account other than a demand deposit account), such as a lending account (e.g., a loan account or a credit account) or another type of account (e.g., a points account). In some embodiments, financial institution 130 can include one or more systems, such as a communication system 132, an authorization system 133, an account system 134, a loan system 135, a preauthorization system 136, a proxy communication system 137, and/or other suitable systems. For example, in some embodiments, account system 134 can interface with consumer account 134 to provide information regarding the status of one or more of consumer accounts 131, and/or can store and/or determine information regarding other accounts. In a number of embodiments, communication system 132 can communicate with other components of system 100. In various embodiments, authorization system 133 can authorize payments from one or more of consumer accounts 131. In a number of embodiments, account system 134 can obtain information, such as balances and statuses, about one or more of consumer accounts 131. In several embodiments, preauthorization system 136 can handle generating a preauthorization code for mobile device 120 to facilitate transactions when mobile device 120 is offline, and/or proxy communication system 137 can handle proxy communications through financial institution 130 when mobile device 120 is offline, as described below in further detail.

In a number of embodiments, financial institution 150 can include a merchant account 151 associated with merchant 119. In various embodiments, merchant account 151 can be a deposit account or another suitable type of account. In some embodiments, financial institution 150 can include one or more systems, such as communication system 152, account system 153, a proxy communication system 154, and/or other suitable systems, as described below in further detail. For example, in some embodiments, account system 153 can interface with merchant account 151 to provide information regarding the status of merchant account 151, and/or can store and determine information regarding other accounts. In a number of embodiments, communication system 152 can communicate with other components of system 100. In some embodiments, proxy communication system 154 can handle proxy communications through financial institution 150 when mobile device 120 is offline, as described below in further detail.

In several embodiments, merchant account database 141 of transaction system 140 can store information regarding merchants (e.g., merchant 119) and merchant accounts. For example, in a number of embodiments, merchant account database 141 can store a mapping between merchant identifiers and merchant accounts. For example, a certain merchant identifier can be associated with merchant 119 and merchant account 151 of merchant 119 maintained by financial institution 150. When provided with the merchant identifier, account system 144 and merchant account database 141 can be used by transaction system 140 to determine an account identifier (e.g., an account number) of merchant account 151, the name of merchant 119, a location of merchant 119, a location of point-of-sale terminal 110, and/or other information regarding merchant 119 and/or the merchant account. For example, in some embodiments, transaction system 140 can provide risk information (e.g., a risk score) regarding merchant 119 and/or merchant account 151. In some embodiments, a merchant can have three point-of-sale terminals, such as point-of-sale terminal 110, each with a unique identifier, which can each be associated with a single account of merchant 119, specifically, merchant account 151.

In many embodiments, the merchant identifier can be a public identifier that serves as an alias to identify merchant 119 and/or point-of-sale terminal 110 of merchant 119 among the various components (e.g., 110, 120, 130, 140, 150, 160) of system 100. In a number of embodiments, merchant 119 can enroll and/or register with transaction system 140 through financial institution 150, through a merchant consortium, or directly. In several embodiments, the merchant identifier for merchant 119 and or point-of-sale terminal 110 of merchant 119 can be selected and/or assigned at the time of enrollment or registration. In some embodiments, the merchant identifier can be a phone number, an email address, a terminal identifier, or another suitable identifier. As part of enrollment and/or registration transaction system 140 can verify that merchant 119 is a legitimate (e.g., bona fide) merchant, such as by vetting merchant 119 through financial institution 150 and/or another enrollment entity.

In several embodiments, upon or after enrolling and/or registering with transaction system 140, merchant 119 and/or point-of-sale terminal 110 can be provided with a security system 115, which can be computing instructions that are used to create a merchant security transaction code. In some embodiments, security system 115 of point-of-sale terminal 110 can communicate with security system 146 of transaction system 140, such as through application programming interface (API) calls. In other embodiments, security system 115 of point-of-sale terminal 110 can be self-contained computing instructions (i.e., that do not call security system 146 of transaction system 140) that are provided by transaction system 140 (e.g., at the time of enrollment and/or registration), or are based on instructions and/or a software development kit (SDK) provided by transaction system 140 (e.g., at the time of enrollment and/or registration).

In many embodiments, security system 115 can be used by merchant 119 during a transaction to generate a merchant security transaction code. In many embodiments, the merchant security transaction code can include various information, such as the payment amount for the transaction, a transaction identifier that uniquely identifies the transaction to merchant 119 and/or point-of-sale terminal 110, the merchant identifier, a date and/or time of the transaction, a list of the items purchased, a digital signature, and/or other suitable information. In many embodiments, this information can be encoded in the merchant security transaction code using a suitable data encoding method. In many embodiments, the digital signature can be generated based on the data in the merchant security transaction code. The digital signature can be generated using a suitable digital signature code signing algorithm as part of a digital signature scheme. For example, the code signing algorithm can be public-key cryptography signing algorithm, such as those used in public key infrastructure (PKI), a cryptographic hash function, such as one of the Secure Hash Algorithm (SHA) published by the National Institutes of Standards and Technology (NIST) (e.g., SHA-256), or another suitable signing algorithm. The digital signature can be used to verify that merchant 119 created the merchant security transaction code and/or that the data in the merchant security transaction code has not been corrupted or tampered with after having being created by security system 115.

In several embodiments, the merchant security transaction code can be a data code that can be transmitted between point-of-sale terminal 110 and mobile device 120 using a wireless data communication channel, as described above. In other embodiments, the merchant security transaction code can be encoded as a barcode, such as a one-dimensional (1D), two-dimensional (2D), or three-dimensional (3D) barcode, which can be optically ready by mobile device 120, such as by using a camera on mobile device 120, as described above. For example, the merchant security transaction code can be encoded as a matrix barcode, such as a QR code, and displayed on point-of-sale terminal 110 to be scanned by a camera on mobile device 120. In still other embodiments, the merchant security transaction code can be transferred manually from point-of-sale terminal 110 to mobile device 120 by the merchant security transaction code being displayed on point-of-sale terminal 110 and then being manually entered in mobile application 123 of mobile device 120.

In many embodiments, system 100 can provide a transaction network for secure real-time payments. In several embodiments, mobile application 123 of mobile device 120 can be used by consumer 129 to push a payment from one or more of consumer accounts 131 to merchant account 151 to satisfy an expectation of payment while consumer 129 is waiting at point-of-sale terminal 110. In a number of embodiments, mobile application 123 can be associated with and/or configured to be associated with financial institution 130 and/or one or more of consumer accounts 131. For example, account system 122 can associate mobile application 123 with one or more of consumer accounts 131 at financial institution 130. In some embodiments, mobile application 123 can be provided by financial institution 130 as a mobile application for use on mobile device 120. In other embodiments, mobile application 123 can be associated with multiple different financial institutions and accounts of consumer 129 at those financial institutions.

In some embodiments, mobile device 120 can be designed to be in data communication with mobile wallet provider 160. In many embodiments, mobile wallet provider 160 can communicate with mobile application 123 on mobile device 120. In several embodiments, mobile wallet provider 160 can be part of, or provided by, financial institution 130. For example, mobile application 123 can be an application provided by financial institution 130 for installation on mobile device 120. In other embodiments, mobile wallet provider 160 can be part of, or provided by, transaction system 140. For example, mobile application 123 can be an application provided by the entity that operates transaction system 140 for installation on mobile device 120. In still other embodiments, mobile wallet provider 160 can be part of, or provided by, another entity. For example, mobile wallet provider 160 can be another suitable mobile wallet provider, and can be similar or identical to Apple Pay by Apple, Inc. of Cupertino, California, or Google Pay by Google, LLC of Mountain View, California, for example. In a number of embodiments, mobile wallet provider 160 can include a proxy communication system 161. In several embodiments, proxy communication system 161 can handle proxy communications through mobile wallet provider 160 when mobile device 120 is offline, as described below in further detail.

In some embodiments, mobile wallet provider 160 can communicate with mobile device 120 through communication channel 171, mobile device 120 can communicate with point-of-sale terminal 110 through communication channel 172, point-of-sale terminal 110 can communicate with financial institution 150 through communication channel 173, transaction system 140 can communicate with financial institution 150 through a communication channel 174, transaction system 140 can communicate with financial institution 130 through a communication channel 175, mobile wallet provider 160 can communicate with financial institution through communication channel 176, transaction system 140 can communicate with mobile wallet provider through communication channel 177, and/or transaction system 140 can communicate with point-of-sale terminal 110 through communication channel 178. As described above, communication channel 171 can be a wireless data communication channel. In other embodiments, communications between mobile device 120 and point-of-sale terminal 110 can be through done through optical scanning or manual methods, as described above. In many embodiments, communication channels 173, 174, 175, 176, 177, and/or 178 can be through the Internet or other suitable networks. In some embodiments, transaction system 140 does not communicate with mobile wallet provider 160, such that communication channel 177 does not exist. In some embodiments, transaction system 140 does not communicate with point-of-sale terminal, such that communication channel 178 does not exist.

In many embodiments, communication channel 171 can be dependent on mobile device 120 being able to communicate with mobile wallet provider 160. For example, mobile 120 can communicate with the Internet through a cellular data network or through a wireless local area network. If either of these communication channels is unavailable or not working, or if the Internet link to mobile wallet provider 160 is not working, and thus communication channel 171 is not working, mobile device 120 can be called "offline," or unable to communicate with mobile wallet provider 160. When communication channel 171 is working, mobile device 120 can be called "online," or in data communication with mobile wallet provider 160.

In several embodiments, financial institution 130 can generate a preauthorization code that includes a preauthorization amount and, in some embodiments, an expiration time. In many embodiments, the preauthorization code can include a digital signature that indicates that financial institution 130 is the source of the preauthorization code. In many embodiments, preauthorization system 136 can generate the preauthorization code. In a number of embodiments, the preauthorization amount of the preauthorization code can be based on the account balance of one or more consumer accounts 131. For example, the preauthorization amount can be determined by preauthorization system 136 based on the current balance and/or historical trends of the account balance. In several embodiments, the expiration time can be a predetermined length of time, such as 30 minutes, 1 hour, 2 hours, 3 hours, 6 hours, 12 hours, 24 hours, 2 days, 3 days, or 1 week, from the time that the preauthorization code is generated. In other embodiments, the expiration time can be determined based on the account balance, the preauthorization amount, historical trends of the account balance, and/or other factors. In some embodiments, the digital signature can be generated using a suitable digital signature code signing algorithm as part of a digital signature scheme, similarly as described above for the merchant security transaction code. In many embodiments, the preauthorization code can be sent through mobile wallet provider 160 to mobile device 120 and stored in mobile device 120 while mobile device 120 is online. In several embodiments, the preauthorization code can provide a "stand-in" credit in mobile device 120, which can allow consumer 129 to conduct a transaction using mobile device 120 if mobile device 120 is offline at the time of the transaction. For example, the stand-in credit can allow consumer 129 to conduct a transaction that does not exceed the preauthorization amount, provided that the expiration time has not yet passed.

In many embodiments, the preauthorization code can be verified by point-of-sale terminal 110, merchant 119, financial institution 150, and/or transaction system 140. For example, the digital signature in the preauthorization code can be verified to ensure that the preauthorization code was authorized by financial institution 130 and/or mobile wallet provider 160. In some embodiments, this verification can be done at merchant 119, such as in point-of-sale terminal 110, or can be done in financial institution 150 and/or transaction system 140. For example, a public key of financial institution 130 can be used to verify the digital signature.

In many embodiments, merchant account 151 at financial institution 150 can receive payment from consumer account 131 at financial institution 130, based on the verified preauthorization. In some embodiments, a debit pull can be done in real time or later (e.g., in nightly batch processing), but funds can be made available immediately to merchant 151 based on the preauthorized promise from financial institution 130. In other embodiments, the payment can be effectuated later after mobile device 120 comes back online and communicates with mobile wallet provider 160 to initiate the payment, or after a timeout period.

In several embodiments, mobile application 123 can provide information to consumer 129 regarding the status of one or more of consumer accounts 131 and availability of funds in one or more of consumer accounts 131, or the stand-in credit amount stored in mobile device 120. For example, account system 122 of mobile device 120 can obtain information from account system 134 of financial institution 130 regarding one or more of consumer accounts 131 and provide that information to consumer 129. For example, if one of consumer accounts 131 has an available balance and/or available credit of $500, mobile application 123 can communicate the amount of the available funds for one or more of consumer accounts 131 to consumer 129, which can allow consumer 129 to know the amount of the available funds for spending before shopping for items and/or before attempting to purchase items. In a number of embodiments, account system 134 can provide account system 122 with various other information, such as the current status of one or more of consumer accounts 131, such as whether one or more of consumer accounts 131 is open and in good status (or closed), whether one or more of consumer accounts 131 has had recent not sufficient funds (NSF) activity, whether one or more of consumer accounts 131 has a stop payment order, and/or a buying power index of consumer 129 at least partially based on information about one or more of consumer accounts 131.

In some embodiments, mobile application 123 can be used on mobile device 120 at point-of-sale terminal 110 to conduct a transaction. In several embodiments, mobile device 120 can receive the merchant identifier and other transaction information from point-of-sale terminal 110 of merchant 119. The merchant identifier can be associated with merchant account 151 of merchant 119. After receiving the merchant identifier, mobile application 123 can initiate a push payment from one or more of consumer accounts 131 at financial institution 130 to merchant account 151 at financial institution 150 to complete the transaction in real-time before the consumer leaves the store of merchant 119. In many embodiments, mobile device 120 can receive the merchant identifier and other transaction information from point-of-sale terminal 110 as part of the merchant security transaction code.

In various embodiments, authentication system 121 can verify the identity of consumer 129. For example, authentication system 121 can verify the identity of consumer 129 using a personal identification number (PIN), a password, one or more fingerprints, voice recognition, other biometrics (e.g., mobile phone bio-measurements), and/or other suitable authentication methods, to ensure that consumer 129 is authorized to associate mobile application 123 with one or more of consumer accounts 131 and/or make payments using mobile application 123.

In a number of embodiments, when mobile application 123 is used to conduct a transaction, mobile device 120 can be put in the proximity of point-of-sale terminal 110 to allow communication system 124 to receive information from point-of-sale terminal 110, such as the payment amount, the merchant identifier, a transaction identifier, and/or other information, such as the merchant name, the date and time, a list of SKUs (stock keeping units) of the one or more items to be purchased, etc. In many embodiments, mobile device 120 can receive the merchant identifier and other transaction information from point-of-sale terminal 110 as part of the merchant security transaction code. In several embodiments, security system 125 of mobile device 120 can verify the digital signature in the merchant security transaction code. For example, security system 125 can verify the digital signature using a signature verifying algorithm that is part of the same digital signature scheme that was used to digitally sign the merchant security transaction code. For example, a public key for merchant 119 can be used to verify the digital signature and the merchant security transaction code. By verifying the digital signature of the merchant security transaction code, security system 125 can verify that the merchant identifier is from point-of-sale terminal 110 of merchant 119 and is accurate, which can advantageously ensure that the funding from consumer accounts 131 will be sent to an account actually associated with the merchant instead of a fraudster.

In some embodiments, mobile application 123 can be configured to allow one-click checkout, which can be enabled by selecting a button on mobile application 123 or by placing mobile device 120 in the proximity of a data transmitter on point-of-sale terminal 110. In some embodiments, mobile application 123 can be configured to scan items and conduct transactions in real-time as items are taken from the shelf and scanned by mobile device 120 or placed within a "smart" shopping cart, such that checkout can take place in an aisle of the store, rather than at point-of-sale terminal 110. In other embodiments, checkout can take place automatically when consumer 129 exits the store of merchant 119. In a number of embodiments, mobile application 123 can receive the merchant identifier upon entering the store of merchant 119 or from a shopping cart having data transmitted in the store of merchant 119.

In some embodiments, the mobile application 123 can send information from mobile device 120 to point-of-sale terminal 110, such as information regarding consumer 129, such as personally identifiable information, loyalty rewards number(s), shopping patterns, points, buying power index, and/or other suitable information. In several embodiments, consumer information system 114 can process the information provided from mobile application 123 to provide information to merchant 119 regarding consumer 129. In some embodiments, mobile device 120 can communicate information, such as a buying power index, to point-of-sale terminal 110 and/or merchant 119 upon entering the store of merchant 119.

In several embodiments, consumer 129 can decide whether to authorize the transaction using mobile device 120. For example, mobile device 120 can ask consumer 129 to approve the transaction in mobile application 123. In a number of embodiments, mobile application 123 can present the one or more of consumer accounts 131 to consumer 129 to select which of the consumer accounts 131 to use to fund the transaction. In some embodiments, consumer 129 can choose to split the funding of the transaction among multiple accounts. For example, consumer 129 can choose to fund 20% of the transaction from a demand deposit account (e.g., a debit account) and 80% of the transaction from a non-demand deposit account (e.g., by a charge to a credit account). In some embodiments, if an account of the one or more of consumer accounts 131 has an account balance that is less than the amount of the transaction (or the portion of the transaction that consumer 129 has chosen to allocate to the account), loan system 126 of mobile device 120 can determine that there is a deficiency and can present an option to fund the transaction (or a portion of the transaction) using a non-demand deposit account, such as a loan account, a credit account, or a points account. In other embodiments, loan system 126 can present the option for funding the transaction through a non-demand deposit account even if there is no deficiency in the one or more of consumer accounts 129.

In some embodiments, the loan account can be a new account that is created upon consumer 129 choosing to fund the transaction (or portion thereof) with the loan account. In other embodiments, the loan account can be for a previously authorized loan. In some embodiments, the loan account can have a pre-existing loan balance, which can be increased based on the amount of loan used to the fund the transaction. In several embodiments, the loan can be a small loan, and can be labeled a "micro-loan"), but can be treated the same as credit line for a loan instead of an overdraw of an account.

In several embodiments, consumer 129 can make the decision from which account or accounts to fund the transaction, and/or to authorize a loan or a credit transaction, while at or near the point-of-sale terminal 110 in the store of merchant 119. In the same or other embodiments, loan system 126 can allow consumer 129 to choose the one or more accounts from which to fund the transaction after consumer 129 has left the store. In many embodiments, financial institution 130 can fund the transaction temporarily from a shadow account that the bank uses to fund overdraft transaction, which can be reimbursed from the one or more accounts selected by consumer 129. For example, consumer 129 can authorize a transaction at point-of-sale terminal 110 in the store, and financial institution 130 can authorize transfer of funds to financial institution 150 to pay merchant 119, and after consumer 129 leaves the store of merchant 129, loan system 126 can push a message to consumer 129 asking for one or more of consumer accounts 131 that consumer 129 wants to use to fund the transaction. The options of consumer accounts 131 can include the option to open a new loan account, or to add to the balance of an existing loan account. In some embodiments, consumer 129 can setup a list (e.g., prioritized list) of consumer accounts 131 to use for transaction using mobile device 120, and/or can setup before-hand an amount and/or percentage to use from one or more of the accounts. For example, consumer 129 can choose to use a debit account for the first $50 and then use a credit account for the rest. As another example, consumer 129 can choose to use a debit account for 40% of the transaction, and use a new micro-loan for the rest.

In some embodiments, a points account can be used to pay for all or at least a portion of the payment. For example, consumer 129 can have a points account at financial institution 130, which can have a balance of points earned by consumer 129 at financial institution 130. In many embodiments, these points can have an exchange value, such that the points can be redeemed to pay for all or at least a portion of the payment.

In a number of embodiments, if mobile device 120 is offline, the stand-in credit can be presented as an option to fund the transaction. In other embodiments, if mobile device 120 is offline, mobile device 120 can communicate with point-of-sale terminal 110 to communicate through a proxy communication channel. In many embodiments, the proxy communication channel can extend from point-of-sale terminal 110 to mobile wallet provider 160. For example, in some embodiments, the proxy communication channel can comprise communication channels 173, 174, and 177, and can extend through financial institution 150 and transaction system 140.

In other embodiments, the proxy communication channel can comprise communication channels 173, 174, 175, and 176, and can extend through financial institution 150, transaction system 140, and financial institution 130. In still other embodiments, the proxy communication channel can comprise communication channels 178 and 177, and can extend through transaction system 140. In yet other embodiments, the proxy communication channel can comprise communication channels 178, 175, and 176, and can extend through transaction system 140 and financial institution 130. In a number of embodiments, the proxy communication channel also can include communication channel 172, and can extend through point-of-sale terminal 110. When mobile device 120 is offline, communication channel 171 is unavailable, so mobile device 120 can communicate with mobile wallet provider 160 instead using the proxy communication channel.

In many embodiments, proxy communication system 128 can facilitate proxy communications being sent from or received by mobile device 120. In a number of embodiments, proxy communication system 117 can facilitate proxy communications sent from, received by, or through point-of-sale terminal 110. In some embodiments, proxy communication system 154 can facilitate proxy communications through financial institution 150. In several embodiments, proxy communication system 148 can facilitate proxy communications through transaction system 140. In a number of embodiments, proxy communication system 137 can facilitate proxy communications through financial institution 130. In several embodiments, proxy communication system 161 can facilitate proxy communications received by or sent from mobile wallet provider 160.

In several embodiments, communications through the proxy communication channel can be encrypted. For example, a one-way message from mobile device 120 to mobile wallet provider 160 through the proxy communication channel can be encrypted using a public key of mobile wallet provider 160, such that only mobile wallet provider 160 can decrypt the message using the private key of the mobile wallet provider, using a public-key encryption algorithm. In some embodiments, a message from mobile device 120 to mobile wallet provider 160 can be digitally signed by mobile device 120, such that the mobile wallet provider can verify that the message originated from consumer 129 using mobile device 120. In other embodiments, two-way encrypted communications can be established using another suitable cryptographic protocol, such as performing a cryptographic handshake to create a secure encrypted connection through the proxy communication channel using symmetric cryptography with a private key, similar to Transport Layer Security (TLS). When the proxy communication channel is used to send a message from mobile device 120 to mobile wallet provider 160, the message received by mobile wallet provider 160 through the proxy communication channel can be treated the same by mobile wallet provider 160 as a message from mobile device 120 received by mobile wallet provider 160 through communication channel 171.

In many embodiments, after mobile device 120 has communicated with point-of-sale terminal 110 using communication system 124 to receive the merchant identifier and other transaction information, and consumer 129 has authorized the transaction, mobile device 120 can communicate with financial institution 130 and/or transaction system 140, through mobile wallet provider 160 (which, in some embodiments, can be part of financial institution 130 or transaction system 140), to request a payment be made to merchant account 151 of merchant 119 from one or more of consumer accounts 131. When mobile device 120 is online, mobile device 120 can communicate with mobile wallet provider 160 through communication channel 170. In some embodiments, when mobile device 120 is offline, mobile device 120 can communicate with mobile wallet provider 160 through the proxy communication channel described above, and then the request can be sent from mobile wallet provider 160 to financial institution 130. In some such embodiments, mobile device 120 can generate an encrypted transaction code to be sent through the proxy communication channel to mobile wallet provider 160. In many embodiments, the encrypted transaction code can include a preauthorization from consumer 129 to pay a transaction amount. In a number of embodiments, the preauthorization can be digitally signed by mobile device 120, such that the preauthorization can be verified by mobile wallet provider 160. In other embodiments, the stand-in credit can be used, as described above and below in further detail.

In a number of embodiments, when mobile device 120 communicates with financial institution 130 (such as through mobile wallet provider 160, which, in some embodiments, can be part of financial institution 130) to request a payment be made, account system 134 of financial institution 130 can determine account information about merchant account 151, such as the account identifier of merchant account 151, at least partially based on the merchant identifier received from mobile device 120. In some embodiments, financial institution 130 can communicate with transaction system 140) to get the account information about merchant account 151, which can be stored in merchant account database 141. In some embodiments, financial institution 130 can save the account information about merchant account 151 so financial institution does not need to query the account information from merchant account database 141 in transaction system 140 for future transaction involving the same merchant identifier. In other embodiments, financial institution 130 can query for the account information from merchant account database 141 in transaction system 140 for each new transaction, or at occasional and/or regular intervals. In other embodiments, when mobile device 120 communicates with transaction system 140 through mobile wallet provider 160 to request a payment be made, transaction system 140 can provide the account information about merchant account 151 to first financial institution 130. In still other embodiments, mobile device 120 can communicate to mobile wallet provider 160 through the proxy communication channel, as described above.

In many embodiments, having the account information about merchant account 151, financial institution 130 can initiate a payment to financial institution 150 from one or more of consumer accounts 131 to merchant account 151. In several embodiments, before initiating payment, authorization system 133 can determine whether to authorize payment from one or more of consumer accounts 131. For example, financial institution 130 can determine whether the payment amount is within the available funds in one or more of consumer accounts 131, determine whether one or more of consumer accounts 131 is currently open and in good status (or closed), authenticate the identity of consumer 129 using mobile device 120, and/or perform other actions. For example, in some embodiments, authentication system 121 can authenticate the identity of consumer 129, and that information can be communicated from mobile device 120 to financial institution 130. In some embodiments, mobile device 120 can prompt consumer 129 to authenticate before and/or after mobile device 120 receives the merchant identifier and/or the transaction information from point-of-sale terminal 110.

In some embodiments, authorization system 133 can request additional authentication from authentication system 121 (which can be directly through a network between financial institution 130 and mobile device 120, or can be through mobile wallet provider 160 and/or through transaction system 140) after receiving the request for payment from mobile device 120 and/or after receiving the information about merchant 119 and/or merchant account 151. In a number of embodiments, authorization system 133 of financial institution 130 can perform different and/or varying levels of authentication based on various factors. For example, authentication system 121 and/or authorization system 133 can determine whether mobile device 120 used to send the request for payment has been previously used by consumer 129 for transaction with financial institution 130, whether biometrics of the consumer match stored biometrics of consumer 129, whether the requested transaction and associated details (e.g., the identity of merchant 119, the location of merchant 119, the payment amount, the one or more items to be purchased (e.g., a list of SKUs), and/or other suitable factors) are consistent with spending patterns of consumer 129, whether consumer 129 has reported mobile device 120 lost or stolen, whether consumer 129 has reported that credit cards, debit cards, or other information about one or more of consumer accounts 131 have been lost or stolen, and/or other suitable factors. In various embodiments, financial institution 130 can adjust the level of authentication used to verify the identity of consumer 129 based on one or more of these factors, and/or based on the payment amount, the identity of merchant 119, the location of merchant 119, historical spending of consumer 129, and/or other relevant information.

In some embodiments, if one or more of consumer accounts 131 chosen by consumer 129 for the transaction is short on funds or otherwise cannot be fully used, loan system 135 can communicate with loan system 126 to present other funding options to consumer 129, such as the option for a micro-loan to fund all or part of the transaction, as described above.

In many embodiments, after receiving authorization from authorization system 133, financial institution 130 can initiate a payment to financial institution 150 to transfer funds from one or more of consumer accounts 131 to merchant account 151. In a number of embodiments, the payment can be effected by sending payment information regarding a payment to be made to merchant account 151 from one or more of consumer accounts 131. In a number of embodiments, the payment information transferred from financial institution 130 to financial institution 150 can effectuate an authenticated credit push, which can irrevocably satisfy payment to the merchant and/or ensure that the merchant has good funds when consumer 129 leaves the store of merchant 119. For example, the payment can be a settlement credit push of funds for the payment amount from one or more of consumer accounts 131 to merchant account 151, which can be settled immediately. In various embodiments, the payment information transferred from financial institution 130 to financial institution 150 can effectuate a push promise to pay, which can provide an irrevocable guarantee of payment from financial institution 130 to financial institution 150. In several embodiments, for example, the payment can be an ACH (Automated Clearing House) credit push, which can provide an irrevocable funding guarantee.

In many embodiments, the payment and/or the guarantee of payment can be sent in real-time from financial institution 130 to financial institution 150, which can happen for each such transaction. In some embodiments, the settlement of the transaction can happen later, such as in a nightly batch fashion, and in some embodiments, can happen through a different network, such as an ACH network or a credit network. In other embodiments, the real-time payment and/or guarantee of payment can be processed through an ACH network or a credit network. In some embodiments, the consumer can provide instructions to financial institution 130 to label the transaction as a debit or a credit transaction in one or more of consumer accounts 131, and in some embodiments can provide such instructions with the request to pay, or before or after the request to pay. In some embodiments, a credit transaction can be treated as a micro-loan, as described above. In certain embodiments, a debit pull with guaranteed promise to pay can be used, such that financial institution 150 can receive a guaranteed promise to pay from financial institution 130 and pull the funds using a debit pull.

In various embodiments, transaction system 140 can store information regarding each transaction in transaction database 142. In several embodiments, transaction system 140 can serve as a central auditor for transactions between the financial institutions (e.g., 130, 150) in data communication with transaction system 140. In some embodiments, transaction system 140 can receive some or all of the information from the merchant security transaction code. In various embodiments, one or more portions of the merchant security transaction code can be encrypted by security system 115. For example, the merchant security transaction code can include an encrypted portion that can be decrypted by security system 146 of transaction system 140, which can be used to ensure that the message has not been tampered. In other embodiments, the merchant security transaction code is not encrypted, but is digitally signed, as described above, and the digital signature can be verified, in some embodiments, by security system 146, which can advantageously ensure that the merchant identifier correctly identifies merchant 119, so that the funds are paid to merchant account 151 corresponding to merchant 119.

Figure 22:
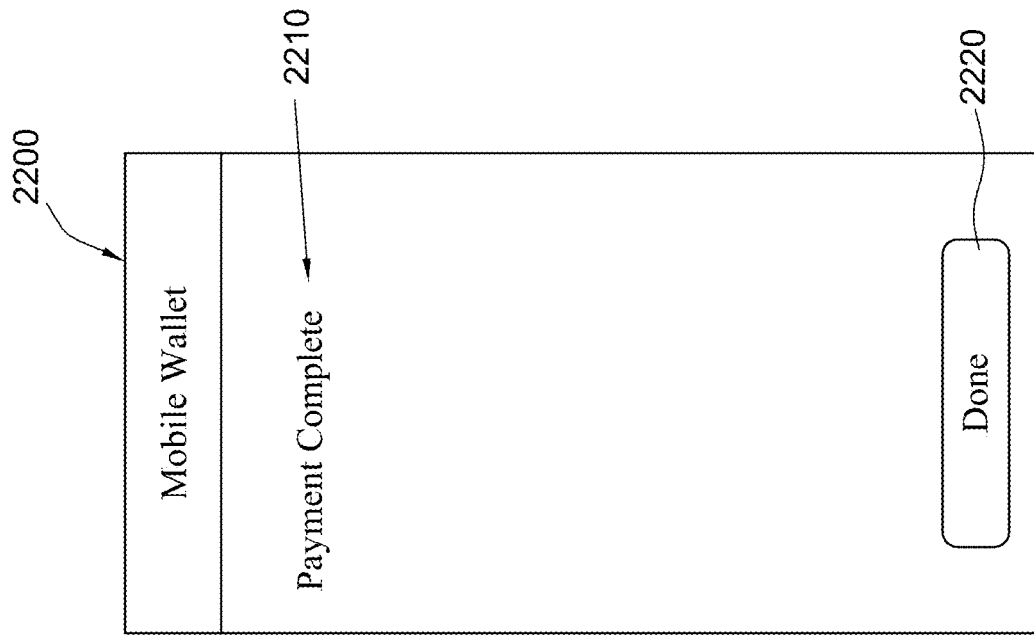
FIG. 22 illustrates an exemplary user interface display to confirm that the payment transaction to the merchant of FIG. 1 has successfully completed.

In a number of embodiments, financial institution 150, upon receiving payment and/or guarantee of payment, can notify point-of-sale terminal 110 and/or merchant 119 in real-time that merchant 119 has satisfactorily received payment from consumer 129. For example, the notification can include various information, such as the transaction identifier, the amount received in payment (or guarantee), the merchant identifier, and/or other information. Receiving the notice of good funds can allow merchant 119 to proceed, such as, for example, to allow consumer to leave the store of merchant 119 with the items. In some embodiments, for example, point-of-sale terminal 110 can match the notification to the pending transaction in point-of-sale terminal 110 using the transaction identifier. In certain embodiments, merchant 119 can match the notification to the point-of-sale terminal using the merchant identifier. In some embodiments, consumer 129 can receive a notification on mobile device 120 that the transaction has cleared, such as shown in FIG. 22 and described below.

In several embodiments, system 100 can advantageously provide a number of technological improvements that can overcome technological problems in conventional systems. For example, in several embodiments, system 100 can beneficially allow consumer 129 to send payment directly and/or immediately to merchant 119 when consumer 129 is checking out at point-of-sale terminal 110. In many embodiments, the payment systems and methods provided by system 100 described herein can eliminate the acquirer model that is conventionally used in payment card transactions. In several embodiments, the payment systems and methods provided by system 100 described herein can advantageously streamline payments by eliminating the need for the financial institution (i.e., the acquirer) of merchant 119 to request payment from the financial institution (i.e., the issuer) of consumer 129. For example, in many embodiments, financial institution 150 does not need to request payment from financial institution 130. In many embodiments, the payment systems and methods provided by system 100 described herein can beneficially ensure merchants (e.g., merchant 119) are paid by consumers (e.g., consumer 129) while eliminating and/or reducing many of the transaction fees paid to various entities in the conventional model.

In a number of embodiments, the payment systems and methods provided by system 100 described herein can advantageously eliminate the chargeback liability of merchants for fraudulent transactions. In the conventional acquirer-issuer model, the merchant (e.g., 119) is responsible for verifying the credit or debit card to ensure that the card is not being used fraudulently. In several embodiments, the payment systems and methods provided by system 100 described herein can beneficially place the liability on the financial institution (e.g., 130) of the consumer (e.g. 129), which can be in a better position (e.g., with more and/or better information) than the merchant (e.g., 119) to determine if the request to pay is a legitimate, authentic transaction requested by the consumer (e.g., 129) and/or if the consumer's account is still open and in good status (or closed), has sufficient funds, etc. In various embodiments, the payment systems and methods provided by system 100 described herein can advantageously allow the financial institution (e.g., 130) of the consumer (e.g., 129) to choose how to authenticate the consumer (e.g., 129), and/or can beneficially allow the financial institution (e.g., 130) of the consumer (e.g., 129) to choose the level of authentication, which can be tailored for each consumer (e.g., 129) and/or for each transaction (e.g., the financial institution (e.g., 130) can decide, at least partially based on its risk determination, that a transaction with a higher payment amount warrants a higher level of authentication). In several embodiments, the liability for fraudulent use of one or more of the consumer accounts (e.g., 131) can be placed on the consumer (e.g., 129), and/or the consumer (e.g., 129) can choose the level of authentication used by the financial institution (e.g., 130) of the consumer (e.g., 129). In many embodiments, unauthorized access to one or more of consumer accounts 131 can beneficially be reduced and/or eliminated using the payment method provided by system 100 and described herein.

In several embodiments, the payment systems and methods provided by system 100 described herein can beneficially provide the ability for financial institution 130 to communicate directly with consumer 129 at point-of-sale terminal 110 when making a transaction. In many embodiments, the payment systems and methods provided by system 100 described herein can provide information to consumer 129, such as account balance, insufficient funds, lock/freeze on one or more of consumer accounts 131, etc., in real-time before consumer 129 requests payments, which can advantageously eliminate and/or reduce negative experiences of consumer 129, such as attempting to transact with insufficient funds or a freeze on one or more of consumer accounts 131. In a number of embodiments, the payment systems and methods provided by system 100 described herein can beneficially provide consumer 129 with the ability the ability to split the payment with one or more other accounts or a new loan, such as a micro-loan, which can allow consumer 129 to successfully make the payment and reduce negative experiences of consumer 129.

In some embodiments, account information about one or more of consumer accounts 131 can beneficially be better protected from theft by the payment systems and methods provided by system 100 described herein, because, in a number of embodiments, the account information of one or more of consumer accounts 131 and/or personally identifiable information of consumer 129 can be undisclosed to third parties other than financial institution 130, which maintains consumer accounts 131. For example, in some embodiments, the account information of consumer accounts 131 and/or personally identifiable information of consumer 129 can be undisclosed to point-of-sale terminal 110, merchant 119, transaction system 140, and/or financial institution 150. In many embodiments, the account identifier (e.g., account number) of consumer accounts 131 is not sent across any networks, but resides solely in financial institution 130, which can beneficially prevent that information from being stolen. For example, the many recent large-scale data breaches of merchant systems that have exposed consumer account information and personally identifiable information of millions of consumers could have been mitigated by using the payment systems and methods provided by system 100 and described herein.

In other embodiments, consumer 129 can choose to provide account information of one or more of consumer accounts 131 and/or personally identifiable information of consumer 129 to one or more third parties. For example, in some embodiments consumer 129 can set privacy instructions in mobile device 120 and/or with financial institution 130 regarding what information can be disclosed to third parties. For example, consumer 129 can elect to disclose certain information to merchant 119 in order to receive discounts, point, and/or other perks from merchant 119. For example, in some embodiments, financial institution 130 can send certain personally identifiable information of consumer 129 through transaction system 140 to financial institution 150 along with the payment information, and financial institution 150 can provide the information to merchant 119. In the same or other embodiments, mobile device 120 can provide certain personally identifiable information of consumer 129 to merchant 119, such as through the wireless data communication protocol. Examples of such personally identifiably information can include a name, a home address, a telephone number, a social security number, a tax identification number, an age, an income level, marital status, a number of dependents, a frequent shopper identifier, shopping preferences, etc.

In various embodiments, the payment systems and methods provided by system 100 described herein also can beneficially shield the account information about merchant account 151 from being disclosed outside a network of financial institutions (e.g., 130, 150) and transaction system 140, which can beneficially prevent theft and misuse of the account information about merchant account 151.

In a number of embodiments, the payment systems and methods provided by system 100 described herein can advantageously allow mobile device 120 to make a payment to merchant 119 when mobile device 120 is offline or unable to communicate with mobile wallet provider 160. For example, as described herein, mobile device 120 can store a stand-in credit that can be used to initiate payment when mobile device 120 cannot communicate with mobile wallet provider 160 and/or when financial institution 130 is unavailable for communication. As another example, as described herein, mobile device can communicate to point-of-sale terminal to communicate through a proxy communication channel to mobile wallet provider 160.

Figure 2:
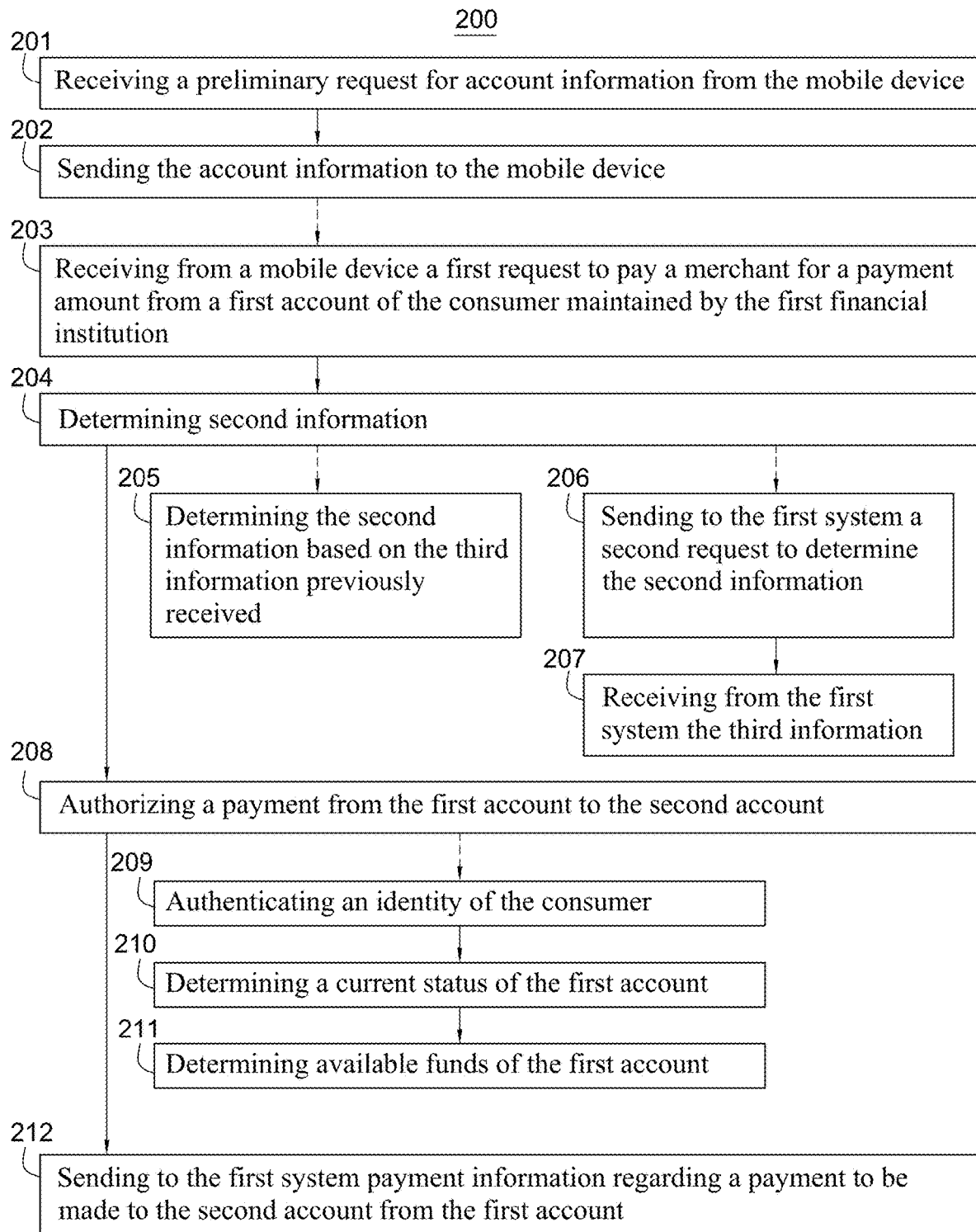
FIG. 2 illustrates a flow chart for a method, according to an embodiment.

Turning ahead in the drawings, FIG. 2 illustrates a flow chart for a method 200, according to an embodiment. In some embodiments, method 200 can be a method of facilitating secure payment transactions. Method 200 is merely exemplary and is not limited to the embodiments presented herein. Method 200 can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in any suitable order. In still other embodiments, one or more of the procedures, the processes, and/or the activities of method 200 can be combined or skipped. In some embodiments, method 200 can be performed by financial institution 130 (FIG. 1).

Referring to FIG. 2, in some embodiments, method 200 can optionally include one or more preliminary blocks, such as a block 201 and a block 202, described below. Specifically, method 200 can include block 201 of receiving, at a first financial institution from a mobile device, a preliminary request for account information. The first financial institution can be similar or identical to financial institution 130 (FIG. 1). The mobile device can be similar or identical to mobile device 120 (FIG. 1).

In several embodiments, method 200 additionally can include block 202 of sending, from the first financial institution to the mobile device, the account information. In some embodiments, the account information can include an account balance and an account status of a first account. The first account can be similar or identical to one or more of consumer accounts 131 (FIG. 1).

In a number of embodiments, method 200 further optionally can include a block 203 of receiving, at a first financial institution from a mobile device of a consumer, a first request to pay a merchant for a payment amount from a first account of the consumer maintained by the first financial institution. The consumer can be similar or identical to consumer 129 (FIG. 1). The merchant can be similar or identical to merchant 119 (FIG. 1). In many embodiments, the first request can include first information, which can include a merchant identifier, a transaction identifier, and/or the payment amount. In several embodiments, the first information can be sent to the first financial institution from a mobile application running on a mobile device used by the consumer at a store of the merchant to pay for one or more items to be purchased from the merchant by the consumer for the payment amount. The mobile application can be similar or identical to mobile application 123 (FIG. 1). In some embodiments, the one or more items to be purchased can include at least one of one or more products or one or more services. In many embodiments, the merchant identifier can be associated with the merchant. In a number of embodiments, the mobile application can be associated with the first account. In some embodiments, the merchant identifier can uniquely correspond to a point-of-sale terminal at the store of the merchant. In various embodiments, the merchant identifier can be obtained by the mobile device from the point-of-sale terminal using a proximity-based wireless data communication protocol.

In many embodiments, method 200 additionally can include a block 204 of determining, at the first financial institution, second information. In many embodiments, the second information can include an account identifier of a second account of the merchant maintained by a second financial institution, at least partially based on the merchant identifier and third information obtained from a first system. The second account can be similar or identical to merchant account 151 (FIG. 1). The second financial institution can be similar or identical to financial institution 150 (FIG. 1). The first system can be similar or identical to transaction system 140 (FIG. 1). In a number of embodiments, the account identifier can be or include an account number. In some embodiments, the first system can be in data communication with the first financial institution and the second financial institution. In many embodiments, the first system can be maintained by an entity that is different from the first financial institution and the second financial institution. In some embodiments, the second information further can include a name of the merchant and/or a location of the store of the merchant.

In some embodiments, block 204 of determining second information optionally can include a block 205 of determining, at the first financial institution, the second information at least partially based on the merchant identifier and the third information. In a number of embodiments, the third information can be received by the first financial institution from the first system prior to receiving the first request to pay the merchant from the mobile device. For example, the third information can be stored at the first financial institution from a previous query to the first system. In many embodiments, the third information can include the account identifier of the second account. In some embodiments, the second information can include the third information.

In other embodiments, block 204 of determining second information optionally can include a block 206 and a block 207, described below. For example, block 204 can include block 206 of sending, from the first financial institution to the first system, a second request to determine the second information. In several embodiments, the second request can include the merchant identifier.

In these same other embodiments, block 204 can include block 207 of receiving, at the first financial institution from the first system, the third information. The third information can include the account identifier of the second account. In many embodiments, the second information can include the third information.

In some embodiments, method 200 can continue after block 204 with a block 208 of authorizing, at the first financial institution, a payment from the first account to the second account.

In a number of embodiments, block 208 of authorizing the payment from the first account to the second account optionally can include blocks 209, 210, and 211. Block 209 can include authenticating an identity of the consumer that used the mobile device to send the first request to pay the merchant from the first account. In some embodiments, block 209 of authenticating the identity of the consumer can include authenticating the identity of the consumer based at least in part on whether the mobile device used to send the first request has previously been used by the consumer in transaction involving the first financial institution, whether biometrics of the consumer using the mobile device match stored biometrics of the consumer, and/or whether at least one of an identity of the merchant, a location of the merchant, or the payment amount is consistent with historical patterns of behavior by the consumer.

In a number of embodiments, the first information further can include the one or more items to be purchased, and block 209 of authenticating the identity of the consumer further can include authenticating the identity of the consumer based at least in part on the one or more items to be purchased by the consumer for the payment amount from the merchant.

In a number of embodiments, block 209 of authenticating the identity of the consumer further can include adjusting a level of authentication at least partially based on the payment amount to be paid to the merchant, whether the mobile device used to send the first request has previously been used by the consumer in transaction involving the first financial institution, whether biometrics of the consumer using the mobile device match stored biometrics of the consumer, and/or whether at least one of an identity of the merchant, a location of the merchant, the payment amount, or the one or more items to be purchased is consistent with historical patterns of behavior by the consumer.

In many embodiments, block 210 can include determining a current status of the first account. For example, the first financial institution can determine whether the first account is open and in good status, or has a freeze or hold status.

In several embodiments, block 211 can include determining available funds of the first account. For example, the first financial institution can use the determination of the available funds of the first account to determine whether the payment amount can be covered by the available funds of the first account.

In a number of embodiments, method 200 can continue after block 208 with a block 212 of sending, from the first financial institution to the first system, payment information regarding a payment to be made to the second account from the first account. In several embodiments, the payment information can be routed through the first system to the second financial institution such that the second financial institution, upon receiving the payment information, can notify the merchant in order to satisfy an expectation of the merchant for payment from the consumer. In some embodiments, the payment information can include the transaction identifier, the account identifier of the second account, and/or the payment amount. In a number of embodiments, the payment information can include the merchant identifier.

In some embodiments, the payment information further can include a settlement credit push of funds for the payment amount from the first account to the second account. In other embodiments, the payment information further can include an irrevocable promise to pay the payment amount from the first account to the second account. In several embodiments, the payment information further can include a set of personally identifiable information of the consumer. In a number of embodiments, the set of personally identifiable information can be at least partially based on privacy instructions sent by the consumer to the first financial institution.

Figure 3:
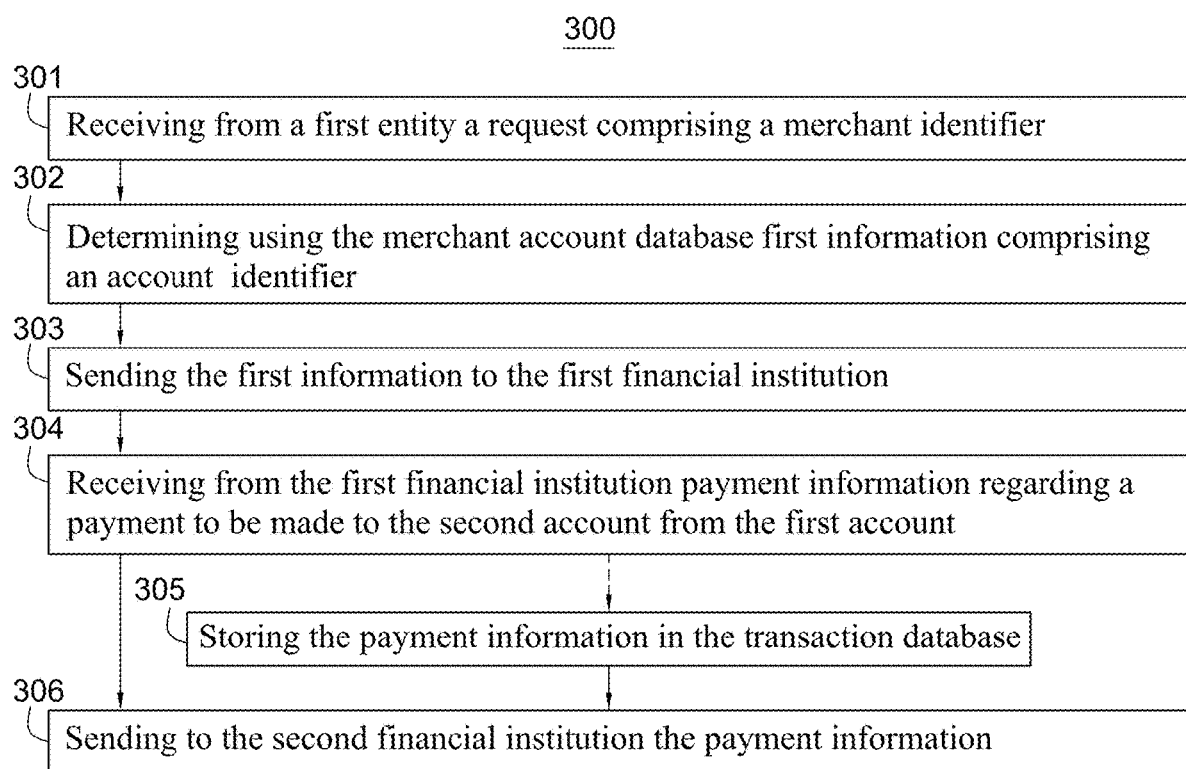
FIG. 3 illustrates a flow chart for a method, according to another embodiment.

Turning ahead in the drawings, FIG. 3 illustrates a flow chart for a method 300, according to an embodiment. In some embodiments, method 300 can be a method of facilitating secure payment transactions. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the procedures, the processes, and/or the activities of method 300 can be performed in any suitable order. In still other embodiments, one or more of the procedures, the processes, and/or the activities of method 300 can be combined or skipped. In some embodiments, method 300 can be performed by transaction system 140 (FIG. 1).

Referring to FIG. 3, method 300 can include a block 301 of receiving, at a first system from a first entity, a request. The first system can be similar or identical to transaction system 140 (FIG. 1). In some embodiments, the first entity can be a first financial institution. The first financial institution can be similar or identical to financial institution 130 (FIG. 1). In other embodiments, the first entity can be a mobile device being used by a consumer. In yet other embodiments, the first entity can be a mobile wallet provider in data communication with the mobile device being used by the consumer. In a number of embodiments, the request can include a merchant identifier. In several embodiments, the merchant identifier can be associated with a merchant. The merchant can be similar or identical to merchant 119 (FIG. 1). In many embodiments, the first system can be in data communication with the first financial institution and a second financial institution. The second financial institution can be similar or identical to financial institution 150 (FIG. 1). In various embodiments, the first system can be maintained by an entity that is different from the first financial institution and the second financial institution. In some embodiments, the first financial institution can maintain a first account of a consumer. The first account can be similar or identical to one or more of consumer accounts 131 (FIG. 1). The consumer can be similar or identical to consumer 129 (FIG. 1). In many embodiments, the first system can be in data communication with a merchant account database. The merchant account database can be similar or identical to merchant account database 141 (FIG. 1). In a number of embodiments, the first system can include the merchant account database In some embodiments, the first system can include a transaction database. The transaction database can be similar or identical to transaction database 142 (FIG. 1). In a number of embodiments, the merchant identifier can uniquely correspond to a point-of-sale terminal at the store of the merchant. In various embodiments, the merchant identifier can be obtained by the mobile device from the point-of-sale terminal using a proximity-based wireless data communication protocol.

In many embodiments, method 300 additionally can include a block 302 of determining, at the first system, using the merchant account database, first information. In several embodiments, the first information can include an account identifier of a second account of the merchant maintained by a second financial institution. The second account can be similar or identical to merchant account 151 (FIG. 1). The second financial institution can be similar or identical to financial institution 150 (FIG. 1). In some embodiments, the account identifier can be associated with the merchant identifier in the merchant account database. In a number of embodiments, the first information further can include a name of the merchant and/or a location of a store of the merchant.

In many embodiments, method 300 further can include a block 303 of sending the first information from the first system to the first financial institution.

In several embodiments, method 300 additionally can include a block 304 of receiving, at the first system from the first financial institution, payment information regarding a payment to be made to the second account from the first account to pay the merchant for one or more items to be purchased from the merchant by the consumer for the payment amount. In a number of embodiments, the consumer can use a mobile device at the store of the merchant to pay for the one or more items. The mobile device can be similar or identical to mobile device 120 (FIG. 1). In some embodiments, the mobile device can be running a mobile application associated with the first account. The mobile application can be similar or identical to mobile application 123 (FIG. 1). In many embodiments, the payment information can include a transaction identifier, the account identifier of the second account, and/or the payment amount. In a number of embodiments, the one or more items to be purchased can include at least one of one or more products or one or more services.

In a number of embodiments, method 300 optionally can include a block 305 of storing the payment information in the transaction database.

In many embodiments, method 300 can continue after block 304 with a block 306 of sending, from the first system to the second financial institution, the payment information such that the second financial institution, upon receiving the payment information, notifies the merchant to satisfy an expectation of the merchant for payment from the consumer.

In some embodiments, the payment information further can include a settlement credit push of funds for the payment amount from the first account to the second account. In other embodiments, the payment information further can include an irrevocable promise to pay the payment amount from the first account to the second account. In several embodiments, the payment information further can include a set of personally identifiable information of the consumer. In a number of embodiments, the set of personally identifiable information can be at least partially based on privacy instructions sent by the consumer to the first financial institution.

Figure 4:
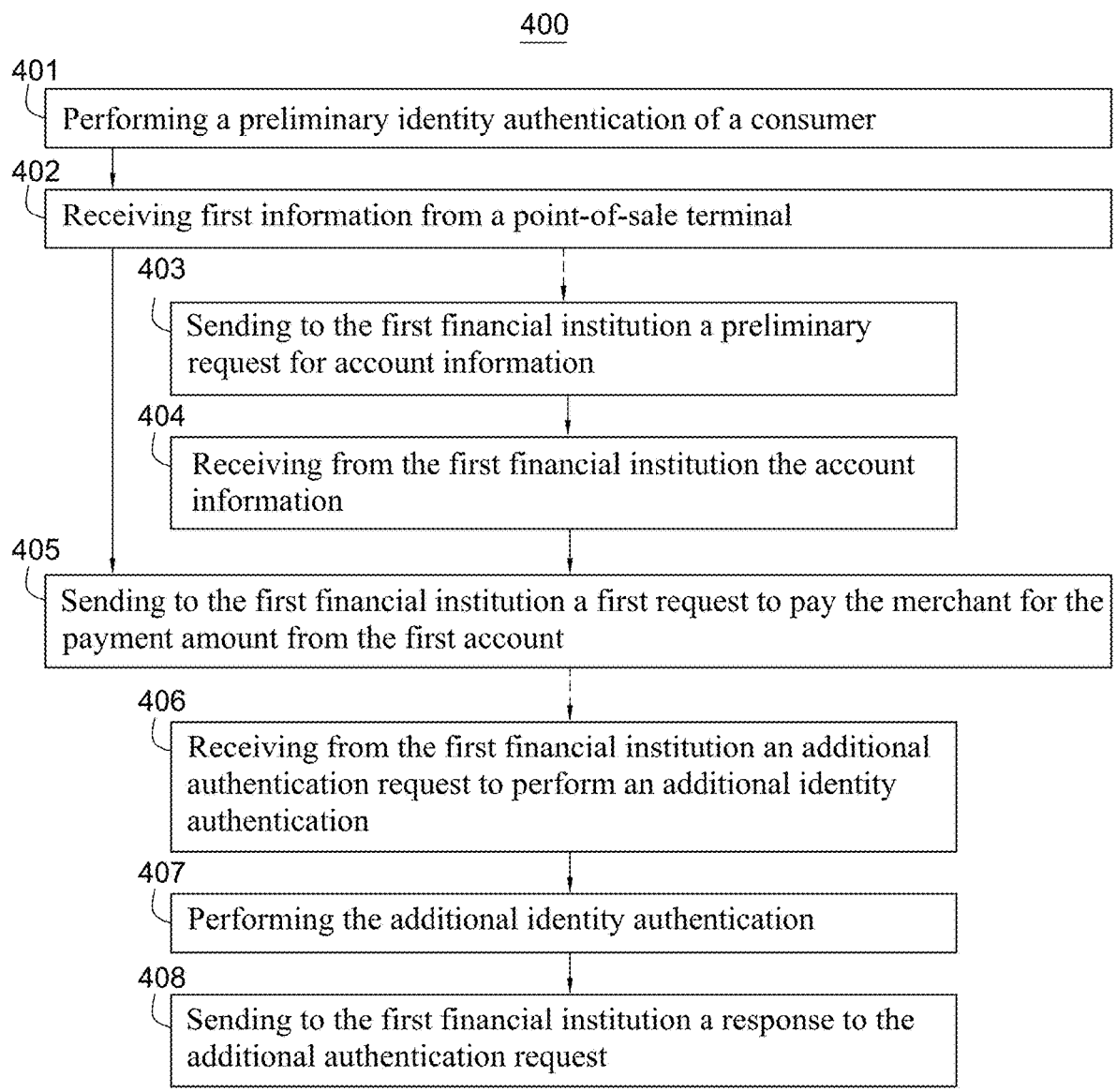
FIG. 4 illustrates a flow chart for a method, according to another embodiment.

Turning ahead in the drawings, FIG. 4 illustrates a flow chart for a method 400, according to an embodiment. In some embodiments, method 400 can be a method of facilitating secure payment transactions. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In some embodiments, method 400 can be performed by mobile device 120 (FIG. 1).

Referring to FIG. 4, method 400 can include a block 401 of performing, at a mobile device, a preliminary identity authentication of a consumer using the mobile device. The mobile device can be similar or identical to mobile device 120 (FIG. 1). The consumer can be similar or identical to consumer 129 (FIG. 1).

In many embodiments, method 400 additionally can include a block 402 of receiving at the mobile device first information from a point-of-sale terminal. The point-of-sale terminal can be similar or identical to point-of-sale terminal 110 (FIG. 1). In several embodiments, the first information can include a merchant identifier, a transaction identifier, and/or a payment amount. In some embodiments, the merchant identifier can uniquely correspond to the point-of-sale terminal at a store of a merchant. The merchant can be similar or identical to merchant 119 (FIG. 1). In a number of embodiments, the mobile device can run a mobile application that is associated with a first account of the consumer using the mobile device. The mobile application can be similar or identical to mobile application 123 (FIG. 1). The first account can be similar or identical to one or more of consumer accounts 131 (FIG. 1). In several embodiments, the first account of the consumer can be maintained by a first financial institution. The first financial institution can be similar or identical to financial institution 130 (FIG. 1).

In some embodiments, method 400 optionally can include various blocks before or after block 402 of receiving at the mobile device first information from a point-of-sale terminal. For example, method 400 optionally can include a block 403 of sending, from the mobile device to the first financial institution, a preliminary request for account information. In several embodiments, the account information can include an account balance and an account status of the first account.

In a number of embodiments, method 400 further optionally can include, after block 403 of sending the preliminary request for account information, a block 404 of receiving, at the mobile device from the first financial institution, the account information.

In many embodiments, method 400 can continue after block 402 with a block 405 of sending, from the mobile device to the first financial institution, a first request to pay the merchant for the payment amount from the first account for one or more items to be purchased from the merchant by the consumer. In a number of embodiments, the first request can include the first information, such that the first financial institution, upon receiving the first request, can determine second information including an account identifier of a second account of the merchant maintained by a second financial institution, at least partially based on the merchant identifier and third information obtained from a first system, and such that the first financial institution can send to the first system payment information regarding a payment to be made to the second account from the first account. The second account can be similar or identical to merchant account 151 (FIG. 1). The second financial institution can be similar or identical to financial institution 150 (FIG. 1). The first system can be similar or identical transaction system 140 (FIG. 1).

In a number of embodiments, the payment information can be routed through the first system to the second financial institution such that the second financial institution, upon receiving the payment information, can notify the merchant to satisfy an expectation of the merchant for payment from the consumer. In several embodiments, the first system can be in data communication with the first financial institution and the second financial institution. In various embodiments, the first system can be maintained by an entity that is different from the first financial institution and the second financial institution. In a number of embodiments, the payment information can include the transaction identifier, the account identifier of the second account, and the payment amount. In some embodiments, the payment information further can include one of: (a) a settlement credit push of funds for the payment amount from the first account to the second account, or (b) an irrevocable promise to pay the payment amount from the first account to the second account.

In some embodiments, method 400 optionally can include additional blocks after sending the first request to pay the merchant and before the payment information is sent to the first system from the first financial institution. For example, in a number of embodiments, after block 405, method 400 optionally can include a block 406 of receiving, at the mobile device from the first financial institution, an additional authentication request to perform an additional identity authentication of the consumer using the mobile device.

In various embodiments, method 400 optionally further can include a block 407 of performing, at the mobile device, the additional identity authentication of the consumer using the mobile device. In many embodiments, block 407 can include performing the additional authentication of the consumer based at least in part on determining biometrics of the consumer using the mobile device and/or requesting the consumer to enter additional information in the mobile device.

In several embodiments, method 400 optionally and additionally can include a block 408 of sending, from the mobile device to the first financial institution, a response to the additional authentication request.

Figure 5:
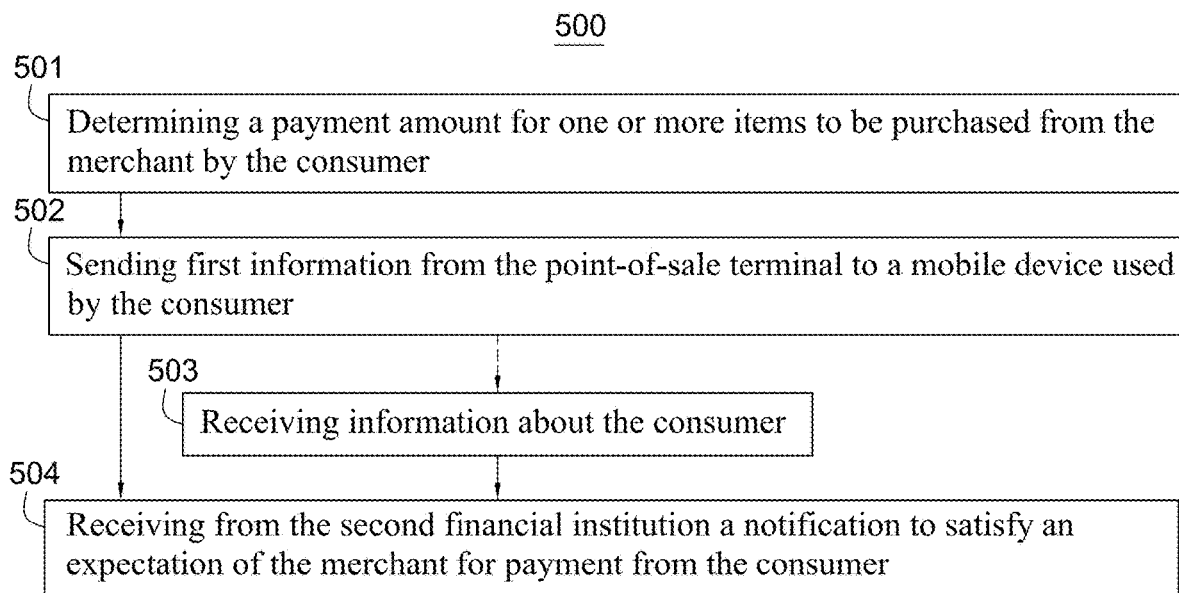
FIG. 5 illustrates a flow chart for a method, according to another embodiment.

Turning ahead in the drawings, FIG. 5 illustrates a flow chart for a method 500, according to an embodiment. In some embodiments, method 500 can be a method of facilitating secure payment transactions. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, method 500 can be performed by point-of-sale terminal 110 (FIG. 1).

Referring to FIG. 5, method 500 can include a block 501 of determining, at a point-of-sale terminal at a store of a merchant, a payment amount for one or more items to be purchased from the merchant by a consumer. The point-of-sale terminal can be similar or identical to point-of-sale terminal 110 (FIG. 1). The merchant can be similar or identical to merchant 119 (FIG. 1). The consumer can be similar or identical to consumer 129 (FIG. 1).

In several embodiments, method 500 additionally can include a block 502 of sending first information from the point-of-sale terminal to a mobile device used by the consumer. The mobile device can be similar or identical to mobile device 120 (FIG. 1). In a number of embodiments, the first information can be sent from the point-of-sale terminal to the mobile device using a proximity-based wireless data protocol. In several embodiments, the first information can include a merchant identifier, a transaction identifier, and/or the payment amount. In a number of embodiments, the merchant identifier can uniquely correspond to the point-of-sale terminal at the store of the merchant. In various embodiments, the mobile device can run a mobile application that is associated with a first account of the consumer using the mobile device. The mobile application can be similar or identical to mobile application 123 (FIG. 1). The first account can be similar or identical to one or more of consumer accounts 131 (FIG. 1). In a number of embodiments, the first account of the consumer can be maintained by a first financial institution. The first financial institution can be similar or identical to financial institution 130 (FIG. 1). In several embodiments, the mobile device, upon receiving the first information, can send a first request to pay the merchant for the payment amount from the first account. In a number of embodiments, the first request can include the first information, such that the first financial institution, upon receiving the first request, can determine second information including an account identifier of a second account of the merchant maintained by a second financial institution, at least partially based on the merchant identifier and third information obtained from a first system, and such that the first financial institution sends to the first system payment information regarding a payment to be made to the second account from the first account. The second account can be similar or identical to merchant account 151 (FIG. 1). The second financial institution can be similar or identical to financial institution 150 (FIG. 1). The first system can be similar or identical to transaction system 140 (FIG. 1).

In some embodiments, the payment information can be routed through the first system to the second financial institution. In various embodiments, the first system can be in data communication with the first financial institution and the second financial institution. In many embodiments, the first system can be maintained by an entity that is different from the first financial institution and the second financial institution. In several embodiments, the payment information can include the transaction identifier, the account identifier of the second account, and/or the payment amount. in some embodiments, the payment information further can include one of: (a) a settlement credit push of funds for the payment amount from the first account to the second account, or (b) an irrevocable promise to pay the payment amount from the first account to the second account.

In various embodiments, method 500 optionally can include a block 503 of receiving at the point-of-sale terminal from the mobile device, information about the consumer. In some embodiments, block 503 can be performed before or after block 501 of determining the payment amount for the one or more items to be purchased from the merchant by the consumer, before or after block 502 of sending the first information from the point-of-sale terminal to the mobile device used by the consumer, or before or after block 504, described below.

In many embodiments, method 500 can continue after block 502 with a block 504 of receiving, at the point-of-sale terminal from the second financial institution, a notification to satisfy an expectation of the merchant for payment from the consumer.

Figure 6:
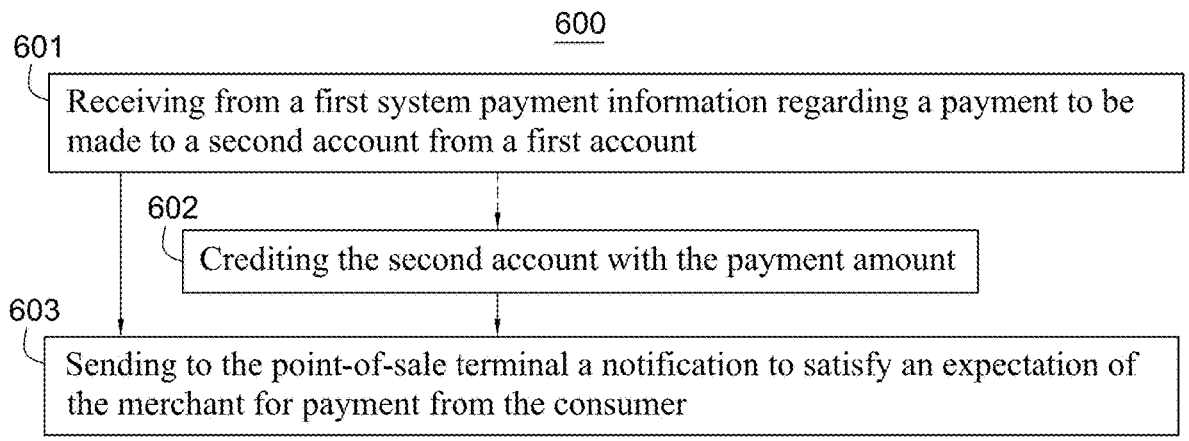
FIG. 6 illustrates a flow chart for a method, according to another embodiment.

Turning ahead in the drawings, FIG. 6 illustrates a flow chart for a method 600, according to an embodiment. In some embodiments, method 600 can be a method of facilitating secure payment transactions. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In some embodiments, method 600 can be performed by financial institution 150 (FIG. 1).

Referring to FIG. 6, method 600 can include a block 601 of receiving, at a second financial institution from a first system, payment information regarding a payment to be made to a second account of a merchant maintained by the second financial institution from a first account of a consumer maintained by a first financial institution to pay the merchant for one or more items to be purchased from the merchant by the consumer for the payment amount. The second financial institution can be similar or identical to financial institution 150 (FIG. 1). The first system can be similar or identical to transaction system 140 (FIG. 1). The second account can be similar or identical to merchant account 151 (FIG. 1). The first account can be similar or identical to one or more of consumer accounts 131 (FIG. 1). The consumer can be similar or identical to consumer 129 (FIG. 1). The first financial institution can be similar or identical to financial institution 130 (FIG. 1).

In a number of embodiments, the payment information can be sent from the first financial institution to the first system and routed through the first system to the second financial institution. In several embodiments, the first system can be in data communication with the first financial institution and the second financial institution. In various embodiments, the first system can be maintained by an entity that is different from the first financial institution and the second financial institution. In many embodiments, the consumer can use a mobile device at a store of the merchant to pay for the one or more items. The mobile device can be similar or identical to mobile device 120 (FIG. 1). In a number of embodiments, the mobile device can run a mobile application associated with the first account. The mobile application can be similar or identical to mobile application 123 (FIG. 1). In several embodiments, the payment information can include a transaction identifier, an account identifier of the second account, and/or the payment amount. In a number of embodiments, the first financial institution can determine the account identifier of the second account based on a merchant identifier and based on third information obtained from the first system. In several embodiments, the merchant identifier can uniquely correspond to a point-of-sale terminal at the store of a merchant. The point-of-sale terminal can be similar or identical to point-of-sale terminal 110 (FIG. 1).

In a number of embodiments, the mobile device can send a request to pay the merchant for the payment amount from the first account. In many embodiments, the request can include first information including the merchant identifier, a transaction identifier, and/or the payment amount. In several embodiments, the payment information further can include one of: (a) a settlement credit push of funds for the payment amount from the first account to the second account, or (b) an irrevocable promise to pay the payment amount from the first account to the second account.

In several embodiments, method 600 optionally can include a block 602 of crediting the second account with the payment amount. For example, after the second financial institution has received the payment information, the second account can be credited with the payment amount.

In many embodiments, method 600 can continue after block 601 with a block 603 of sending, from the second financial institution to the point-of-sale terminal, a notification to satisfy an expectation of the merchant for payment from the consumer. In some embodiments, block 603 can include notifying the merchant that funds for the payment amount are immediately available in the second account.

Figure 9:
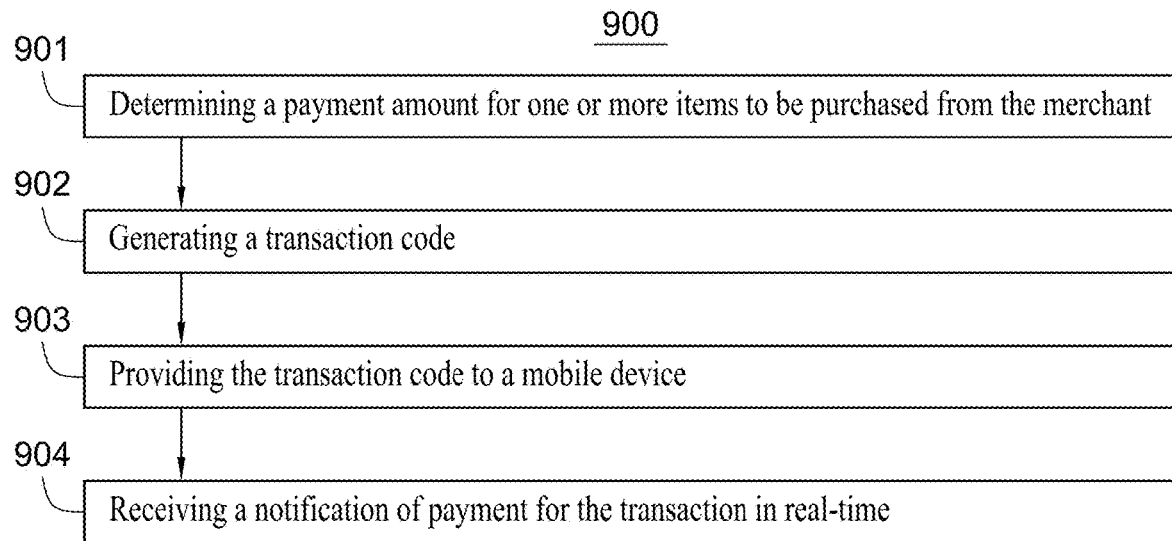
FIG. 9 illustrates a flow chart for a method, according to another embodiment.

Jumping ahead in the drawings, FIG. 9 illustrates a flow chart for a method 900, according to an embodiment. In some embodiments, method 900 can be a method of facilitating secure payment transactions. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In some embodiments, method 900 can be performed by point-of-sale terminal 110 (FIG. 1). In some embodiments, method 900 and other blocks in method 900 can include using a distributed network including distributed memory architecture to perform the associated activity. This distributed architecture can reduce the impact on the network and system resources to reduce congestion in bottlenecks while still allowing data to be accessible from a central location.

Referring to FIG. 9, method 900 can include a block 901 of determining, at a point-of-sale terminal at a store of a merchant, a payment amount for one or more items to be purchased from the merchant by a consumer in a transaction. The point-of-sale terminal can be similar or identical to point-of-sale terminal 110 (FIG. 1). The merchant can be similar or identical to merchant 119 (FIG. 1). The consumer can be similar or identical to consumer 129 (FIG. 1).

In several embodiments, method 900 also can include a block 902 of generating a transaction code including a merchant public identifier, the payment amount, a transaction identifier for the transaction, and a digital signature. In many embodiments, the transaction code can be similar or identical to the merchant security transaction code described above. In some embodiments, the transaction code can further include one or more SKUs for the one or more items to be purchased in the transaction. In some embodiments, the digital signature can be similar or identical to the digital signature described above. In many embodiments, the merchant public identifier can be similar to the merchant identifier described above. For example, in many embodiments, the merchant identifier can be setup and/or registered through a transaction system, such as transaction system 140 (FIG. 1).

In some embodiments, block 902 of generating a transaction code including a merchant public identifier can include point-of-sale terminal 110 (FIG. 1) cryptographically signing the digital signature for the transaction code. In other embodiments, block 902 of generating a transaction code including a merchant public identifier can include point-of-sale terminal 110 (FIG. 1) calling the transaction system, such as transaction system 140 (FIG. 1), to generate the transaction code.

In a number of embodiments, method 900 additionally can include a block 903 of providing the transaction code to a mobile device being used by the consumer, such that the mobile device verifies the digital signature and sends a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, and such that the first financial institution sends to the transaction system payment information regarding a payment to be made to the second account from the first account. The mobile device can be similar or identical to mobile device 120 (FIG. 1). The first account can be similar or identical to one or more of consumer accounts 131 (FIG. 1). The first financial institution can be similar or identical to financial institution 130 (FIG. 1). The second account can be similar or identical to merchant account 151 (FIG. 1). The second financial institution can be similar or identical to financial institution 150 (FIG. 1). The transaction system can be similar or identical to transaction system 140 (FIG. 1). In many embodiments, the transaction system can be maintained by an entity that is different from the merchant, the first financial institution, and the second financial institution. In some embodiments, the payment information can be routed through the transaction system to the second financial institution. In many embodiments, the payment information can include the transaction identifier, the account identifier of the second account, the payment amount, and/or other suitable information.

In some embodiments, the payment information can include one of: (a) a settlement credit push of funds for the payment amount from the first account to the second account, or (b) an irrevocable promise to pay the payment amount from the first account to the second account. In many embodiments, the mobile device can send the request to pay after receiving from the consumer an approval for the transaction. For example, the consumer can authorize the transaction, after which the request to pay can be sent from the mobile device.

In many embodiments, block 903 of providing the transaction code to a mobile device being used by the consumer can include displaying the transaction code as a matrix barcode on a screen of the point-of-sale terminal. For example, the transaction code can be displayed as a QR code on a screen of the point-of-sale terminal, which can be scanned using a camera of the mobile device. In other embodiments, block 903 of providing the transaction code to a mobile device being used by the consumer can include transmitting the transaction code from the point-of-sale terminal to the mobile device using a proximity-based wireless data communication protocol. In yet other embodiments, the point-of-sale terminal can display the transaction code such that it can be manually input into the mobile device.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

In several embodiments, method 900 further can include a block 904 of receiving, at the point-of-sale terminal, a notification of payment for the transaction in real-time while the consumer remains at the store of the merchant. In many embodiments, the notification of the payment can be received by the merchant and/or at the point-of-sale terminal from the transaction system. In other embodiments, the notification of the payment can be received by the merchant and/or at the point-of-sale terminal from the second financial institution system.

Figure 10:
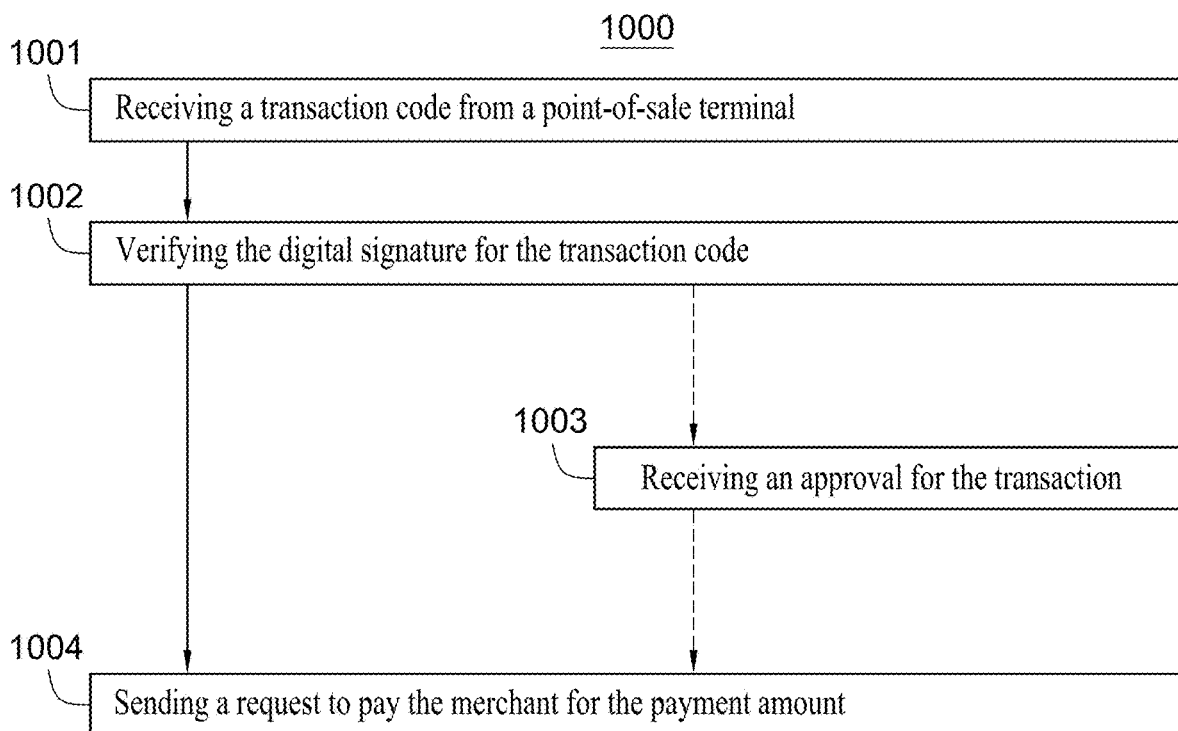
FIG. 10 illustrates a flow chart for a method, according to another embodiment.

Proceeding to the next drawing, FIG. 10 illustrates a flow chart for a method 1000, according to an embodiment. In some embodiments, method 1000 can be a method of facilitating secure payment transactions. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In some embodiments, method 1000 can be performed by mobile device 120 (FIG. 1) and/or mobile application 123 (FIG. 1).

Referring to FIG. 10, method 1000 can include a block 1001 of receiving, at a mobile device being used by a consumer, a transaction code from a point-of-sale terminal at a store of a merchant. The mobile device can be similar or identical to mobile device 120 (FIG. 1). The consumer can be similar or identical to consumer 129 (FIG. 1). In many embodiments, the transaction code can be similar or identical to the merchant security transaction code described above. The point-of-sale terminal can be similar or identical to point-of-sale terminal 110 (FIG. 1). The merchant can be similar or identical to merchant 119 (FIG. 1).

In many embodiments, the transaction code can include a merchant public identifier being associated with the merchant, a payment amount for one or more items to be purchased from the merchant by the consumer in a transaction, a transaction identifier for the transaction, and a digital signature. In various embodiments, the transaction code further can include one or more SKUs for the one or more items to be purchased in the transaction. In many embodiments, the merchant public identifier can be similar to the merchant identifier described above. For example, in many embodiments, the merchant identifier can be setup and/or registered through a transaction system, such as transaction system 140 (FIG. 1). In some embodiments, the digital signature can be similar or identical to the digital signature described above. In some embodiments, the digital signature of the transaction code is cryptographically signed by the point-of-sale terminal. In other embodiments, the transaction system can be called by the point-of-sale terminal to generate the transaction code.

In some embodiments, block 1001 of receiving, at a mobile device being used by a consumer, a transaction code from a point-of-sale terminal at a store of a merchant can include using a camera of the mobile device to scan the transaction code as a matrix barcode from a screen of the point-of-sale terminal. For example, the transaction code can be displayed as a QR code on a screen of the point-of-sale terminal, which can be scanned using a camera of the mobile device. In other embodiments, block 1001 of receiving, at a mobile device being used by a consumer, a transaction code from a point-of-sale terminal at a store of a merchant can include receiving the transaction code from the point-of-sale terminal using a proximity-based wireless data communication protocol. In yet other embodiments, the mobile device can receive the transaction code through manual input.

In several embodiments, method 1000 also can include a block 1002 of verifying the digital signature for the transaction code. For example, the digital signature can be verified using a public-key signature verifying algorithm, as described above, or another suitable verification algorithm.

In a number of embodiments, method 1000 optionally can include a block 1003 of receiving an approval for the transaction from the consumer through a user interface on the mobile device. For example, the consumer can authorize the transaction, as described above. The user interface can be similar to user interface display 1700 (FIG. 17), as described below in further detail.

In several embodiments, method 1000 further can continue after block 1002 with a block 1004 of sending, from the mobile device, a request to pay the merchant for the payment amount from a first account of the consumer maintained by a first financial institution, such that the first financial institution, upon receiving the request to pay, retrieves from a transaction system an account identifier of a second account of the merchant maintained by a second financial institution based on the merchant public identifier, such that the first financial institution sends to the transaction system payment information regarding a payment to be made to the second account from the first account, such that the payment information is routed through the transaction system to the second financial institution, and such that the point-of-sale terminal receives a notification of payment for the transaction in real-time while the consumer remains at the store of the merchant. In some embodiments, the payment information including the transaction identifier, the account identifier of the second account, the payment amount, and/or other suitable information.

The first account can be similar or identical to one or more of consumer accounts 131 (FIG. 1). The first financial institution can be similar or identical to financial institution 130 (FIG. 1). The transaction system can be similar or identical to transaction system 140 (FIG. 1). In many embodiments, the transaction system can be maintained by an entity that is different from the merchant, the first financial institution, and the second financial institution. The second account can be similar or identical to merchant account 151 (FIG. 1). The second financial institution can be similar or identical to financial institution 150 (FIG. 1).

In some embodiments, the payment information can include one of: (a) a settlement credit push of funds for the payment amount from the first account to the second account, or (b) an irrevocable promise to pay the payment amount from the first account to the second account. In many embodiments, the notification of the payment can be received at the point-of-sale terminal from the transaction system. In other embodiments, the notification of the payment can be received at the point-of-sale terminal from the second financial institution system.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

Figure 11:
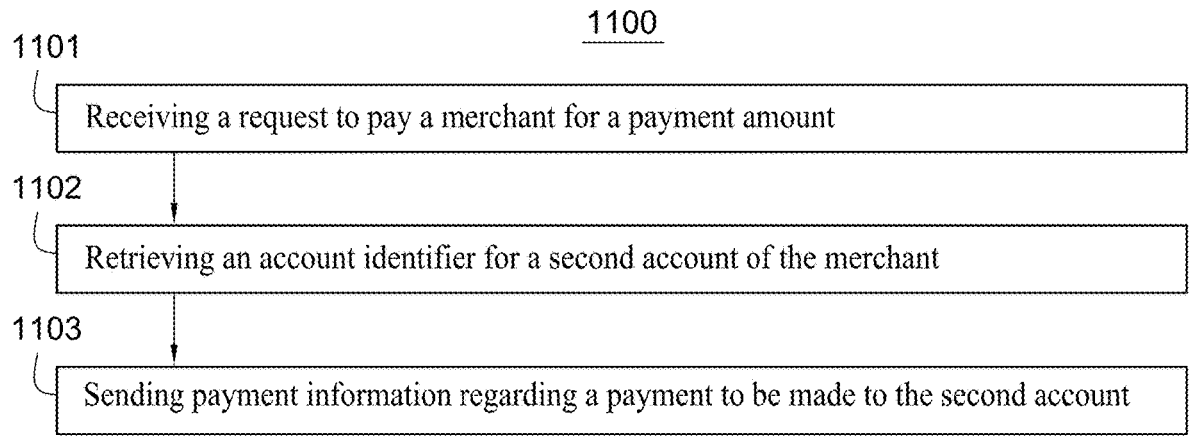
FIG. 11 illustrates a flow chart for a method, according to another embodiment.

Turning ahead in the drawings, FIG. 11 illustrates a flow chart for a method 1100, according to an embodiment. In some embodiments, method 1100 can be a method of facilitating secure payment transactions. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. In some embodiments, method 1100 can be performed by financial institution 130 (FIG. 1). In some embodiments, method 1100 and other blocks in method 1100 can include using a distributed network including distributed memory architecture to perform the associated activity. This distributed architecture can reduce the impact on the network and system resources to reduce congestion in bottlenecks while still allowing data to be accessible from a central location.

Referring to FIG. 11, method 1100 can include a block 1101 of receiving, at a first financial institution from a mobile device being used by a consumer, a request to pay a merchant for a payment amount from a first account of the consumer maintained by the first financial institution. The first financial institution can be similar or identical to financial institution 130 (FIG. 1). The mobile device can be similar or identical to mobile device 120 (FIG. 1). The consumer can be similar or identical to consumer 129 (FIG. 1). The merchant can be similar or identical to merchant 119 (FIG. 1). In many embodiments, the first account can be similar or identical to one or more of consumer accounts 131 (FIG. 1).

In some embodiments, the request to pay can include information including a merchant public identifier, a payment amount for one or more items to be purchased from the merchant by the consumer in a transaction, and a transaction identifier for the transaction. In many embodiments, the merchant public identifier can be similar to the merchant identifier described above. For example, in many embodiments, the merchant identifier can be setup and/or registered through a transaction system, such as transaction system 140 (FIG. 1).

In various embodiments, the mobile device can be used by the consumer at a store of the merchant to pay for the transaction. In a number of embodiments, the information can be received by the mobile device from a point-of-sale terminal at the store of the merchant as part of a transaction code. The point-of-sale terminal can be similar or identical to point-of-sale terminal 110 (FIG. 1). In many embodiments, the transaction code can be similar or identical to the merchant security transaction code described above. In some embodiments, the transaction code can further include one or more SKUs for the one or more items to be purchased in the transaction. In several embodiments, the transaction code can be verified by the mobile device using a digital signature of the transaction code. In some embodiments, the digital signature can be similar or identical to the digital signature described above.

In many embodiments, the mobile device can receive the transaction code by using a camera on the mobile device to scan the transaction code as a matrix barcode from a screen of the point-of-sale terminal. For example, the transaction code can be displayed as a QR code on a screen of the point-of-sale terminal, which can be scanned using a camera of the mobile device. In other embodiments, the mobile device can receive the transaction code using a proximity-based wireless data communication protocol. In yet other embodiments, the mobile device can receive the transaction code through manual input. In some embodiments, the digital signature of the transaction code can be cryptographically signed by the point-of-sale terminal. In other embodiments, the transaction system can be called by the point-of-sale terminal to generate the transaction code.

In a number of embodiments, the request to pay can be received at the first financial institution after the mobile device receives from the consumer an approval for the transaction. For example, the consumer can authorize the transaction, as described above.

In several embodiments, method 1100 also can include a block 1102 of retrieving, at the first financial institution from a transaction system, an account identifier for a second account of the merchant maintained by a second financial institution based on the merchant public identifier. The transaction system can be similar or identical to transaction system 140 (FIG. 1). In some embodiments, the transaction system can be maintained by an entity that is different from the merchant, the first financial institution, and the second financial institution. The second account can be similar or identical to merchant account 151 (FIG. 1). The second financial institution can be similar or identical to financial institution 150 (FIG. 1).

In a number of embodiments, method 1100 additionally can include a block 1103 of sending, from the first financial institution to the transaction system, payment information regarding a payment to be made to the second account from the first account, such that the payment information is routed through the transaction system to the second financial institution, and such that the point-of-sale terminal receives a notification of payment for the transaction in real-time while the consumer remains at the store of the merchant. In many embodiments, the payment information can include the transaction identifier, the account identifier of the second account, the payment amount, and/or other suitable information. In several embodiments, the payment information further can include one of: (a) a settlement credit push of funds for the payment amount from the first account to the second account, or (b) an irrevocable promise to pay the payment amount from the first account to the second account. In some embodiments, the notification of the payment can be received at the point-of-sale terminal from the transaction system. In other embodiments, the notification of the payment can be received at the point-of-sale terminal from the second financial institution system.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

Figure 12:
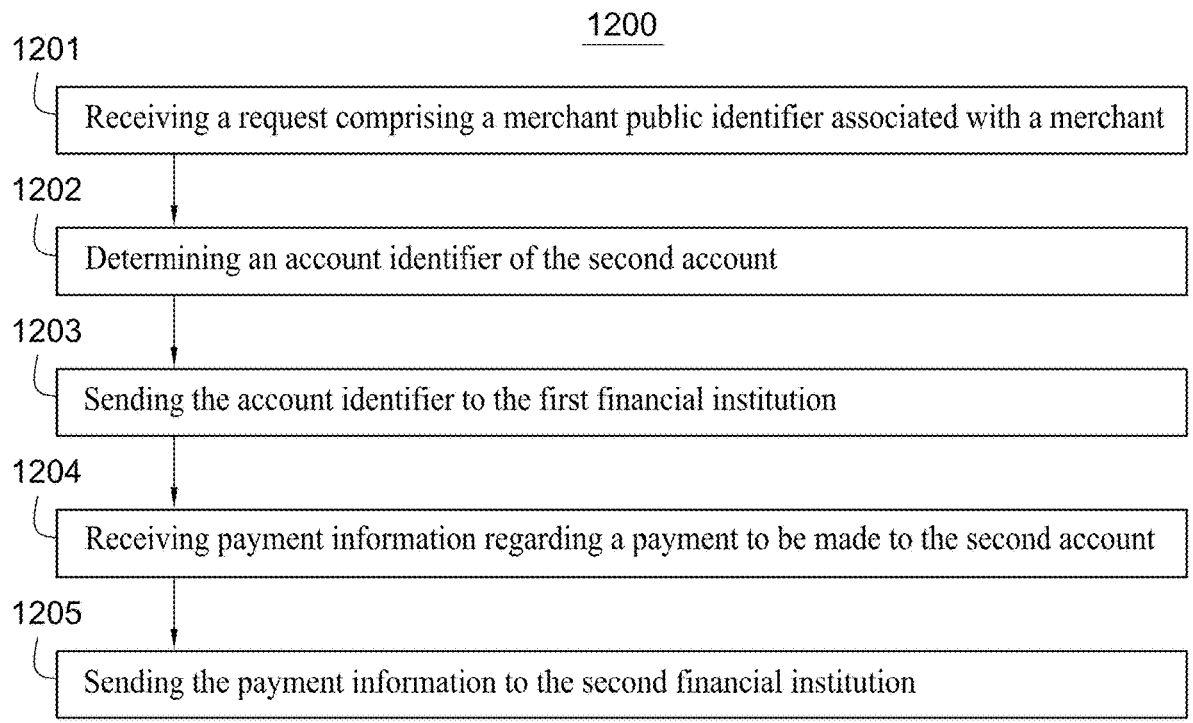
FIG. 12 illustrates a flow chart for a method, according to another embodiment.

Proceeding to the next drawing, FIG. 12 illustrates a flow chart for a method 1200, according to an embodiment. In some embodiments, method 1200 can be a method of facilitating secure payment transactions. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped. In some embodiments, method 1200 can be performed by transaction system 140 (FIG. 1). In some embodiments, method 1200 and other blocks in method 1200 can include using a distributed network including distributed memory architecture to perform the associated activity. This distributed architecture can reduce the impact on the network and system resources to reduce congestion in bottlenecks while still allowing data to be accessible from a central location.

Referring to FIG. 12, method 1200 can include a block 1201 of receiving, at a transaction system from a first entity, a request including a merchant public identifier associated with a merchant. The transaction system can be similar or identical to transaction system 140 (FIG. 1). In many embodiments, the merchant public identifier can be similar to the merchant identifier described above. For example, in many embodiments, the merchant identifier can be setup and/or registered through the transaction system. The merchant can be similar or identical to merchant 119 (FIG. 1). In some embodiments, the first entity can be at least one of the first financial institution, a mobile device being used by a consumer, or a mobile wallet provider in data communication with the mobile device being used by the consumer. For example, the first financial institution can be similar or identical to financial institution 130 (FIG. 1), the mobile device can be similar or identical to mobile device 120 (FIG. 1), the consumer can be similar or identical to consumer 129 (FIG. 1), and/or the mobile wallet provider can be similar or identical to mobile application 123 (FIG. 1).

In some embodiments, the transaction system can be in data communication with a first financial institution that maintains a first account of a consumer and a second financial institution that maintains a second account of the merchant. The first financial institution can be similar or identical to financial institution 130 (FIG. 1). The first account can be similar or identical to one or more of consumer accounts 131 (FIG. 1). The consumer can be similar or identical to consumer 129 (FIG. 1). The second financial institution can be similar or identical to financial institution 150 (FIG. 1). The second account can be similar or identical to merchant account 151 (FIG. 1). In many embodiments, the transaction system can be maintained by an entity that is different from the merchant, the first financial institution, and the second financial institution.

In several embodiments, the consumer can use a mobile device at a store of the merchant to pay for one or more items in a transaction. The mobile device can be similar or identical to mobile device 120 (FIG. 1). In some embodiments, the mobile device can receive a transaction code from a point-of-sale terminal at the store. The point-of-sale terminal can be similar or identical to point-of-sale terminal 110 (FIG. 1). In many embodiments, the transaction code can include a transaction identifier, a payment amount for the transaction, the merchant public identifier, and a digital signature. In many embodiments, the transaction code can be similar or identical to the merchant security transaction code described above. In some embodiments, the transaction code can further include one or more SKUs for the one or more items to be purchased in the transaction. In some embodiments, the digital signature can be similar or identical to the digital signature described above. In some embodiments, the digital certificate of the transaction code can be cryptographically signed. In many embodiments, the transaction system can be called by the point-of-sale terminal to generate the transaction code before the transaction system receives the request. In a number of embodiments, the transaction code can be verified by the mobile device using a digital signature of the transaction code.

In some embodiments, the mobile device can receive the transaction code by using a camera on the mobile device to scan the transaction code as a matrix barcode from a screen of the point-of-sale terminal. For example, the transaction code can be displayed as a QR code on a screen of the point-of-sale terminal, which can be scanned using a camera of the mobile device. In other embodiments, the mobile device can receive the transaction code using a proximity-based wireless data communication protocol. In yet other embodiments, the mobile device can receive the transaction code through manual input.

In several embodiments, method 1200 also can include a block 1202 of determining, at the transaction system, an account identifier of the second account based on the merchant public identifier using a merchant account database. The merchant account database can be similar or identical to merchant account database 141 (FIG. 1).

In a number of embodiments, method 1200 additionally can include a block 1203 of sending the account identifier to the first financial institution.

In several embodiments, method 1200 further can include a block 1204 of receiving, at the transaction system from the first financial institution, payment information regarding a payment to be made to the second account from the first account. In some embodiments, the payment information can include the account identifier of the second account, the payment amount, the transaction identifier, and/or other suitable information. In many embodiments, the payment information further can include one of: (a) a settlement credit push of funds for the payment amount from the first account to the second account, or (b) an irrevocable promise to pay the payment amount from the first account to the second account.

In a number of embodiments, method 1200 additionally can include a block 1205 of sending, from the transaction system to the second financial institution, the payment information, such that the point-of-sale terminal receives a notification of payment for the transaction in real-time while the consumer remains at the store of the merchant. In many embodiments, the notification of the payment can be received at the point-of-sale terminal from the transaction system. In other embodiments, the notification of the payment can be received at the point-of-sale terminal from the second financial institution system.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

Figure 13:
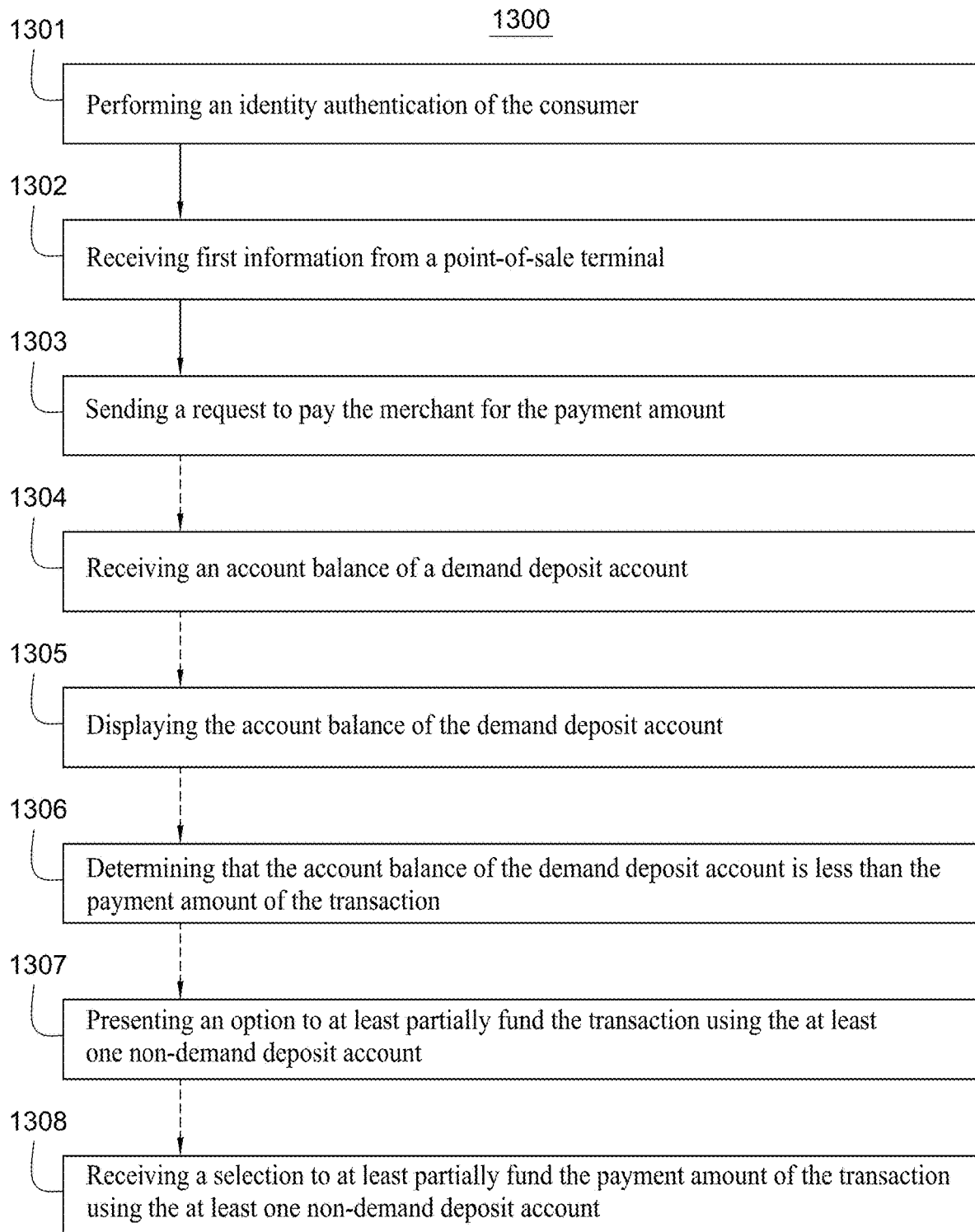
FIG. 13 illustrates a flow chart for a method, according to another embodiment.

Turning ahead in the drawings, FIG. 13 illustrates a flow chart for a method 1300, according to an embodiment. In some embodiments, method 1300 can be a method of facilitating secure payment transactions. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped. In some embodiments, method 1300 can be performed by mobile device 120 (FIG. 1) and/or mobile application 123 (FIG. 1).

Referring to FIG. 13, method 1300 can include a block 1301 of performing, at a mobile device being used by a consumer, an identity authentication of the consumer. The mobile device can be similar or identical to mobile device 120 (FIG. 1). The consumer can be similar or identical to consumer 129 (FIG. 1).

In several embodiments, method 1300 also can include a block 1302 of receiving, at the mobile device, first information from a point-of-sale terminal at a store of a merchant. The point-of-sale terminal can be similar or identical to point-of-sale terminal 110 (FIG. 1). The merchant can be similar or identical to merchant 119 (FIG. 1). In some embodiments, the first information can include a merchant identifier, a transaction identifier, a payment amount, and/or other suitable information. In many embodiments, the merchant identifier can be associated with the merchant. In some embodiments, the payment amount can be for one or more items to be purchased from the merchant by the consumer in a transaction. The transaction identifier can be associated with the transaction.

In a number of embodiments, method 1300 additionally can include a block 1303 of sending, from the mobile device, a request to pay the merchant for the payment amount from one or more first accounts of the consumer maintained by a first financial institution, such that the first financial institution, upon receiving the request to pay, retrieves from a transaction system an account identifier of a second account of the merchant maintained by a second financial institution based on the merchant identifier, such that the first financial institution sends to the transaction system payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. The one or more first accounts can be similar or identical to one or more of consumer accounts 131 (FIG. 1). In several embodiments, the one or more first accounts can include at least one non-demand deposit account. The first financial institution can be similar or identical to financial institution 130 (FIG. 1). The transaction system can be similar or identical to transaction system 140 (FIG. 1). In some embodiments, the transaction system can be maintained by an entity that is different from the merchant, the first financial institution, and the second financial institution. The second account can be similar or identical to merchant account 151 (FIG. 1). The second financial institution can be similar or identical to financial institution 150 (FIG. 1).

In several embodiments, the payment information can include the transaction identifier, the account identifier of the second account, the payment amount, and/or other suitable information. In some embodiments, the payment information further can include one of: (a) one or more settlement credit pushes of funds that collectively total the payment amount from the one or more first accounts to the second account, or (b) one or more irrevocable promises to pay that collectively total the payment amount from the one or more first accounts to the second account. In many embodiments, the mobile device can send the request to pay after receiving from the consumer an approval for the transaction. For example, the consumer can authorize the transaction, after which the request to pay can be sent from the mobile device, such as shown in user interface displays 1700 (FIG. 17), as shown described below in further detail.

In many embodiments, the one or more first accounts can include the loan account, and in some embodiments, the loan account can be created after receiving the first information from the point-of-sale terminal. In several embodiments, the loan account can be used to fund at least a first portion of the payment amount of the transaction, and in various embodiments, a second portion of the payment amount can be funded from a demand deposit account of the consumer maintained at the first financial institution.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

In many embodiments, method 1300 can include one or more optional blocks 1304-1308, described below. In some embodiments, one or more of blocks 1304-1308 can be performed before block 1303, and in some embodiments, can be performed before block 1302. In the same or other embodiments, one or more of block 1304-1308 can be performed after block 1303.

In several embodiments, method 1300 optionally can include block 1304 of receiving, from the first financial institution, an account balance of a demand deposit account of the consumer maintained by the first financial institution.

In a number of embodiments, method 1300 optionally can include block 1305 of displaying the account balance of the demand deposit account to the consumer on a user interface of the mobile device. The user interface can be similar to user interface display 1700 (FIG. 17), as described below in further detail.

In several embodiments, method 1300 optionally can include block 1306 of determining that the account balance of the demand deposit account is less than the payment amount of the transaction. In some embodiments, the determining of block 1306 can involve a comparison in the mobile device of the payment account against the account balance. In other embodiments, another system, such as the first financial institution, can perform the comparison of the payment account against the account balance, and the determining of block 1306 can involve receiving, from the other system, such as from the first financial institution, information about, or based on, the results of the comparison.

In a number of embodiments, method 1300 optionally can include block 1307 of presenting to the consumer an option on a user interface of the mobile device to at least partially fund the transaction using the at least one non-demand deposit account. The user interface can be similar to user interface display 1800 (FIG. 18), user interface display 1900 (FIG. 19), and/or user interface display 2000 (FIG. 20), as described below in further detail.

In several embodiments, method 1300 optionally can include block 1308 of receiving from the consumer through the user interface a selection to at least partially fund the payment amount of the transaction using the at least one non-demand deposit account. The user interface can be similar to user interface display 1800 (FIG. 18), user interface display 1900 (FIG. 19), and/or user interface display 2000 (FIG. 20), as described below in further detail. In some embodiments, the one or more first accounts further can include the demand deposit account. In many embodiments, a first portion of the payment amount of the transaction can be funded from the demand deposit account, and in some embodiments, a second portion of the payment amount of the transaction can be funded from the at least one non-demand deposit account. In other embodiments, the demand deposit account can be devoid of being used to fund the payment amount of the transaction, and the payment amount of the transaction can be funded wholly from the at least one non-demand deposit account.

Figure 14:
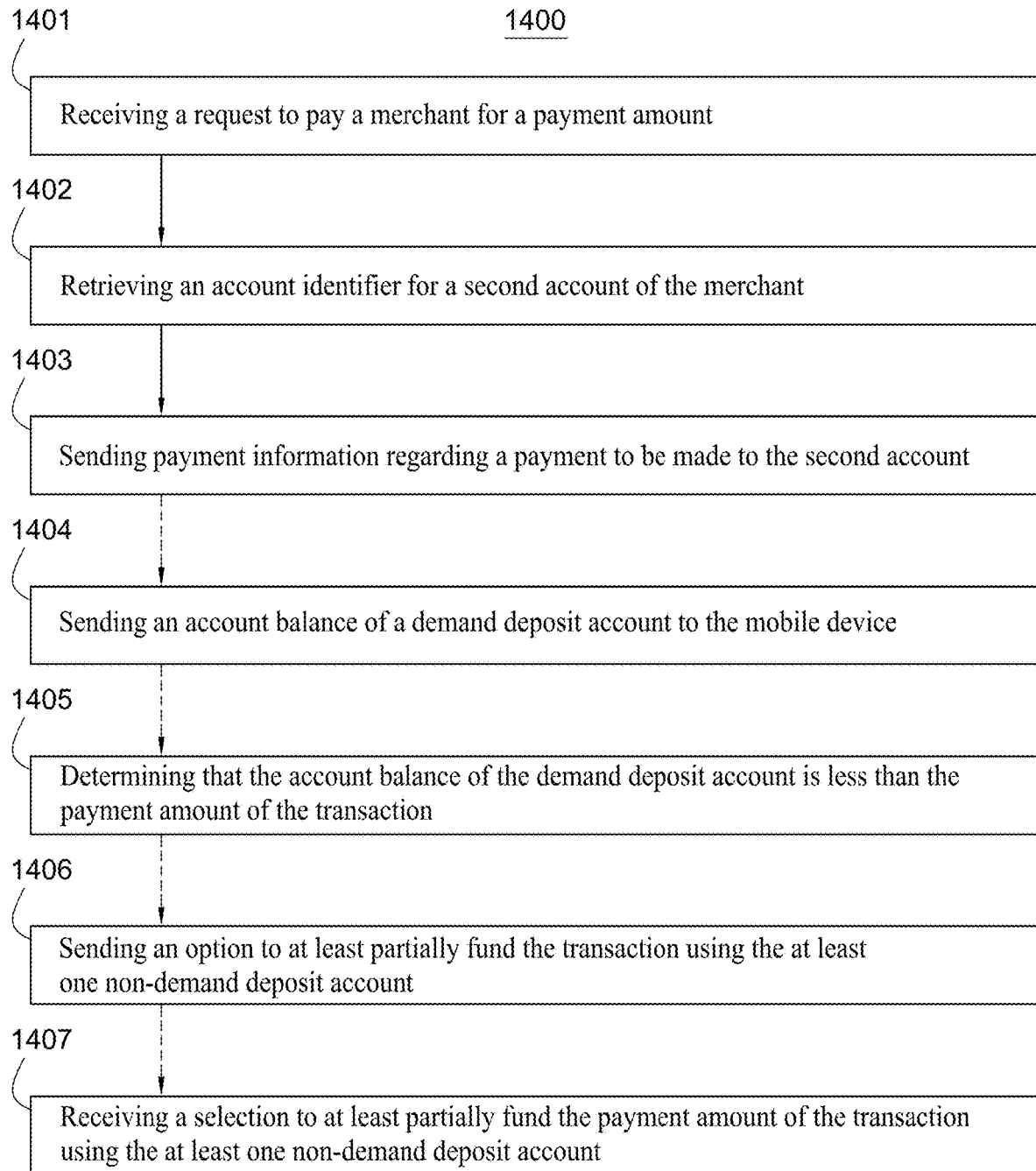
FIG. 14 illustrates a flow chart for a method, according to another embodiment.

Turning ahead in the drawings, FIG. 14 illustrates a flow chart for a method 1400, according to an embodiment. In some embodiments, method 1400 can be a method of facilitating secure payment transactions. Method 1400 is merely exemplary and is not limited to the embodiments presented herein. Method 1400 can be employed in many different embodiments or examples not specifically depicted or described herein. In some embodiments, the procedures, the processes, and/or the activities of method 1400 can be performed in the order presented. In other embodiments, the procedures, the processes, and/or the activities of method 1400 can be performed in any suitable order. In still other embodiments, one or more of the procedures, the processes, and/or the activities of method 1400 can be combined or skipped. In some embodiments, method 1400 can be performed by financial institution 130 (FIG. 1). In some embodiments, method 1400 and other blocks in method 1400 can include using a distributed network including distributed memory architecture to perform the associated activity. This distributed architecture can reduce the impact on the network and system resources to reduce congestion in bottlenecks while still allowing data to be accessible from a central location.

Referring to FIG. 14, method 1400 can include a block 1401 of receiving, at a first financial institution from a mobile device being used by a consumer, a request to pay a merchant for a payment amount from one or more first accounts of the consumer maintained by the first financial institution. The first financial institution can be similar or identical to financial institution 130 (FIG. 1). The mobile device can be similar or identical to mobile device 120 (FIG. 1). The consumer can be similar or identical to consumer 129 (FIG. 1). The merchant can be similar or identical to merchant 119 (FIG. 1). The one or more first accounts can be similar or identical to one or more of consumer accounts

131 (FIG. 1). The one or more first accounts can include at least one non-demand deposit account.

In many embodiments, the request to pay can include information including a merchant identifier, a payment amount for one or more items to be purchased from the merchant by the consumer in a transaction, and a transaction identifier for the transaction. In a number of embodiments, the mobile device can be used by the consumer at a store of the merchant to pay for the transaction. In some embodiments, the information can be received by the mobile device from a point-of-sale terminal at the store of the merchant. The point-of-sale terminal can be similar or identical to point-of-sale terminal 110 (FIG. 1).

In various embodiments, the one or more first accounts can include the loan account, and the loan account can be created after receiving the request to pay the merchant. In the same or other embodiments, the loan account can be used to fund at least a first portion of the payment amount of the transaction, and in a number of embodiments, a second portion of the payment amount can be funded from a demand deposit account of the consumer maintained at the first financial institution.

In some embodiments, the at least one non-demand deposit account can include a credit account. In a number of embodiments, at least a portion of the payment can be funded from a charge to the credit account. In various embodiments, the at least one non-demand deposit account can include a points account.

In several embodiments, method 1400 also can include a block 1402 of retrieving, at the first financial institution from a transaction system, an account identifier for a second account of the merchant maintained by a second financial institution based on the merchant identifier. The second account can be similar or identical to merchant account 151 (FIG. 1). The second financial institution can be similar or identical to financial institution 150 (FIG. 1). The transaction system can be similar or identical to transaction system 140 (FIG. 1). In some embodiments, the transaction system can be maintained by an entity that is different from the merchant, the first financial institution, and the second financial institution.

In a number of embodiments, method 1400 additionally can include a block 1403 of sending, from the first financial institution to the transaction system, payment information regarding a payment to be made to the second account from the one or more first accounts, such that the payment information is routed through the transaction system to the second financial institution, and such that the point-of-sale terminal receives a notification of payment for the transaction in real-time while the consumer remains at the store of the merchant. In many embodiments, the payment information can include the transaction identifier, the account identifier of the second account, the payment amount, and/or other suitable include. In some embodiments, the payment information further can include one of: (a) one or more settlement credit pushes of funds that collectively total the payment amount from the one or more first accounts to the second account, or (b) one or more irrevocable promises to pay that collectively total the payment amount from the one or more first accounts to the second account. In many embodiments, the mobile device can send the request to pay after receiving from the consumer an approval for the transaction. For example, the consumer can authorize the transaction, after which the request to pay can be sent from the mobile device, such as shown in user interface display 1700 (FIG. 17), as shown described below in further detail.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

In many embodiments, method 1400 can include one or more optional blocks 1404-1407, described below. In some embodiments, one or more of blocks 1404-1407 can be performed before one or more of blocks 1401-1403. In the same or other embodiments, one or more of blocks 1404-1407 can be performed after block 1403.

In several embodiments, method 1400 optionally can include block 1404 of sending, to the mobile device, an account balance of a demand deposit account of the consumer maintained by the first financial institution. For example, the account balance can be displayed on the mobile device on a user interface, such as shown in user interface display 1700 (FIG. 17), as shown described below in further detail.

In a number of embodiments, method 1400 optionally can include block 1405 of determining that the account balance of the demand deposit account is less than the payment amount of the transaction.

In several embodiments, method 1400 optionally can include block 1406 of sending, to the mobile device, an option to at least partially fund the transaction using the at least one non-demand deposit account. For example, the option can be displayed on the mobile device using a user interface, such as shown in user interface display 1800 (FIG. 18), user interface display 1900 (FIG. 19), and/or user interface display 2000 (FIG. 20), as described below in further detail.

In a number of embodiments, method 1400 optionally can include block 1407 of receiving, from the mobile device, a selection to at least partially fund the payment amount of the transaction using the at least one non-demand deposit account. For example, the selection can be received on the mobile device through a user interface, such as shown in user interface display 1800 (FIG. 18), user interface display 1900 (FIG. 19), and/or user interface display 2000 (FIG. 20), as described below in further detail. In many embodiments, the one or more first accounts further can include the demand deposit account. In some embodiments, a first portion of the payment amount of the transaction can be funded from the demand deposit account, and a second portion of the payment amount of the transaction can be funded from the at least one non-demand deposit account. In other embodiments, the demand deposit account can be devoid of being used to fund the payment amount of the transaction, and the payment amount of the transaction can be funded wholly from the at least one non-demand deposit account.

Figure 15:
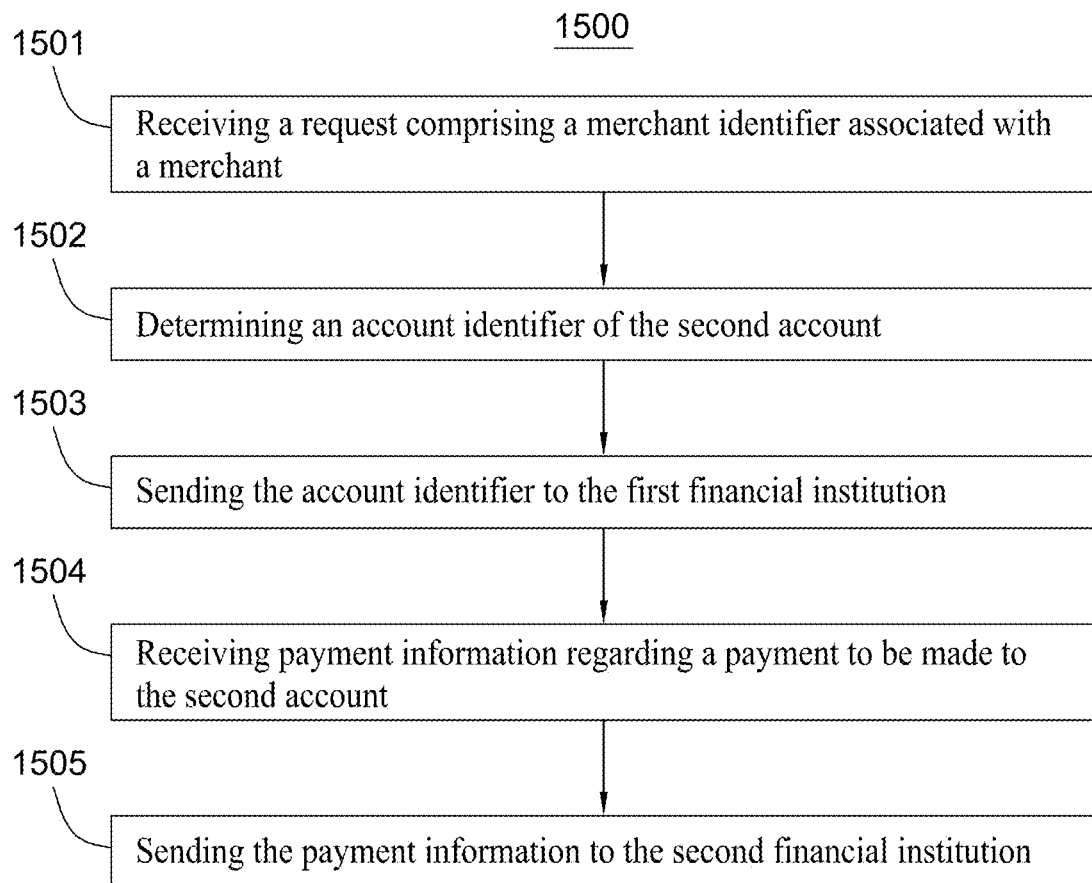
FIG. 15 illustrates a flow chart for a method, according to another embodiment.

Turning ahead in the drawings, FIG. 15 illustrates a flow chart for a method 1500, according to an embodiment. In some embodiments, method 1500 can be a method of facilitating secure payment transactions. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of method 1500 can be performed in any suitable order. In still other embodiments, one or more of the procedures, the processes, and/or the activities of method 1500 can be combined or skipped. In some embodiments, method 1500 can be performed by transaction system 140 (FIG. 1). In some embodiments, method 1500 and other blocks in method 1500 can include using a distributed network including distributed memory architecture to perform the associated activity. This distributed architecture can reduce the impact on the network and system resources to reduce congestion in bottlenecks while still allowing data to be accessible from a central location.

Referring to FIG. 15, method 1500 can include a block 1501 of receiving, at a transaction system from a first entity, a request including a merchant identifier associated with a merchant. The transaction system can be similar or identical to transaction system 140 (FIG. 1). In many embodiments, the merchant identifier can be similar to the merchant identifier described above. For example, in many embodiments, the merchant identifier can be setup and/or registered through the transaction system. The merchant can be similar or identical to merchant 119 (FIG. 1). In some embodiments, the first entity can be at least one of the first financial institution, a mobile device being used by a consumer, or a mobile wallet provider in data communication with the mobile device being used by the consumer. For example, the first financial institution can be similar or identical to financial institution 130 (FIG. 1), the mobile device can be similar or identical to mobile device 120 (FIG. 1), the consumer can be similar or identical to consumer 129 (FIG. 1), and/or the mobile wallet provider can be similar or identical to mobile application 123 (FIG. 1) and/or mobile wallet provider 160 (FIG. 1).

In some embodiments, the transaction system can be in data communication with a first financial institution that maintains one or more first accounts of a consumer and a second financial institution that maintains a second account of the merchant. The first financial institution can be similar or identical to financial institution 130 (FIG. 1). The one or more first accounts can be similar or identical to one or more of consumer accounts 131 (FIG. 1). In many embodiments, the one or more first accounts can include one or more of at least one non-demand deposit account. The consumer can be similar or identical to consumer 129 (FIG. 1). The second financial institution can be similar or identical to financial institution 150 (FIG. 1). The second account can be similar or identical to merchant account 151 (FIG. 1). In many embodiments, the transaction system can be maintained by an entity that is different from the merchant, the first financial institution, and the second financial institution. In several embodiments, the consumer can use a mobile device at a store of the merchant to pay a payment amount for one or more items in a transaction using the one or more first accounts. The mobile device can be similar or identical to mobile device 120 (FIG. 1).

In several embodiments, the first financial institution can be configured to send to the mobile device an account balance of a demand deposit account of the consumer maintained by the first financial institution. For example, the account balance can be displayed on the mobile device on a user interface, such as shown in user interface display 1700 (FIG. 17), as shown described below in further detail.

In some embodiments, the first financial institution can be configured to determine that the account balance of the demand deposit account is less than the payment amount of the transaction.

In many embodiments, the first financial institution can be configured to send to the mobile device an option to at least partially fund the transaction using the at least one non-demand deposit account. For example, the option can be displayed on the mobile device using a user interface, such as shown in user interface display 1800 (FIG. 18), user interface display 1900 (FIG. 19), and/or user interface display 2000 (FIG. 20), as described below in further detail.

In a number of embodiments, the first financial institution can be configured to receive from the mobile device a selection to at least partially fund the payment amount of the transaction using the at least one non-demand deposit account. For example, the selection can be received on the mobile device through a user interface, such as shown in user interface display 1800 (FIG. 18), user interface display 1900 (FIG. 19), and/or user interface display 2000 (FIG. 20), as described below in further detail. In many embodiments, the one or more first accounts further can include the demand deposit account. In some embodiments, a first portion of the payment amount of the transaction can be funded from the demand deposit account, and a second portion of the payment amount of the transaction can be funded from the at least one non-demand deposit account. In other embodiments, the demand deposit account can be devoid of being used to fund any portion of the payment amount of the transaction, and the payment amount of the transaction can be funded wholly from the at least one non-demand deposit account.

In various embodiments, the one or more first accounts can include the loan account, and the loan account can be created after the consumer authorizes paying the payment amount. In the same or other embodiments, the loan account can be used to fund at least a first portion of the payment amount of the transaction, and in a number of embodiments, a second portion of the payment amount can be funded from a demand deposit account or another non-demand deposit account of the consumer maintained at the first financial institution.

In some embodiments, the at least one non-demand deposit account can include a credit account. In a number of embodiments, at least a portion of the payment can be funded from a charge to the credit account. In various embodiments, the at least one non-demand deposit account can include a points account.

In several embodiments, method 1500 also can include a block 1502 of determining, at the transaction system, an account identifier of the second account of the merchant maintained by a second financial institution using a merchant account database. The merchant account database can be similar or identical to merchant account database 141 (FIG. 1).

In a number of embodiments, method 1500 additionally can include a block 1503 of sending the account identifier from the transaction system to the first financial institution.

In several embodiments, method 1500 further can include a block 1504 of receiving, at the transaction system from the first financial institution, payment information regarding a payment to be made to the second account from the one or more first accounts. In some embodiments, the payment information can include a transaction identifier, the account identifier of the second account, the payment amount, and/or other suitable information. In many embodiments, the payment information further can include one or more of: (a) one or more settlement credit pushes of funds that collectively total the payment amount from the one or more first accounts to the second account, or (b) one or more irrevocable promises to pay that collectively total the payment amount from the one or more first accounts to the second account. In many embodiments, the mobile device can send the request to pay after receiving from the consumer an approval for the transaction. For example, the consumer can authorize the transaction, after which the request to pay can be sent from the mobile device, such as shown in user interface display 1700 (FIG. 17), as shown described below in further detail.

In a number of embodiments, method 1500 additionally can include a block 1505 of sending, from the transaction system to the second financial institution, the payment information, such that a point-of-sale terminal at the store of the merchant receives a notification of payment for the transaction in real-time while the consumer remains at the store of the merchant. The point-of-sale terminal can be similar or identical to point-of-sale terminal 110 (FIG. 1). In many embodiments, the notification of the payment can be received at the point-of-sale terminal from the transaction system. In other embodiments, the notification of the payment can be received at the point-of-sale terminal from the second financial institution system.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

Figure 16:
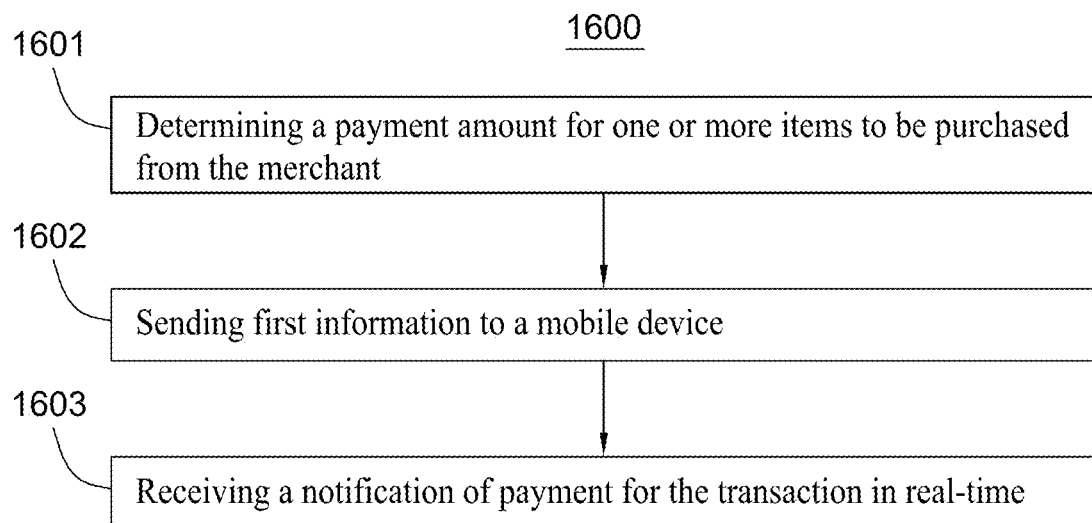
FIG. 16 illustrates a flow chart for a method, according to another embodiment.

Proceeding to the next drawing, FIG. 16 illustrates a flow chart for a method 1600, according to an embodiment. In some embodiments, method 1600 can be a method of facilitating secure payment transactions. Method 1600 is merely exemplary and is not limited to the embodiments presented herein. Method 1600 can be employed in many different embodiments or examples not specifically depicted or described herein. In some embodiments, the procedures, the processes, and/or the activities of method 1600 can be performed in the order presented. In other embodiments, the procedures, the processes, and/or the activities of method 1600 can be performed in any suitable order. In still other embodiments, one or more of the procedures, the processes, and/or the activities of method 1600 can be combined or skipped. In some embodiments, method 1600 can be performed by point-of-sale terminal 110 (FIG. 1). In some embodiments, method 1600 and other blocks in method 1600 can include using a distributed network including distributed memory architecture to perform the associated activity. This distributed architecture can reduce the impact on the network and system resources to reduce congestion in bottlenecks while still allowing data to be accessible from a central location.

Referring to FIG. 16, method 1600 can include a block 1601 of determining, at a point-of-sale terminal at a store of a merchant, a payment amount for one or more items to be purchased from the merchant by a consumer in a transaction. The point-of-sale terminal can be similar or identical to point-of-sale terminal 110 (FIG. 1). The merchant can be similar or identical to merchant 119 (FIG. 1). The consumer can be similar or identical to consumer 129 (FIG. 1).

In several embodiments, method 1600 also can include a block 1602 of sending first information from the point-of-sale terminal to a mobile device used by the consumer. The mobile device can be similar or identical to mobile device 120 (FIG. 1). In many embodiments, the first information can include a merchant identifier, a transaction identifier, and the payment amount. In many embodiments, the merchant identifier can be similar to the merchant identifier described above. For example, in many embodiments, the merchant identifier can be setup and/or registered through a transaction system, such as transaction system 140 (FIG. 1). In many embodiments, the mobile device can send a request to pay the merchant for the payment amount from one or more first accounts of the consumer maintained by a first financial institution. The first financial institution can be similar or identical to financial institution 130 (FIG. 1). The one or more first accounts can be similar or identical to one or more of consumer accounts 131 (FIG. 1). In many embodiments, the one or more first accounts can include one or more of at least one non-demand deposit account. In a number of embodiments, the first financial institution, upon receiving the request to pay, can retrieve from a transaction system an account identifier of a second account of the merchant maintained by a second financial institution based on the merchant identifier. The second financial institution can be similar or identical to financial institution 150 (FIG. 1). The second account can be similar or identical to merchant account 151 (FIG. 1). The transaction system can be similar or identical to transaction system 140 (FIG. 1). In some embodiment, the first financial institution can send to the transaction system payment information regarding a payment to be made to the second account from the one or more first accounts, such that the payment information can be routed through the transaction system to the second financial institution. In a number of embodiments, the payment information can include the transaction identifier, the account identifier of the second account, the payment amount, and/or other suitable information. In many embodiments, the transaction system can be maintained by an entity that is different from the merchant, the first financial institution, and the second financial institution.

In some embodiments, the payment information further includes one or more of: (a) one or more settlement credit pushes of funds that collectively total the payment amount from the one or more first accounts to the second account, or (b) one or more irrevocable promises to pay that collectively total the payment amount from the one or more first accounts to the second account. In many embodiments, the mobile device can send the request to pay after receiving from the consumer an approval for the transaction. For example, the consumer can authorize the transaction, after which the request to pay can be sent from the mobile device. For example, the consumer can authorize the transaction, after which the request to pay can be sent from the mobile device, such as shown in user interface display 1700 (FIG. 17), as shown described below in further detail.

In several embodiments, the first financial institution can be configured to send to the mobile device an account balance of a demand deposit account of the consumer maintained by the first financial institution. For example, the account balance can be displayed on the mobile device on a user interface, such as shown in user interface display 1700 (FIG. 17), as shown described below in further detail.

In some embodiments, the first financial institution can be configured to determine that the account balance of the demand deposit account is less than the payment amount of the transaction.

In many embodiments, the first financial institution can be configured to send to the mobile device an option to at least partially fund the transaction using the at least one non-demand deposit account. For example, the option can be displayed on the mobile device using a user interface, such as shown in user interface display 1800 (FIG. 18), user interface display 1900 (FIG. 19), and/or user interface display 2000 (FIG. 20), as described below in further detail.

In a number of embodiments, the first financial institution can be configured to receive from the mobile device a selection to at least partially fund the payment amount of the transaction using the at least one non-demand deposit account. For example, the selection can be received on the mobile device through a user interface, such as shown in user interface display 1800 (FIG. 18), user interface display 1900 (FIG. 19), and/or user interface display 2000 (FIG. 20), as described below in further detail. In many embodiments, the one or more first accounts further can include the demand deposit account. In some embodiments, a first portion of the payment amount of the transaction can be funded from the demand deposit account, and a second portion of the payment amount of the transaction can be funded from the at least one non-demand deposit account. In other embodiments, the demand deposit account can be devoid of being used to fund any portion of the payment amount of the transaction, and the payment amount of the transaction can be funded wholly from the at least one non-demand deposit account.

In various embodiments, the one or more first accounts can include the loan account, and the loan account can be created after receiving the request to pay the merchant. In the same or other embodiments, the loan account can be used to fund at least a first portion of the payment amount of the transaction, and in a number of embodiments, a second portion of the payment amount can be funded from a demand deposit account or another non-demand deposit account of the consumer maintained at the first financial institution.

In some embodiments, the at least one non-demand deposit account can include a credit account. In a number of embodiments, at least a portion of the payment can be funded from a charge to the credit account. In various embodiments, the at least one non-demand deposit account can include a points account.

In certain embodiments, the first financial institution does not have access to a second account number for the second account for the transaction, and the second financial institution does not have access to a first account number for the first account for the transaction. In other embodiments, the first financial institution can have access to a second account number for the second account for the transaction, and/or the second financial institution can have access to a first account number for the first account for the transaction.

In several embodiments, method 1600 further can include a block 1603 of receiving, at the point-of-sale terminal, a notification of payment for the transaction in real-time while the consumer remains at the store of the merchant. In many embodiments, the notification of the payment can be received by the merchant and/or at the point-of-sale terminal from the transaction system. In other embodiments, the notification of the payment can be received by the merchant and/or at the point-of-sale terminal from the second financial institution system.

Figures 17, 18:
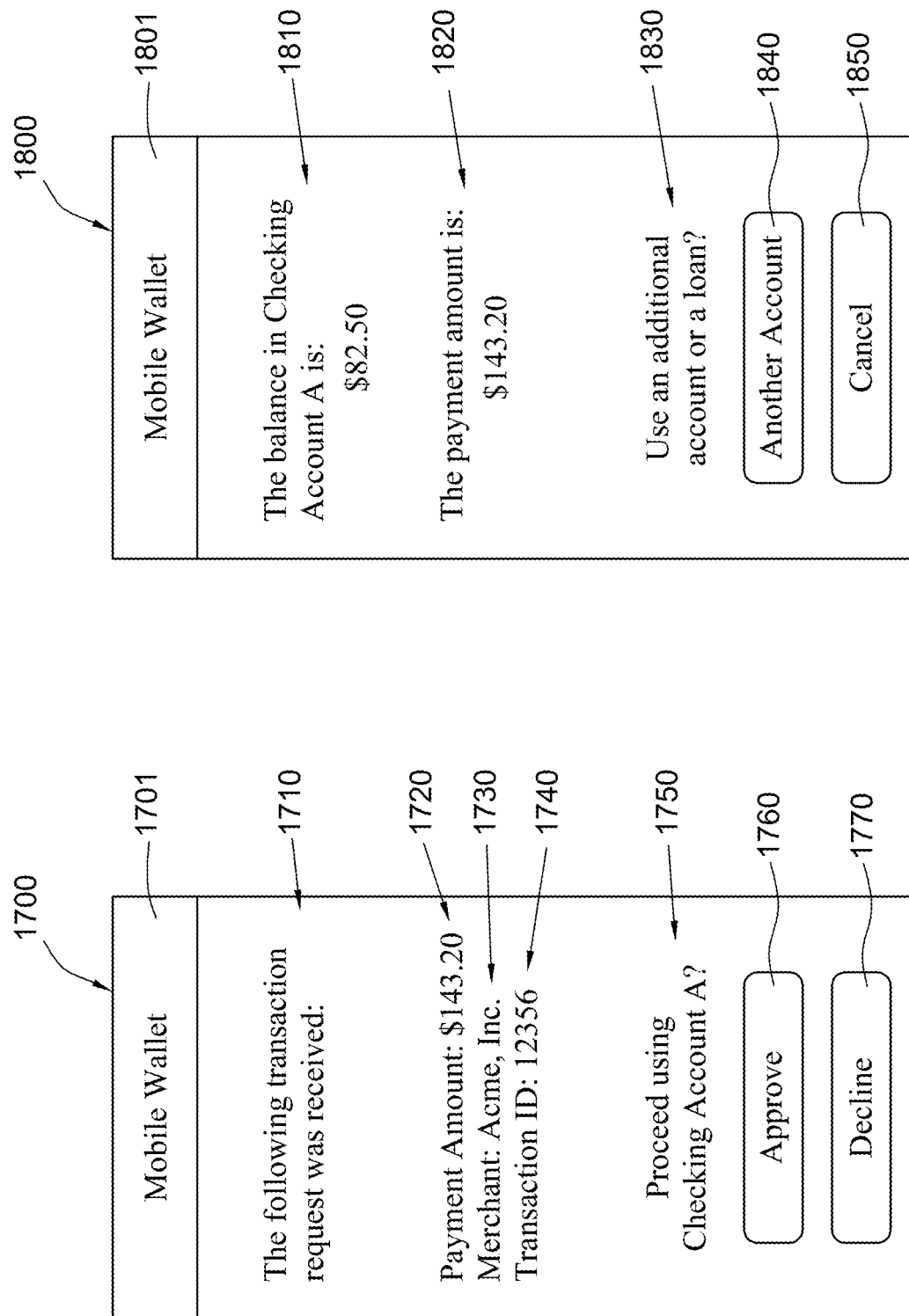
FIG. 17 illustrates an exemplary user interface display to allow the consumer of FIG. 1 to approve a transaction on the mobile device of FIG. 1.
FIG. 18 illustrates an exemplary user interface display to allow the consumer of FIG. 1 to choose to use another account for the payment transaction when the approved account has insufficient funds or limited funds.

Turning ahead in the drawings, FIG. 17 illustrates an exemplary user interface display 1700 to allow a consumer (e.g., 129 (FIG. 1)) to approve a transaction on a mobile device (e.g., 120 (FIG. 1)). User interface display 1700 is merely exemplary, and embodiments of the user interface display are not limited to the embodiments presented herein. The user interface display can be employed in many different embodiments or examples not specifically depicted or described herein, and can include other suitable elements. In many embodiments, mobile application 123 (FIG. 1) can provide an interface for display on mobile device 120 (FIG. 1), which can include user interface display 1700. In a number of embodiments, the interface can allow consumer 129 (FIG. 1) to approve or decline a transaction request received from point-of-sale terminal 110 (FIG. 1).

In a number of embodiments, user interface display 1700 can include a title bar 1701, a descriptor 1710, a payment amount field 1720, a merchant field 1730, a transaction identifier field 1740, a prompt 1750, an approving selection button 1760, and/or a declining selection button 1770. In many embodiments, title bar 1701 can include the name of the mobile wallet or mobile application (e.g., mobile application 123 (FIG. 1)). In a number of embodiments, descriptor 1710 can describe that a transaction request was received. For example, after mobile device 120 (FIG. 1) receives information, such as the transaction code, the merchant identifier, the payment amount, the transaction identifier, and/or other information from point-of-sale terminal 110 (FIG. 1), then user interface display 1700 can be displayed on mobile device 120 (FIG. 1) to consumer 129 (FIG. 1).

In several embodiments, user interface display 1700 can include a number of fields to display information about the transaction, such as payment amount field 1720, merchant field 1730, and/or transaction identifier field 1740. In many embodiments, payment amount field 1720 can display the payment amount received from point-of-sale terminal 110 (FIG. 1). In several embodiments, merchant field 1730 can display the name of merchant 119 (FIG. 1). In some embodiments, the name of the merchant can be received from point-of-sale terminal 110 (FIG. 1). In other embodiment, the merchant identifier received from point-of-sale terminal 110 (FIG. 1) can be used to retrieve the name of the merchant, such as by mobile device 120 (FIG. 1) querying transaction system 140 (FIG. 1) directly or through mobile wallet provider 160 (FIG. 1) and/or financial institution 130 (FIG. 1). In a number of embodiments, transaction identifier field 1740 can display the transaction identifier received from point-of-sale terminal 110 (FIG. 1). In other embodiments, user interface display 1700 can include additional or other suitable fields to display information about the transaction.

In several embodiments, prompt 1750 can ask consumer 129 (FIG. 1) to confirm the transaction using an account (e.g., consumer account 131 (FIG. 1)) that has been provisioned to or otherwise associated with mobile application 123 (FIG. 1), such as Checking Account A. When more than one account (e.g., consumer account 131 (FIG. 1)) has been provisioned to or otherwise associated with mobile application 123 (FIG. 1), the user interface display (e.g., 1700) can include a request to select one of the accounts (e.g., consumer account 131 (FIG. 1)) to use for the payment transaction. In many embodiments, approving selection button 1760 can be selected by consumer 129 (FIG. 1) to approve the transaction using the account. In some embodiments, declining selection button 1770 can be selected by consumer 129 (FIG. 1) to decline the transaction using the account.

Proceeding to the next drawing, FIG. 18 illustrates an exemplary user interface display 1800 to allow a consumer (e.g., 129 (FIG. 1)) to choose to use another account for the payment transaction when the approved account has insufficient funds or limited funds. User interface display 1800 is merely exemplary, and embodiments of the user interface display are not limited to the embodiments presented herein. The user interface display can be employed in many different embodiments or examples not specifically depicted or described herein, and can include other suitable elements.

User interface display 1800 can be similar to user interface display 1700 (FIG. 17), and various elements of user interface display 1800 can be similar or identical to various elements of user interface display 1700 (FIG. 17). In many embodiments, mobile application 123 (FIG. 1) can provide an interface for display on mobile device 120 (FIG. 1), which can include user interface display 1800. In a number of embodiments, the interface can allow consumer 129 (FIG. 1) to choose whether to use another account for the payment transaction when the approved account has insufficient or limited funds.

In a number of embodiments, user interface display 1800 can include a title bar 1801, an account balance field 1810, a payment amount field 1820, a prompt 1830, an account selection button 1840, and/or a canceling selection button 1850. In many embodiments, title bar 1801 can include the name of the mobile wallet or mobile application (e.g., mobile application 123 (FIG. 1)). Title bar 1801 can be similar or identical to title bar 1701 (FIG. 17).

In several embodiments, user interface display 1800 can include a number of fields to display information about the transaction request using the account approved in user interface display 1700 (FIG. 17). For example, the fields can include account balance field 1810 and payment amount field 1820. In some embodiments, account balance field can show the balance of the account that was approved for payment using user interface display 1700 (FIG. 17). In many embodiments, payment amount field 1820 can display the payment amount. Payment amount field 1820 can be similar or identical to payment amount field 1720 (FIG. 17). In many embodiments, user interface display 1800 can be displayed when the account balance is less than the payment amount. In other embodiments, user interface display 1800 can be displayed when the account balance is more than the payment amount, but the difference between the account balance and the payment amount is less than a threshold amount, such as $10, $50, $100, $500, or another suitable threshold amount.

In several embodiments, prompt 1830 can ask consumer 129 (FIG. 1) whether to use another account or loan to pay for the payment amount. In many embodiments, account selection button 1840 can be selected by consumer 129 (FIG. 1) to indicate that another account or loan should be used to at least partially pay for the payment amount. In some embodiments, canceling selection button 1850 can be selected by consumer 129 (FIG. 1) to cancel the transaction. In some embodiments, such as when the account balance is sufficient to cover the payment amount, another selection button (not shown) can be included in the user interface display (e.g., 1800) to authorize proceeding with the payment transaction using the account approved in user interface display 1700 (FIG. 17).

Proceeding to the next drawing, FIG. 19 illustrates an exemplary user interface display 1900 to allow a consumer (e.g., 129 (FIG. 1)) to select another account for the payment transaction when the approved account has insufficient funds. User interface display 1900 is merely exemplary, and embodiments of the user interface display are not limited to the embodiments presented herein. The user interface display can be employed in many different embodiments or examples not specifically depicted or described herein, and can include other suitable elements. User interface display 1900 can be similar to user interface display 1700 (FIG. 17) and/or user interface display 1800 (FIG. 18), and various elements of user interface display 1900 can be similar or identical to various elements of user interface display 1700 (FIG. 17) and/or user interface display 1800 (FIG. 18). In many embodiments, mobile application 123 (FIG. 1) can provide an interface for display on mobile device 120 (FIG. 1), which can include user interface display 1900. In a number of embodiments, the interface can allow consumer 129 (FIG. 1) to select another account for the payment transaction when the approved account has insufficient or limited funds.

In a number of embodiments, user interface display 1900 can include a title bar 1901, a prompt 1910, an option 1911, an option 1912, an option 1913, an option 1914, a proceeding selection button 1920, and/or a canceling selection button 1930. In many embodiments, title bar 1901 can include the name of the mobile wallet or mobile application (e.g., mobile application 123 (FIG. 1)). Title bar 1901 can be similar or identical to title bar 1701 (FIG. 17) and/or title bar 1801 (FIG. 18).

In many embodiments, prompt 1910 can ask consumer 129 (FIG. 1) to select another account or loan to use for the payment transaction. In various embodiments, user interface display 1900 can include one or more options of other accounts or loan options that the user can select, such as options 1911-1914. In some embodiments, the options can include one or more existing accounts, such as Savings Account B displayed in option 1911, Credit Account C displayed in option 1912, and Points Account D displayed in option 1914. For example, Savings Account B, Credit Account C, and/or Points Account D can be others of consumer accounts 131 (FIG. 1) held by consumer 129 (FIG. 1) at financial institution 130 (FIG. 1). In a number of embodiments, the options can include the opportunity to open a new loan, as displayed in option 1913. For example, the new loan can be a micro-loan to pay at least partially for the payment amount, as described above. In some embodiments, user interface display 1900 can allow consumer 129 (FIG. 1) to select one of options 1911-1914. In other embodiments, user interface display 1900 can allowed consumer 129 (FIG. 1) to select more than one of options 1911-1914.

In many embodiments, proceeding selection button 1920 can be selected by consumer 129 (FIG. 1) to indicate that accounts corresponding to the one or more options (e.g., 1911-1914) should be used for the payment transaction. In some embodiments, canceling selection button 1930 can be selected by consumer 129 (FIG. 1) to cancel the transaction.

Proceeding to the next drawing, FIG. 20 illustrates an exemplary user interface display 2000 to allow a consumer (e.g., 129 (FIG. 1)) to select the amount to pay using the other account selected in user interface display 1900 (FIG. 19). User interface display 2000 is merely exemplary, and embodiments of the user interface display are not limited to the embodiments presented herein. The user interface display can be employed in many different embodiments or examples not specifically depicted or described herein, and can include other suitable elements. User interface display 2000 can be similar to user interface display 1700 (FIG. 17), user interface display 1800 (FIG. 18), and/or user interface display 1900 (FIG. 19), and various elements of user interface display 2000 can be similar or identical to various elements of user interface display 1700 (FIG. 17), user interface display 1800 (FIG. 18), and/or user interface display 1900 (FIG. 19). In many embodiments, mobile application 123 (FIG. 1) can provide an interface for display on mobile device 120 (FIG. 1), which can include user interface display 2000. In a number of embodiments, the interface can allow consumer 129 (FIG. 1) to select the amount to pay using the other account selected in user interface display 1900 (FIG. 19).

In a number of embodiments, user interface display 2000 can include a title bar 2001, a prompt 2010, an option 2011, an option 2012, an approving selection button 2020, and/or a canceling selection button 2030. In many embodiments, title bar 2001 can include the name of the mobile wallet or mobile application (e.g., mobile application 123 (FIG. 1)). Title bar 2001 can be similar or identical to title bar 1701 (FIG. 17), title bar 1801 (FIG. 18), and/or title bar 1901 (FIG. 19).

In many embodiments, prompt 2010 can ask consumer 129 (FIG. 1) to select the amount to pay using the other account or payment option selected in user interface display 1900 (FIG. 19), such as a new loan. In various embodiments, user interface display 2000 can include one or more options that consumer 129 (FIG. 1) can select, such as options 2011-2012. For example, option 2011 can include the option to pay the full payment amount using the other account (e.g., new loan) selected in user interface display 1900 (FIG. 19). As another example, option 2012 can include the option to partially pay the payment amount using the other account (e.g., new loan) selected in user interface display 1900 (FIG. 19), and can allow consumer 129 (FIG. 1) to enter the amount to be used for the partial payment from the other account. When more than one account was selected using user interface display 1900 (FIG. 19), the user interface display (e.g., 2000) can include a prompt (e.g., 2010) and options (e.g., 2011-2012) for each of the other accounts selected in user interface display 1900 (FIG. 19). In many embodiments, only one of options 2011 and 2012 can be selected, per account, by consumer 129 (FIG. 1) and approved by consumer 129 (FIG. 1) via approving selection button 2020.

In many embodiments, approving selection button 2020 can be selected by consumer 129 (FIG. 1) to indicate that amount selected in one of options 2011-2012 should be used to pay for the payment transaction. In some embodiments, canceling selection button 2030 can be selected by consumer 129 (FIG. 1) to cancel the transaction.

Figure 21:
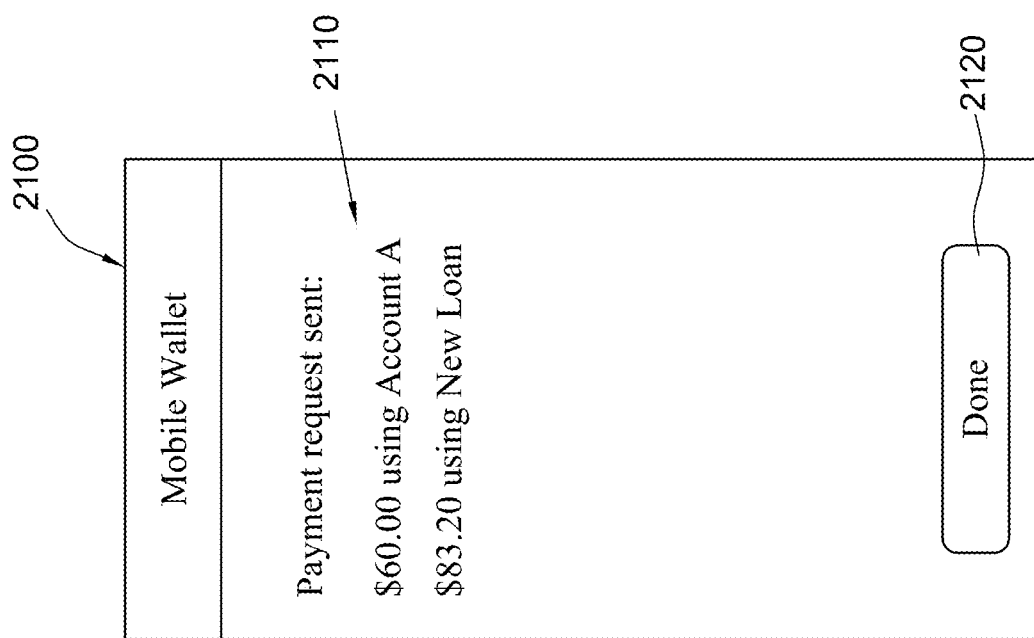
FIG. 21 illustrates an exemplary user interface display to confirm that a payment request has been sent from the mobile device of FIG. 1.

Proceeding to the next drawing, FIG. 21 illustrates an exemplary user interface display 2100 to confirm that a payment request has been sent from mobile device 120 (FIG. 1). User interface display 2100 is merely exemplary, and embodiments of the user interface display are not limited to the embodiments presented herein. The user interface display can be employed in many different embodiments or examples not specifically depicted or described herein, and can include other suitable elements. User interface display 2100 can be similar to user interface display 1700 (FIG. 17), user interface display 1800 (FIG. 18), user interface display 1900 (FIG. 19), and/or user interface display 2000 (FIG. 20), and various elements of user interface display 2100 can be similar or identical to various elements of user interface display 1700 (FIG. 17), user interface display 1800 (FIG. 18), user interface display 1900 (FIG. 19), and/or user interface display 2000 (FIG. 20). In many embodiments, mobile application 123 (FIG. 1) can provide an interface for display on mobile device 120 (FIG. 1), which can include user interface display 2100. In a number of embodiments, the interface can display a confirmation to consumer 129 (FIG. 1) that a request has been sent for the payment authorized in user interface display 1700 (FIG. 17), user interface display 1800 (FIG. 18), user interface display 1900 (FIG. 19), and/or user interface display 2000 (FIG. 20).

In a number of embodiments, user interface display 2100 can include a title bar 2101, a descriptor field 2110, and/or a selection button 2120. In many embodiments, title bar 2101 can include the name of the mobile wallet or mobile application (e.g., mobile application 123 (FIG. 1)). Title bar 2101 can be similar or identical to title bar 1701 (FIG. 17), title bar 1801 (FIG. 18), title bar 1901 (FIG. 19), and/or title bar 2001 (FIG. 20).

In many embodiments, descriptor field 2110 can include information about the payment that was requested, such as the amount that was requested to be paid out of each of the accounts that were authorized for payment by consumer 129 (FIG. 1). For example, if consumer 129 (FIG. 1) choose to partially pay for the payment amount using a new loan in the amount of $83.20, then descriptor field 2110 can display that $60.00 from Account A was used and $83.20 from New Loan was used, as shown in FIG. 21.

In several embodiments, selection button 2120 can be selected by consumer 129 (FIG. 1) to dismiss the message displayed in user interface display 2100.

Proceeding to the next drawing, FIG. 22 illustrates an exemplary user interface display 2200 to confirm that payment transaction to merchant 119 (FIG. 1) has successfully completed. User interface display 2200 is merely exemplary, and embodiments of the user interface display are not limited to the embodiments presented herein. The user interface display can be employed in many different embodiments or examples not specifically depicted or described herein, and can include other suitable elements. User interface display 2200 can be similar to user interface display 1700 (FIG. 17), user interface display 1800 (FIG. 18), user interface display 1900 (FIG. 19), user interface display 2000 (FIG. 20), and/or user interface display 2100 (FIG. 21), and various elements of user interface display 2200 can be similar or identical to various elements of user interface display 1700 (FIG. 17), user interface display 1800 (FIG. 18), user interface display 1900 (FIG. 19), user interface display 2000 (FIG. 20), and/or user interface display 2100 (FIG. 21). In many embodiments, mobile application 123 (FIG. 1) can provide an interface for display on mobile device 120 (FIG. 1), which can include user interface display 2200. In a number of embodiments, the interface can display a confirmation to consumer 129 (FIG. 1) that payment to merchant 119 (FIG. 1) has successfully completed for the payment authorized in user interface display 1700 (FIG. 17), user interface display 1800 (FIG. 18), user interface display 1900 (FIG. 19), and/or user interface display 2000 (FIG. 20).

In a number of embodiments, user interface display 2200 can include a title bar 2201, a descriptor field 2210, and/or a selection button 2220. In many embodiments, title bar 2201 can include the name of the mobile wallet or mobile application (e.g., mobile application 123 (FIG. 1)). Title bar 2201 can be similar or identical to title bar 1701 (FIG. 17), title bar 1801 (FIG. 18), title bar 1901 (FIG. 19), title bar 2001 (FIG. 20), and/or title bar 2101 (FIG. 21).

In many embodiments, descriptor field 2210 can include a message about the success or failure of the payment request, for example, that the payment is complete. If the request failed, the message can indicate that the payment failed.

In several embodiments, selection button 2220 can be selected by consumer 129 (FIG. 1) to dismiss the message displayed in user interface display 2200.

Figure 23:
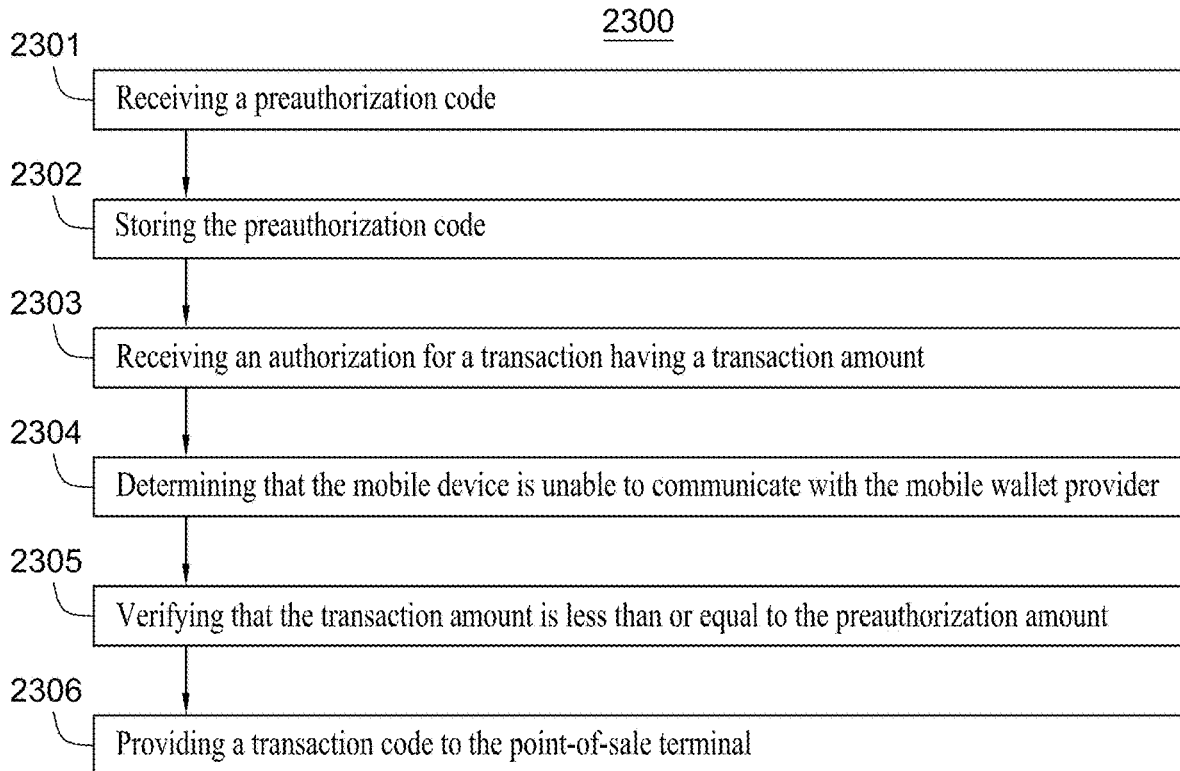
FIG. 23 illustrates a flow chart for a method, according to another embodiment.

Turning ahead in the drawings, FIG. 23 illustrates a flow chart for a method 2300, according to an embodiment. In some embodiments, method 2300 can be a method of facilitating secure payment transactions. Method 2300 is merely exemplary and is not limited to the embodiments presented herein. Method 2300 can be employed in many different embodiments or examples not specifically depicted or described herein. In some embodiments, the procedures, the processes, and/or the activities of method 2300 can be performed in the order presented. In other embodiments, the procedures, the processes, and/or the activities of method 2300 can be performed in any suitable order. In still other embodiments, one or more of the procedures, the processes, and/or the activities of method 2300 can be combined or skipped. In some embodiments, method 2300 can be performed by mobile device 120 (FIG. 1) and/or mobile application 123 (FIG. 1).

Referring to FIG. 23, method 2300 can include a block 2301 of receiving a preauthorization code at a mobile device while the mobile device is in data communication with a mobile wallet provider. For example, the mobile device can be in data communication with the mobile wallet provider, such as through communication channel 171 (FIG. 1). The mobile device can be similar or identical to mobile device 120 (FIG. 1). The mobile wallet provider can be similar or identical to mobile wallet provider 160 (FIG. 1). In some embodiments, the preauthorization code can be similar or identical to the preauthorization code described above. In a number of embodiments, the preauthorization code can include a preauthorization amount, an expiration time, and a digital signature.

In several embodiments, the mobile wallet provider can be operated by a first financial institution that maintains a first account of a user of the mobile device. The user of the mobile device can be similar or identical to consumer 129 (FIG. 1). The first financial institution can be similar or identical to financial institution 130 (FIG. 1). The first account of the user can be similar or identical to one or more of consumer accounts 131 (FIG. 1). In other embodiments, the mobile wallet provider can be operated by an entity that is different from the first financial institution. In several embodiments, the digital signature of the preauthorization code can be cryptographically signed by the first financial institution that maintains the first account of the user.

In several embodiments, method 2300 also can include a block 2302 of storing the preauthorization code in the mobile device. In many embodiments, the preauthorization code can be stored in the mobile device in an encrypted form.

In a number of embodiments, method 2300 additionally can include a block 2303 of receiving, at the mobile device, an authorization from a user of the mobile device for a transaction having a transaction amount while the user is at a point-of-sale terminal of a first entity. The point-of-sale terminal can be similar or identical to point-of-sale terminal 110 (FIG. 1). The first entity can be similar or identical to merchant 119 (FIG. 1). The authorization from the user can be similar or identical to the authorization described above. In many embodiments, the transaction can be for a purchase by the user of one or more items from the first entity.

In several embodiments, method 2300 further can include a block 2304 of determining that the mobile device is unable to communicate with the mobile wallet provider. For example, the mobile device can be "offline," as described above. As an example, the mobile device can be unable to communicate with the mobile wallet provider when a connection between the two, such as communication channel 171 (FIG. 1), is down.

In a number of embodiments, method 2300 additionally can include a block 2305 of verifying that the transaction amount is less than or equal to the preauthorization amount.

In several embodiments, method 2300 further can include a block 2306 of providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity. The transaction system can be similar or identical to transaction system 140 (FIG. 1). In many embodiments, block 2306 can be performed while the mobile device is unable to communicate with the mobile wallet provider. The transaction code can be similar or identical to the transaction code described above. In some embodiments, the transaction code can include the preauthorization code, a transaction identifier, and the transaction amount.

In some embodiments, block 2306 of providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity can include displaying the transaction code as a matrix barcode on a screen of the mobile device. In many embodiments, the point-of-sale terminal can scan the matrix barcode from the screen of the mobile device. In other embodiment, block 2306 of providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity can include transmitting the transaction code from the mobile device to the point-of-sale terminal using a proximity-based wireless data communication protocol.

In some embodiments, the approval can include one of: (a) a settlement credit push of funds for the transaction amount from the first account of the user to a second account of the first entity, or (b) an irrevocable promise to pay the transaction amount from the first account to the second account. The second account can be similar or identical to merchant account 151 (FIG. 1).

In various embodiments, the transaction amount and the preauthorization code can be sent to the transaction system from the first entity through a second financial institution that maintains the second account of the first entity, such as through communication channels 173 and 174 (FIG. 1). The second financial institution can be similar or identical to financial institution 150 (FIG. 1). In other embodiments, the transaction amount and the preauthorization code can be sent to the transaction system from the first entity directly, such as communication channel 178 (FIG. 1).

Figure 24:
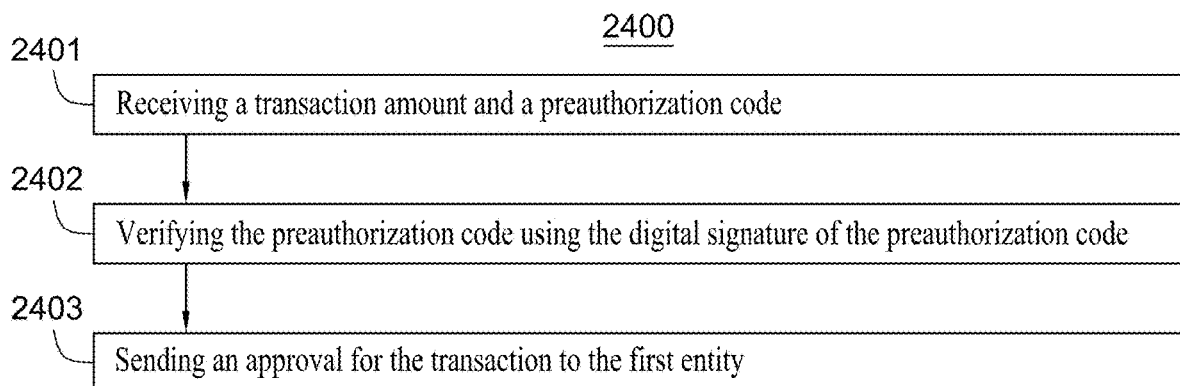
FIG. 24 illustrates a flow chart for a method, according to another embodiment.

Turning ahead in the drawings, FIG. 24 illustrates a flow chart for a method 2400, according to an embodiment. In some embodiments, method 2400 can be a method of facilitating secure payment transactions. Method 2400 is merely exemplary and is not limited to the embodiments presented herein. Method 2400 can be employed in many different embodiments or examples not specifically depicted or described herein. In some embodiments, the procedures, the processes, and/or the activities of method 2400 can be performed in the order presented. In other embodiments, the procedures, the processes, and/or the activities of method 2400 can be performed in any suitable order. In still other embodiments, one or more of the procedures, the processes, and/or the activities of method 2400 can be combined or skipped. In some embodiments, method 2400 can be performed by transaction system 140 (FIG. 1). In some embodiments, method 2400 and other blocks in method 2400 can include using a distributed network including distributed memory architecture to perform the associated activity. This distributed architecture can reduce the impact on the network and system resources to reduce congestion in bottlenecks while still allowing data to be accessible from a central location.

Referring to FIG. 24, method 2400 can include a block 2401 of receiving a transaction amount and a preauthorization code from a first entity. The first entity can be similar or identical to merchant 119 (FIG. 1). In some embodiments, the preauthorization code can be similar or identical to the preauthorization code described above. In many embodiments, the preauthorization code can include a preauthorization amount, an expiration time, and a digital signature. In some embodiments, the transaction amount can be for a transaction authorized by a user of a mobile device at a point-of-sale terminal of the first entity. The user of the mobile device can be similar or identical to consumer 129 (FIG. 1). The mobile device can be similar or identical to mobile device 120 (FIG. 1). The point-of-sale terminal can be similar or identical to point-of-sale terminal 110 (FIG. 1).

In many embodiments, the transaction amount can be less than or equal to the preauthorization amount. In some embodiments, the mobile device received the preauthorization code and stored the preauthorization code in the mobile device while the mobile device was in data communication with a mobile wallet provider, such as through communication channel 171 (FIG. 1). The mobile wallet provider can be similar or identical to mobile wallet provider 160 (FIG. 1). In many embodiments, the mobile device provided a transaction code to the point-of-sale terminal while the mobile device was unable to communicate with the mobile wallet provider. For example, the mobile device can be "offline," as described above. As an example, the mobile device can be unable to communicate with the mobile wallet provider when a connection between the two, such as communication channel 171 (FIG. 1), is down.

In some embodiments, the transaction code can include the preauthorization code, a transaction identifier for the transaction, and the transaction amount. In many embodiments, the transaction code can be provided from the mobile device to the point-of-sale terminal by the mobile device displaying the transaction code as a matrix barcode on a screen of the mobile device, and the point-of-sale terminal scanning the matrix barcode from the screen of the mobile device. In other embodiments, the transaction code can be provided from the mobile device to the point-of-sale terminal by the mobile device transmitting the transaction code from the mobile device to the point-of-sale terminal using a proximity-based wireless data communication protocol.

In some embodiments, the digital signature of the preauthorization code can be cryptographically signed by a first financial institution that maintains a first account of the user. The first financial institution can be similar or identical to financial institution 130 (FIG. 1). The first account of the user can be similar or identical to one or more of consumer accounts 131 (FIG. 1).

In some embodiments, the transaction can be for a purchase by the user of one or more items from the first entity. In many embodiments, the mobile wallet provider can be operated by the first financial institution that maintains the first account of the user. In other embodiments, the mobile wallet provider can be operated by an entity that is different from the first financial institution. In some embodiments, the preauthorization code can be stored in the mobile device in an encrypted form.

In several embodiments, method 2400 also can include a block 2402 of verifying the preauthorization code using the digital signature of the preauthorization code. In some embodiments, block 2402 of verifying the preauthorization code using the digital signature of the preauthorization code can include verifying that the transaction amount is less than or equal to the preauthorization amount, and verifying that the expiration time is at a future time (e.g., not yet expired).

In a number of embodiments, method 2400 additionally can include a block 2403 of sending an approval for the transaction to the first entity in real-time while the user remains at the point-of-sale terminal of the first entity. In some embodiments, the approval can include one of: (a) a settlement credit push of funds for the transaction amount from the first account of the user to a second account of the first entity, or (b) an irrevocable promise to pay the transaction amount from the first account to the second account. The second account can be similar or identical to merchant account 151 (FIG. 1).

In various embodiments, the transaction amount and the preauthorization code can be sent to the transaction system from the first entity through a second financial institution that maintains the second account of the first entity, such as through communication channels 173 and 174 (FIG. 1). The second financial institution can be similar or identical to financial institution 150 (FIG. 1). In other embodiments, the transaction amount and the preauthorization code can be sent to the transaction system from the first entity directly, such as communication channel 178 (FIG. 1).

Figure 25:
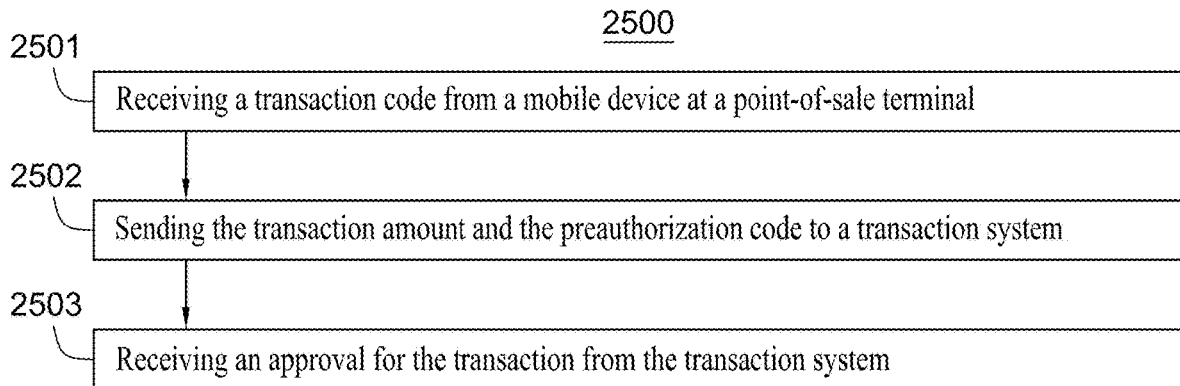
FIG. 25 illustrates a flow chart for a method, according to another embodiment.

Turning ahead in the drawings, FIG. 25 illustrates a flow chart for a method 2500, according to an embodiment. In some embodiments, method 2500 can be a method of facilitating secure payment transactions. Method 2500 is merely exemplary and is not limited to the embodiments presented herein. Method 2500 can be employed in many different embodiments or examples not specifically depicted or described herein. In some embodiments, the procedures, the processes, and/or the activities of method 2500 can be performed in the order presented. In other embodiments, the procedures, the processes, and/or the activities of method 2500 can be performed in any suitable order. In still other embodiments, one or more of the procedures, the processes, and/or the activities of method 2500 can be combined or skipped. In some embodiments, method 2500 can be performed by point-of-sale terminal 110 (FIG. 1). In some embodiments, method 2500 and other blocks in method 2500 can include using a distributed network including distributed memory architecture to perform the associated activity. This distributed architecture can reduce the impact on the network and system resources to reduce congestion in bottlenecks while still allowing data to be accessible from a central location.

Referring to FIG. 25, method 2500 can include a block 2501 of receiving a transaction code from a mobile device at a point-of-sale terminal of a first entity while the mobile device is unable to communicate with a mobile wallet provider. The mobile device can be similar or identical to mobile device 120 (FIG. 1). The point-of-sale terminal can be similar or identical to point-of-sale terminal 110 (FIG. 1). The first entity can be similar or identical to merchant 119 (FIG. 1). The mobile wallet provider can be similar or identical to mobile wallet provider 160 (FIG. 1). In many embodiments, the transaction code can include a preauthorization code, a transaction identifier for a transaction authorized by a user of the mobile device at the point-of-sale terminal, and a transaction amount for the transaction. The user of the mobile device can be similar or identical to consumer 129 (FIG. 1).

In many embodiments, the mobile device received the preauthorization code and stored the preauthorization code in the mobile device while the mobile device was in data communication with the mobile wallet provider, such as through communication channel 171 (FIG. 1). In some embodiments, the preauthorization code includes a preauthorization amount, an expiration time, and a digital signature. In many embodiments, the transaction amount can be less than or equal to the preauthorization amount.

In some embodiments, block 2501 of receiving a transaction code from a mobile device at a point-of-sale terminal of a first entity while the mobile device is unable to communicate with a mobile wallet provider can include scanning a matrix barcode displayed on the screen of the mobile device. The matrix barcode can include the transaction code. In other embodiments, block 2501 of receiving a transaction code from a mobile device at a point-of-sale terminal of a first entity while the mobile device is unable to communicate with a mobile wallet provider can include receiving a transmission of the transaction code from the mobile device using a proximity-based wireless data communication protocol.

In many embodiments, the digital signature of the preauthorization code can be cryptographically signed by a first financial institution that maintains a first account of the user. The first financial institution can be similar or identical to financial institution 130 (FIG. 1). The first account of the user can be similar or identical to one or more of consumer accounts 131 (FIG. 1). In some embodiments, the transaction can be for a purchase by the user of one or more items from the first entity. In many embodiments, the mobile wallet provider can be operated by the first financial institution that maintains the first account of the user. In other embodiments, the mobile wallet provider can be operated by an entity that is different from the first financial institution. In some embodiments, the preauthorization code can be stored in the mobile device in an encrypted form.

In several embodiments, method 2500 also can include a block 2502 of sending the transaction amount and the preauthorization code to a transaction system. The transaction system can be similar or identical to transaction system 140 (FIG. 1). In many embodiments, the transaction system can verify the preauthorization code using the digital signature of the preauthorization code before sending the approval for the transaction.

In various embodiments, the transaction amount and the preauthorization code can be sent to the transaction system from the first entity through a second financial institution that maintains a second account of the first entity, such as through communication channels 173 and 174 (FIG. 1). The second financial institution can be similar or identical to financial institution 150 (FIG. 1). The second account can be similar or identical to merchant account 151 (FIG. 1). In other embodiments, the transaction amount and the preauthorization code can be sent to the transaction system from the first entity directly, such as communication channel 178 (FIG. 1).

In a number of embodiments, method 2500 additionally can include a block 2503 of receiving an approval for the transaction from the transaction system in real-time while the user remains at the point-of-sale terminal. In a number of embodiments, the approval can include one of: (a) a settlement credit push of funds for the transaction amount from the first account of the user to the second account of the first entity, or (b) an irrevocable promise to pay the transaction amount from the first account to the second account.

Figure 26:
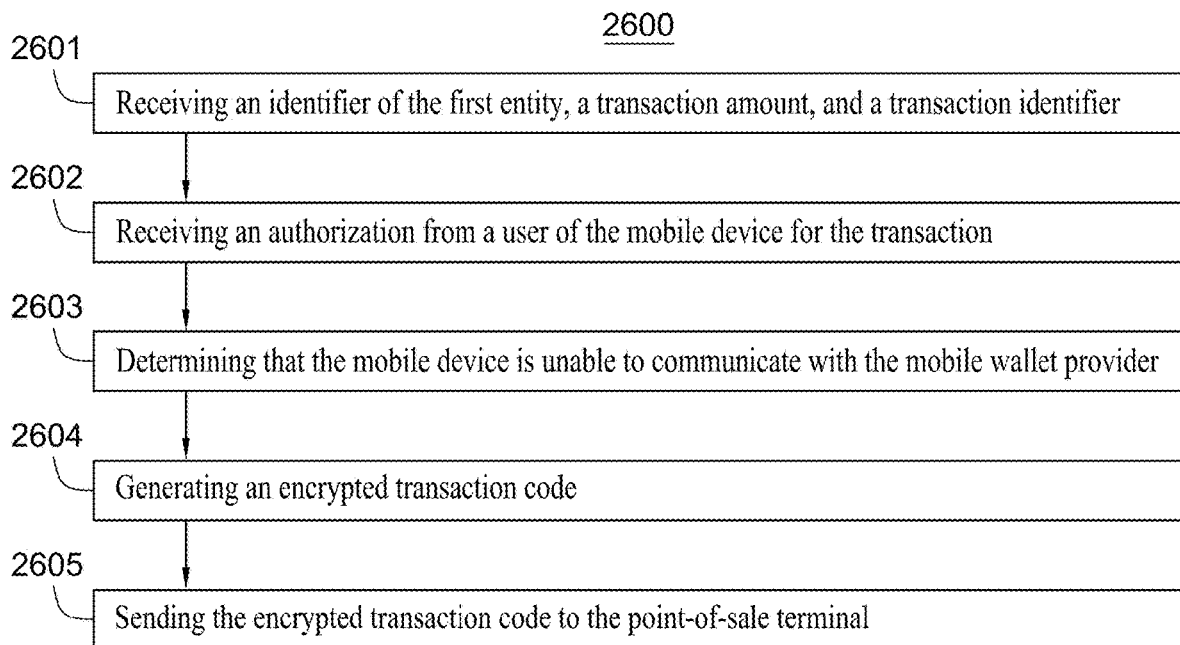
FIG. 26 illustrates a flow chart for a method, according to another embodiment.

Turning ahead in the drawings, FIG. 26 illustrates a flow chart for a method 2600, according to an embodiment. In some embodiments, method 2600 can be a method of facilitating secure payment transactions. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of method 2600 can be performed in any suitable order. In still other embodiments, one or more of the procedures, the processes, and/or the activities of method 2600 can be combined or skipped. In some embodiments, method 2600 can be performed by mobile device 120 (FIG. 1) and/or mobile application 126 (FIG. 1).

Referring to FIG. 26, method 2600 can include a block 2601 of receiving, at a mobile device from a point-of-sale terminal of a first entity, an identifier of the first entity, a transaction amount for a transaction, and a transaction identifier for the transaction. The mobile device can be similar or identical to mobile device 120 (FIG. 1). The point-of-sale terminal can be similar or identical to point-of-sale terminal 110 (FIG. 1). The first entity can be similar or identical to merchant 119 (FIG. 1). In some embodiments, the identifier of the first entity, the transaction amount, and the transaction identifier can be received from the point-of-sale terminal as part of a digitally signed transaction code. In several embodiments, the digitally signed transaction code can be cryptographically signed by the point-of-sale terminal, and/or the digitally signed transaction code can be verified by the mobile device.

In many embodiments, the transaction can be for a purchase by a user of one or more items from the first entity. The user of the mobile device can be similar or identical to consumer 129 (FIG. 1). In some embodiments, first information about the one or more items can be scanned into the mobile application by the user in a store of the first entity. In various embodiments, the first information about the one or more items can be provided by the mobile device to the point-of-sale terminal to cause the point-of-sale terminal to generate the transaction amount for the transaction.

In several embodiments, method 2600 also can include a block 2602 of receiving an authorization from the user of the mobile device for the transaction while the user is at the point-of-sale terminal. In many embodiments, the mobile device can run a mobile application that is associated with a mobile wallet provider. The mobile application can be similar or identical to mobile application 123 (FIG. 1). The mobile wallet provider can be similar or identical to mobile wallet provider 160 (FIG. 1). In several embodiments, the mobile wallet provider can be operated by a first financial institution. The first financial institution can be similar or identical to financial institution 130 (FIG. 1). In other embodiments, the mobile wallet provider can be operated by an entity that is different from the first financial institution.

In a number of embodiments, method 2600 additionally can include a block 2603 of determining that the mobile device is unable to communicate with the mobile wallet provider. For example, the mobile device can be "offline," as described above. As an example, the mobile device can be unable to communicate with the mobile wallet provider when a connection between the two, such as communication channel 171 (FIG. 1), is down.

In several embodiments, method 2600 further can include a block 2604 of generating an encrypted transaction code. In many embodiments, the encrypted transaction code can include a preauthorization from the user to pay the first entity for the transaction amount from a first account of the user maintained by the first financial institution. The first account of the user can be similar or identical to one or more of consumer accounts 131 (FIG. 1). In some embodiments, the preauthorization from the user can be digitally signed by the mobile device, such that the encrypted transaction code includes a digital signature. In many embodiments, the encrypted transaction code can be encrypted by the mobile device using a public key of the mobile wallet provider.

In a number of embodiments, method 2600 additionally can include a block 2605 of sending the encrypted transaction code from the mobile device to the point-of-sale terminal to cause the encrypted transaction code to be sent through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, to cause the payment information to be routed through the transaction system to the second financial institution, and to cause the point-of-sale terminal to receive a notification of the payment for the transaction in real-time while the user remains at the point-of-sale terminal. The transaction system can be similar or identical to transaction system 140 (FIG. 1). The second account can be similar or identical to merchant account 151 (FIG. 1). The second financial institution can be similar or identical to financial institution 150 (FIG. 1). The proxy communication channel can be similar or identical to various embodiments of the proxy communication channel described above. For example, in some embodiments, the proxy communication channel from the point-of-sale terminal to the mobile wallet provider can extend through the second financial institution between the point-of-sale terminal and the transaction system. In other embodiments, the proxy communication channel from the point-of-sale terminal to the mobile wallet provider can extend between the point-of-sale terminal and the transaction system without including the transaction system. In many embodiments, the transaction system can be maintained by an entity that is different from the first entity, the first financial institution, and the second financial institution.

In some embodiments, the mobile wallet provider can verify the preauthorization from the user using the digital signature. In various embodiments, the encrypted transaction code can be decrypted by the mobile wallet provider using a private key of the mobile wallet provider. In a number of embodiments, block 2605 can include displaying the encrypted transaction code as a matrix barcode on a screen of the mobile device. The point-of-sale terminal can scan the matrix barcode from the screen of the mobile device. In other embodiments, block 2605 can include transmitting the encrypted transaction code from the mobile device to the point-of-sale terminal using a proximity-based wireless data communication protocol.

In many embodiments, the payment information can include the transaction identifier, the account identifier of the second account, the transaction amount, and/or one of: (a) a settlement credit push of funds for the transaction amount from the first account of the user to the second account of the first entity, or (b) an irrevocable promise to pay the transaction amount from the first account to the second account.

Figure 27:
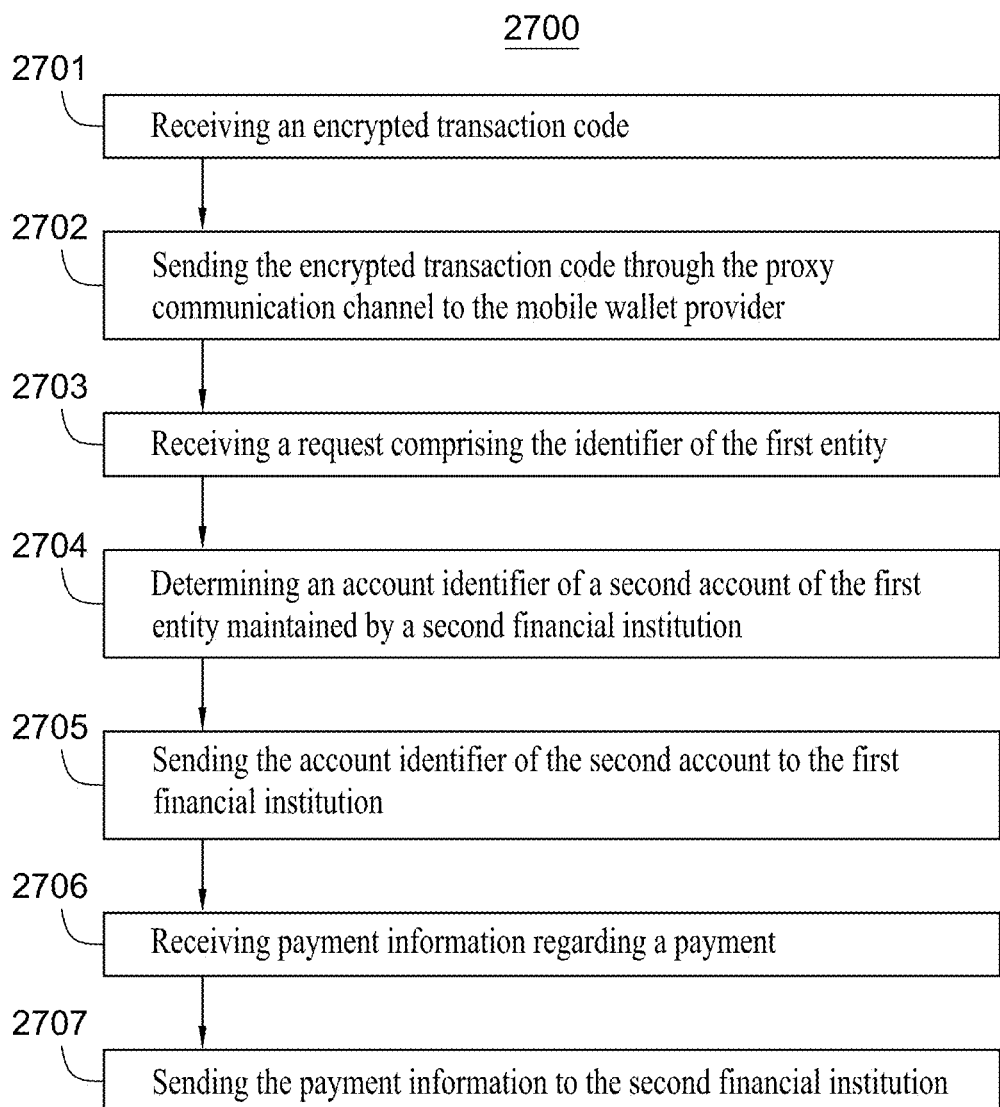
FIG. 27 illustrates a flow chart for a method, according to another embodiment.

Turning ahead in the drawings, FIG. 27 illustrates a flow chart for a method 2700, according to an embodiment. In some embodiments, method 2700 can be a method of facilitating secure payment transactions. Method 2700 is merely exemplary and is not limited to the embodiments presented herein. Method 2700 can be employed in many different embodiments or examples not specifically depicted or described herein. In some embodiments, the procedures, the processes, and/or the activities of method 2700 can be performed in the order presented. In other embodiments, the procedures, the processes, and/or the activities of method 2700 can be performed in any suitable order. In still other embodiments, one or more of the procedures, the processes, and/or the activities of method 2700 can be combined or skipped. In some embodiments, method 2700 can be performed by transaction system 140 (FIG. 1). In some embodiments, method 2700 and other blocks in method 2700 can include using a distributed network including distributed memory architecture to perform the associated activity. This distributed architecture can reduce the impact on the network and system resources to reduce congestion in bottlenecks while still allowing data to be accessible from a central location.

Referring to FIG. 27, method 2700 can include a block 2701 of receiving, at a transaction system being situated along a proxy communication channel extending from a point-of-sale terminal of a first entity to a mobile wallet provider, an encrypted transaction code. The transaction system can be similar or identical to transaction system 140 (FIG. 1). The point-of-sale terminal can be similar or identical to point-of-sale terminal 110 (FIG. 1). The first entity can be similar or identical to merchant 119 (FIG. 1). The mobile wallet provider can be similar or identical to mobile wallet provider 160 (FIG. 1).

In many embodiments, the encrypted transaction code can be generated and sent to the point-of-sale terminal by a mobile device that runs a mobile application associated with the mobile wallet provider. The mobile device can be similar or identical to mobile device 120 (FIG. 1). The mobile application can be similar or identical to mobile application 123 (FIG. 1). In some embodiments, the mobile device can receive from a point-of-sale terminal an identifier of the first entity, a transaction amount of a transaction, and a transaction identifier for the transaction. The point-of-sale terminal can be similar or identical to point-of-sale terminal 110 (FIG. 1). In various embodiments, the mobile device can receives an authorization from a user of the mobile device for the transaction while the user is at the point-of-sale terminal. The user of the mobile device can be similar or identical to consumer 129 (FIG. 1). In some embodiments, the mobile device can determine that the mobile device is unable to communicate with the mobile wallet provider. For example, the mobile device can be "offline," as described above. As an example, the mobile device can be unable to communicate with the mobile wallet provider when a connection between the two, such as communication channel 171 (FIG. 1), is down.

In many embodiments, the encrypted transaction code can include a preauthorization from the user to pay the first entity for the transaction amount from a first account of the user maintained by a first financial institution. The first financial institution can be similar or identical to financial institution 130 (FIG. 1). The first account of the user can be similar or identical to one or more of consumer accounts 131 (FIG. 1).

The proxy communication channel can be similar or identical to various embodiments of the proxy communication channel described above. For example, in some embodiments, the proxy communication channel from the point-of-sale terminal to the mobile wallet provider can extend through a second financial institution between the point-of-sale terminal and the transaction system. The second financial institution can be similar or identical to financial institution 150 (FIG. 1). In other embodiments, the proxy communication channel from the point-of-sale terminal to the mobile wallet provider can extend between the point-of-sale terminal and the transaction system without including the transaction system.

In some embodiments, the transaction system can be maintained by an entity that is different from the first entity, the first financial institution, and the second financial institution. In various embodiments, the mobile wallet provider can be operated by the first financial institution. In many embodiments, the identifier of the first entity, the transaction amount, and the transaction identifier can be sent from the point-of-sale terminal to the mobile device as part of a digitally signed transaction code.

In many embodiments, the digitally signed transaction code can be cryptographically signed by the point-of-sale terminal, and/or the digitally signed transaction code can be verified by the mobile device. In some embodiments, the preauthorization from the user can be digitally signed by the mobile device, such that the encrypted transaction code includes a digital signature. In several embodiments, the encrypted transaction code can be encrypted by the mobile device using a public key of the mobile wallet provider.

In some embodiments, the transaction can be for a purchase by the user of one or more items from the first entity. In many embodiments, first information about the one or more items can be scanned into the mobile application by the user in a store of the first entity. In various embodiments, the first information about the one or more items can be received at the point-of-sale terminal from the mobile device to cause the point-of-sale terminal to generate the transaction amount for the transaction.

In many embodiments, the point-of-sale terminal can receive the encrypted transaction code by scanning the encrypted transaction code as a matrix barcode from a screen of the mobile device. In other embodiments, the point-of-sale terminal can receive the encrypted transaction from the mobile device using a proximity-based wireless data communication protocol.

In several embodiments, method 2700 also can include a block 2702 of sending the encrypted transaction code through the proxy communication channel to the mobile wallet provider, to cause the mobile wallet provider to decrypt the encrypted transaction code and verify the preauthorization from the user. In many embodiments, the mobile wallet provider can verify the preauthorization from the user using the digital signature. In some embodiments, the encrypted transaction code can be decrypted by the mobile wallet provider using a private key of the mobile wallet provider.

In a number of embodiments, method 2700 additionally can include a block 2703 of receiving, from the first financial institution, a request including the identifier of the first entity.

In several embodiments, method 2700 also can include a block 2704 of determining an account identifier of a second account of the first entity maintained by the second financial institution based on the identifier of the first entity. The second account can be similar or identical to merchant account 151 (FIG. 1). For example, the account identified of the second account can be determined using merchant account database 141 (FIG. 1) and/or the identifier of the first entity.

In a number of embodiments, method 2700 additionally can include a block 2705 of sending the account identifier of the second account to the first financial institution.

In several embodiments, method 2700 also can include a block 2706 of receiving, from the first financial institution, payment information regarding a payment to be made to the second account from the first account for the transaction. In some embodiments, the payment information can include the transaction identifier, the account identifier of the second account, the transaction amount, and/or one of: (a) a settlement credit push of funds for the transaction amount from the first account of the user to the second account of the first entity, or (b) an irrevocable promise to pay the transaction amount from the first account to the second account.

In a number of embodiments, method 2700 additionally can include a block 2707 of sending the payment information to the second financial institution, to cause the point-of-sale terminal to receive a notification in real-time while the user remains at the point-of-sale terminal.

Figure 28:
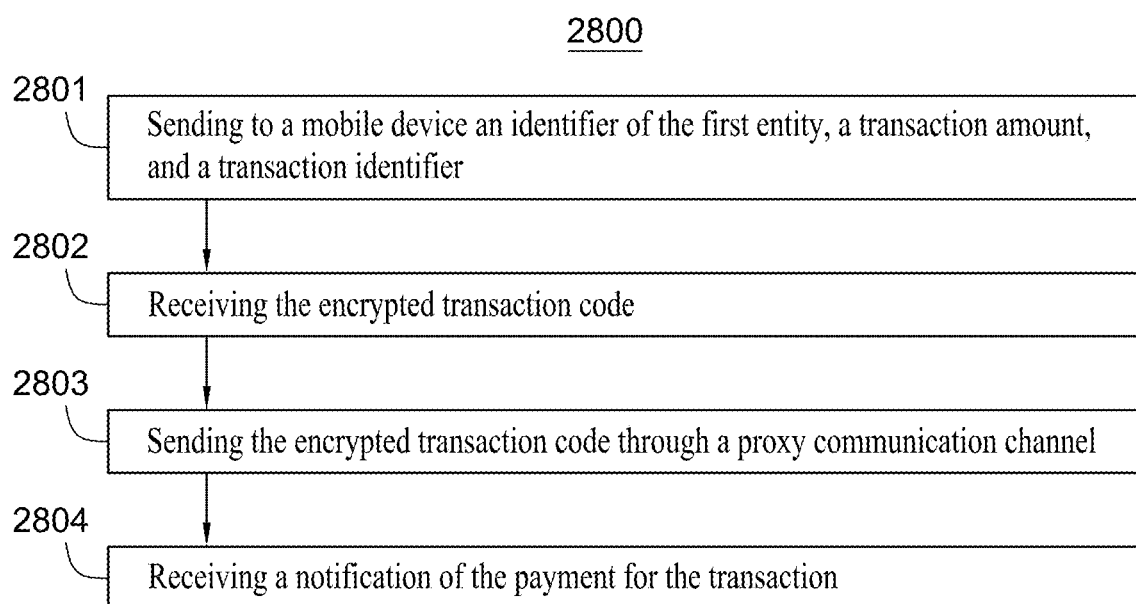
FIG. 28 illustrates a flow chart for a method, according to another embodiment.

Turning ahead in the drawings, FIG. 28 illustrates a flow chart for a method 2800, according to an embodiment. In some embodiments, method 2800 can be a method of facilitating secure payment transactions. Method 2800 is merely exemplary and is not limited to the embodiments presented herein. Method 2800 can be employed in many different embodiments or examples not specifically depicted or described herein. In some embodiments, the procedures, the processes, and/or the activities of method 2800 can be performed in the order presented. In other embodiments, the procedures, the processes, and/or the activities of method 2800 can be performed in any suitable order. In still other embodiments, one or more of the procedures, the processes, and/or the activities of method 2800 can be combined or skipped. In some embodiments, method 2800 can be performed by point-of-sale terminal 110 (FIG. 1). In some embodiments, method 2800 and other blocks in method 2800 can include using a distributed network including distributed memory architecture to perform the associated activity. This distributed architecture can reduce the impact on the network and system resources to reduce congestion in bottlenecks while still allowing data to be accessible from a central location.

Referring to FIG. 28, method 2800 can include a block 2801 of sending, to a mobile device from a point-of-sale terminal of a first entity, an identifier of the first entity, a transaction amount of a transaction, and a transaction identifier for the transaction. The mobile device can be similar or identical to mobile device 120 (FIG. 1). The point-of-sale terminal can be similar or identical to point-of-sale terminal 110 (FIG. 1). The first entity can be similar or identical to merchant 119 (FIG. 1).

In many embodiments, the mobile device can run a mobile application that is associated with a mobile wallet provider. The mobile application can be similar or identical to mobile application 123 (FIG. 1). The mobile wallet provider can be similar or identical to mobile wallet provider 160 (FIG. 1). In several embodiments, the mobile device can receive an authorization from a user of the mobile device for the transaction while the user is at the point-of-sale terminal. The user of the mobile device can be similar or identical to consumer 129 (FIG. 1). In some embodiments, the mobile device can determines that the mobile device is unable to communicate with the mobile wallet provider. For example, the mobile device can be "offline," as described above. As an example, the mobile device can be unable to communicate with the mobile wallet provider when a connection between the two, such as communication channel 171 (FIG. 1), is down. In many embodiments, the mobile device can generates an encrypted transaction code. In some embodiments, the encrypted transaction code can include a preauthorization from the user to pay the first entity for the transaction amount from a first account of the user maintained by a first financial institution. The first financial institution can be similar or identical to financial institution 130 (FIG. 1). The first account of the user can be similar or identical to one or more of consumer accounts 131 (FIG. 1).

In some embodiments, the mobile wallet provider can be operated by the first financial institution. In various embodiments, the identifier of the first entity, the transaction amount, and the transaction identifier can be sent from the point-of-sale terminal to the mobile device as part of a digitally signed transaction code. In many embodiments, the digitally signed transaction code can be cryptographically signed by the point-of-sale terminal. In a number of embodiments, the digitally signed transaction code can be verified by the mobile device. In some embodiments, the identifier of the first entity, the transaction amount, and the transaction identifier can be sent from the point-of-sale terminal to the mobile device as part of a digitally signed transaction code. In several embodiments, the digitally signed transaction code can be cryptographically signed by the point-of-sale terminal. In many embodiments, the digitally signed transaction code can be verified by the mobile device. In some embodiments, the encrypted transaction code can be encrypted by the mobile device using a public key of the mobile wallet provider. In several embodiments, the encrypted transaction code can be decrypted by the mobile wallet provider using a private key of the mobile wallet provider.

In a number of embodiments, the transaction can be for a purchase by the user of one or more items from the first entity. In some embodiments, first information about the one or more items can be scanned into the mobile application by the user in a store of the first entity. In various embodiments, the first information about the one or more items can be received at the point-of-sale terminal from the mobile device to cause the point-of-sale terminal to generate the transaction amount for the transaction.

In several embodiments, method 2800 also can include a block 2802 of receiving the encrypted transaction code from the mobile device. In some embodiments, block 2802 of receiving the encrypted transaction code from the mobile device can include scanning the encrypted transaction code as a matrix barcode from a screen of the mobile device. In other embodiments, block 2802 of receiving the encrypted transaction code from the mobile device can include receiving the encrypted transaction code from the mobile device using a proximity-based wireless data communication protocol.

In a number of embodiments, method 2800 additionally can include a block 2803 of sending the encrypted transaction code through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, and to cause the payment information to be routed through the transaction system to the second financial institution. The second financial institution can be similar or identical to financial institution 150 (FIG. 1). The second account can be similar or identical to merchant account 151 (FIG. 1). The transaction system can be similar or identical to transaction system 140 (FIG. 1). In several embodiments, the transaction system can be maintained by an entity that is different from the first entity, the first financial institution, and the second financial institution.

In many embodiments, the proxy communication channel can be similar or identical to various embodiments of the proxy communication channel described above. For example, in some embodiments, the proxy communication channel from the point-of-sale terminal to the mobile wallet provider can extend through the second financial institution between the point-of-sale terminal and the transaction system. In other embodiments, the proxy communication channel from the point-of-sale terminal to the mobile wallet provider can extend between the point-of-sale terminal and the transaction system without including the transaction system.

In several embodiments, the payment information can include the transaction identifier, the account identifier of the second account, the transaction amount, and/or one of: (a) a settlement credit push of funds for the transaction amount from the first account of the user to the second account of the first entity, or (b) an irrevocable promise to pay the transaction amount from the first account to the second account.

In several embodiments, method 2800 also can include a block 2804 of receiving, at the point-of-sale terminal, a notification of the payment for the transaction in real-time while the user remains at the point-of-sale terminal.

Returning again to FIG. 1, as described above, point-of-sale terminal 110 can include one or more systems, such as checkout system 111, communication system 112, payment system 113, consumer information system 114, security system 115, preauthorization system 116, and/or proxy communication system 117. Point-of-sale terminal 110 and the systems therein are merely exemplary and are not limited to the embodiments presented herein. Point-of-sale terminal 110 can be employed in many different embodiments or examples not specifically depicted or described herein. In some embodiments, certain elements, systems, or modules of point-of-sale terminal 110 can perform various procedures, processes, and/or acts. In other embodiments, the procedures, processes, and/or acts can be performed by other suitable elements, systems, or modules.

In many embodiments, checkout system 111 can at least partially perform block 501 (FIG. 5) of determining, at a point-of-sale terminal at a store of a merchant, a payment amount for one or more items to be purchased from the merchant by a consumer, block 901 (FIG. 9) of determining, at a point-of-sale terminal at a store of a merchant, a payment amount for one or more items to be purchased from the merchant by a consumer in a transaction, and/or block 1601 (FIG. 16) of determining, at a point-of-sale terminal at a store of a merchant, a payment amount for one or more items to be purchased from the merchant by a consumer in a transaction.

In several embodiments, communication system 112 can at least partially perform block 502 (FIG. 5) of sending first information from the point-of-sale terminal to a mobile device used by the consumer, block 503 (FIG. 5) of receiving at the point-of-sale terminal from the mobile device, information about the consumer, block 504 (FIG. 5) of receiving, at the point-of-sale terminal from the second financial institution, a notification to satisfy an expectation of the merchant for payment from the consumer, block 903 (FIG. 9) of providing the transaction code to a mobile device being used by the consumer, block 904 (FIG. 9) of receiving, at the point-of-sale terminal, a notification of payment for the transaction in real-time while the consumer remains at the store of the merchant, block 1602 (FIG. 16) of sending first information from the point-of-sale terminal to a mobile device used by the consumer, block 1603 (FIG. 16) of receiving, at the point-of-sale terminal, a notification of payment for the transaction in real-time while the consumer remains at the store of the merchant, block 2501 (FIG. 25) of receiving a transaction code from a mobile device at a point-of-sale terminal of a first entity while the mobile device is unable to communicate with a mobile wallet provider, block 2502 (FIG. 25) of sending the transaction amount and the preauthorization code to a transaction system, and/or block 2801 (FIG. 28) of sending, to a mobile device from a point-of-sale terminal of a first entity, an identifier of the first entity, a transaction amount of a transaction, and a transaction identifier for the transaction.

In a number of embodiments, payment system 113 can at least partially perform block 504 (FIG. 5) of receiving, at the point-of-sale terminal from the second financial institution, a notification to satisfy an expectation of the merchant for payment from the consumer, block 904 (FIG. 9) of receiving, at the point-of-sale terminal, a notification of payment for the transaction in real-time while the consumer remains at the store of the merchant, block 2503 (FIG. 25) of receiving an approval for the transaction from the transaction system in real-time while the user remains at the point-of-sale terminal, and/or block 2804 (FIG. 28) of receiving, at the point-of-sale terminal, a notification of the payment for the transaction in real-time while the user remains at the point-of-sale terminal.

In various embodiments, consumer information system 114 can at least partially perform block 503 (FIG. 5) of receiving at the point-of-sale terminal from the mobile device, information about the consumer.

In a number of embodiments, security system 115 can at least partially perform block 902 (FIG. 9) of generating a transaction code including a merchant public identifier, the payment amount, a transaction identifier for the transaction, and a digital signature, and/or block 2801 (FIG. 28) of sending, to a mobile device from a point-of-sale terminal of a first entity, an identifier of the first entity, a transaction amount of a transaction, and a transaction identifier for the transaction.

In a number of embodiments, preauthorization system 116 can at least partially perform block 2501 (FIG. 25) of receiving a transaction code from a mobile device at a point-of-sale terminal of a first entity while the mobile device is unable to communicate with a mobile wallet provider, and/or block 2502 (FIG. 25) of sending the transaction amount and the preauthorization code to a transaction system.

In many embodiments, proxy communication system 117 can at least partially perform block 2802 (FIG. 28) of receiving the encrypted transaction code from the mobile device, and/or block 2803 (FIG. 28) of sending the encrypted transaction code through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, and to cause the payment information to be routed through the transaction system to the second financial institution Continuing with FIG. 1, as described above, mobile device 120 can include one or more systems, such as authentication system 121, account system 122, communication system 124, security system 125, loan system 126, stand-in credit system 127, and/or proxy communication system 128. Mobile device 120 and the systems therein are merely exemplary and are not limited to the embodiments presented herein. Mobile device 120 can be employed in many different embodiments or examples not specifically depicted or described herein. In some embodiments, certain elements, systems, or modules of mobile device 120 can perform various procedures, processes, and/or acts. In other embodiments, the procedures, processes, and/or acts can be performed by other suitable elements, systems, or modules.

In many embodiments, authentication system 121 can at least partially perform block 401 (FIG. 4) of performing, at a mobile device, a preliminary identity authentication of a consumer using the mobile device, block 407 (FIG. 4) of performing, at the mobile device, the additional identity authentication of the consumer using the mobile device, and/or block 1301 (FIG. 13) of performing, at a mobile device being used by a consumer, an identity authentication of the consumer.

In several embodiments, account system 122 can at least partially perform block 403 (FIG. 4) of sending, from the mobile device to the first financial institution, a preliminary request for account information, block 404 (FIG. 4) of receiving, at the mobile device from the first financial institution the account information, block 1304 (FIG. 13) of receiving, from the first financial institution, an account balance of a demand deposit account of the consumer maintained by the first financial institution, and/or block 2303 (FIG. 23) of receiving, at the mobile device, an authorization from a user of the mobile device for a transaction having a transaction amount while the user is at a point-of-sale terminal of a first entity.

In a number of embodiments, communication system 124 can at least partially perform block 402 (FIG. 4) of receiving at the mobile device first information from a point-of-sale terminal, block 403 (FIG. 4) of sending, from the mobile device to the first financial institution, a preliminary request for account information, block 404 (FIG. 4) of receiving, at the mobile device from the first financial institution, the account information, block 405 (FIG. 4) of sending, from the mobile device to the first financial institution, a first request to pay the merchant for the payment amount from the first account for one or more items to be purchased from the merchant by the consumer, block 406 (FIG. 4) of receiving, at the mobile device from the first financial institution, an additional authentication request to perform an additional identity authentication of the consumer using the mobile device, block 408 (FIG. 4) of sending, from the mobile device to the first financial institution, a response to the additional authentication request, block 1001 (FIG. 10) of receiving, at a mobile device being used by a consumer, a transaction code from a point-of-sale terminal at a store of a merchant, block 1003 (FIG. 10) of receiving from the consumer an approval for the transaction, block 1004 (FIG. 10) of sending, from the mobile device, a request to pay the merchant for the payment amount from a first account of the consumer maintained by a first financial institution, block 1302 (FIG. 13) of receiving, at the mobile device, first information from a point-of-sale terminal at a store of a merchant, block 1303 (FIG. 13) of sending, from the mobile device, a request to pay the merchant for the payment amount from one or more first accounts of the consumer maintained by a first financial institution, block 1305 (FIG. 13) of displaying the account balance of the demand deposit account to the consumer, block 2301 (FIG. 23) of receiving a preauthorization code at a mobile device while the mobile device is in data communication with a mobile wallet provider, block 2304 (FIG. 23) of determining that the mobile device is unable to communicate with the mobile wallet provider, block 2306 (FIG. 23) of providing a transaction code from the mobile device to the point-of-sale terminal to cause the first entity to send the transaction amount and the preauthorization code to a transaction system, and to cause the transaction system to send an approval for the transaction in real-time while the user remains at the point-of-sale terminal of the first entity, block 2601 (FIG. 26) of receiving, at a mobile device from a point-of-sale terminal of a first entity, an identifier of the first entity, a transaction amount for a transaction, and a transaction identifier for the transaction, block 2602 (FIG. 26) of receiving an authorization from the user of the mobile device for the transaction while the user is at the point-of-sale terminal, block 2603 (FIG. 26) of determining that the mobile device is unable to communicate with the mobile wallet provider, and/or block 2605 (FIG. 26) of sending the encrypted transaction code from the mobile device to the point-of-sale terminal to cause the encrypted transaction code to be sent through a proxy communication channel extending from the point-of-sale terminal, through a transaction system, to the mobile wallet provider, to cause the mobile wallet provider to decrypt the encrypted transaction code and verify the preauthorization from the user, to cause the first financial institution to retrieve from the transaction system an account identifier of a second account of the first entity maintained by a second financial institution based on the identifier of the first entity and send to the transaction system payment information regarding a payment to be made to the second account from the first account for the transaction, to cause the payment information to be routed through the transaction system to the second financial institution, and to cause the point-of-sale terminal to receive a notification of the payment for the transaction in real-time while the user remains at the point-of-sale terminal.

In several embodiments, security system 125 can at least partially perform block 1002 (FIG. 10) of verifying the digital signature for the transaction code.

In a number of embodiments, loan system 126 can at least partially perform block 1305 (FIG. 13) of displaying the account balance of the demand deposit account to the consumer, block 1307 (FIG. 13) of presenting to the consumer an option to at least partially fund the transaction using the at least one non-demand deposit account, and/or block 1308 (FIG. 13) of receiving from the consumer a selection to at least partially fund the payment amount of the transaction using the at least one non-demand deposit account.

In a number of embodiments, stand-in credit system 127 can at least partially perform block 2301 (FIG. 23) of receiving a preauthorization code at a mobile device while the mobile device is in data communication with a mobile wallet provider, block 2302 (FIG. 23) of storing the preauthorization code in the mobile device, and/or block 2305 (FIG. 23) of verifying that the transaction amount is less than or equal to the preauthorization amount.

In many embodiments, proxy communication system 128 can at least partially perform block 2604 (FIG. 26) of generating an encrypted transaction code.

Continuing with FIG. 1, as described above, financial institution 130 can include one or more systems, such as communication system 132, authorization system 133, account system 134, loan system 135, preauthorization system 136, and/or proxy communication system 137. Financial institution 130 and the systems therein are merely exemplary and are not limited to the embodiments presented herein. Financial institution 130 can be employed in many different embodiments or examples not specifically depicted or described herein. In some embodiments, certain elements, systems, or modules of financial institution 130 can perform various procedures, processes, and/or acts. In other embodiments, the procedures, processes, and/or acts can be performed by other suitable elements, systems, or modules.

In many embodiments, communication system 132 can at least partially perform block 201 (FIG. 2) of receiving, at a first financial institution from a mobile device, a preliminary request for account information, block 202 (FIG. 2) of sending, from the first financial institution to the mobile device, the account information, block 203 (FIG. 2) of receiving, at a first financial institution from a mobile device of a consumer, a first request to pay a merchant for a payment amount from a first account of the consumer maintained by the first financial institution, block 206 (FIG. 2) of sending, from the first financial institution to the first system, a second request to determine the second information, block 207 (FIG. 2) of receiving, at the first financial institution from the first system, the third information, block 212 (FIG. 2) of sending, from the first financial institution to the first system, payment information regarding a payment to be made to the second account from the first account, block 1101 (FIG. 11) of receiving, at a first financial institution from a mobile device being used by a consumer, a request to pay a merchant for a payment amount from a first account of the consumer maintained by the first financial institution, block 1102 (FIG. 11) of retrieving, at the first financial institution from a transaction system, an account identifier for a second account of the merchant maintained by a second financial institution based on the merchant public identifier, block 1103 (FIG. 11) of sending, from the first financial institution to the transaction system, payment information regarding a payment to be made to the second account from the first account, block 1401 (FIG. 14) of receiving, at a first financial institution from a mobile device being used by a consumer, a request to pay a merchant for a payment amount from one or more first accounts of the consumer maintained by the first financial institution, block 1402 (FIG. 14) of retrieving, at the first financial institution from a transaction system, an account identifier for a second account of the merchant maintained by a second financial institution based on the merchant identifier, block 1403 (FIG. 14) of sending, from the first financial institution to the transaction system, payment information regarding a payment to be made to the second account from the one or more first accounts, block 1404 (FIG. 14) of sending, to the mobile device, an account balance of a demand deposit account of the consumer maintained by the first financial institution, block 1406 (FIG. 14) of sending, to the mobile device, an option to at least partially fund the transaction using the at least one non-demand deposit account, and/or block 1407 (FIG. 14) of receiving, from the mobile device, a selection to at least partially fund the payment amount of the transaction using the at least one non-demand deposit account.

In some embodiments, authorization system 133 can at least partially perform block 208 (FIG. 2) of authorizing, at the first financial institution, a payment from the first account to the second account, and/or block 209 (FIG. 2) of authenticating an identity of the consumer that used the mobile device to send the first request to pay the merchant from the first account.

In a number of embodiments, account system 134 can at least partially perform block 201 (FIG. 2) of receiving, at a first financial institution from a mobile device, a preliminary request for account information, block 202 (FIG. 2) of sending, from the first financial institution to the mobile device, the account information, block 204 (FIG. 2) of determining, at the first financial institution, second information, block 205 (FIG. 2) of determining, at the first financial institution, the second information at least partially based on the merchant identifier and the third information, block 209 (FIG. 2) of authenticating an identity of the consumer that used the mobile device to send the first request to pay the merchant from the first account, block 210 (FIG. 2) of determining a current status of the first account, block 211 (FIG. 2) of determining available funds of the first account, block 1102 (FIG. 11) of retrieving, at the first financial institution from a transaction system, an account identifier for a second account of the merchant maintained by a second financial institution based on the merchant public identifier, block 1402 (FIG. 14) of retrieving, at the first financial institution from a transaction system, an account identifier for a second account of the merchant maintained by a second financial institution based on the merchant identifier, and/or block 1404 (FIG. 14) of sending, to the mobile device, an account balance of a demand deposit account of the consumer maintained by the first financial institution.

In some embodiments, loan system 135 can at least partially perform block 1405 (FIG. 14) of determining that the account balance of the demand deposit account is less than the payment amount of the transaction, block 1406 (FIG. 14) of sending, to the mobile device, an option to at least partially fund the transaction using the at least one non-demand deposit account, block 1407 (FIG. 14) of receiving, from the mobile device, a selection to at least partially fund the payment amount of the transaction using the at least one non-demand deposit account, and/or creating the loan account.

In a number of embodiments, preauthorization system 136 can at least partially perform generating the preauthorization code.

In many embodiments, proxy communication system 137 can at least partially perform transmitting the encrypted transaction code along the proxy communication channel.

Continuing with FIG. 1, as described above, transaction system 140 can include one or more systems, such as communication system 143, account system 144, transaction system 145, security system 146, preauthorization system 147, and/or proxy communication system 148. Transaction system 140 and the systems therein are merely exemplary and are not limited to the embodiments presented herein. Transaction system 140 can be employed in many different embodiments or examples not specifically depicted or described herein. In some embodiments, certain elements, systems, or modules of transaction system 140 can perform various procedures, processes, and/or acts. In other embodiments, the procedures, processes, and/or acts can be performed by other suitable elements, systems, or modules.

In many embodiments, communication system 143 can at least partially perform block 301 (FIG. 3) of receiving, at a first system from a first financial institution, a request, block 303 (FIG. 3) of sending the first information from the first system to the first financial institution, block 304 (FIG. 3) of receiving, at the first system from the first financial institution, payment information regarding a payment to be made to the second account from the first account to pay the merchant for one or more items to be purchased from the merchant by the consumer for the payment amount, block 306 (FIG. 3) of sending, from the first system to the second financial institution, the payment information such that the second financial institution, upon receiving the payment information, notifies the merchant to satisfy an expectation of the merchant for payment from the consumer, block 1201 (FIG. 12) of receiving, at a transaction system from a first entity, a request including a merchant public identifier associated with a merchant, block 1203 (FIG. 12) of sending the account identifier to the first financial institution, block 1204 (FIG. 12) of receiving, at the transaction system from the first financial institution, payment information regarding a payment to be made to the second account from the first account, block 1205 (FIG. 12) of sending, from the transaction system to the second financial institution, the payment information, block 1501 (FIG. 15) of receiving, at a transaction system from a first entity, a request including a merchant identifier associated with a merchant, block 1503 (FIG. 15) of sending the account identifier from the transaction system to the first financial institution, block 1504 (FIG. 15) of receiving, at the transaction system from the first financial institution, payment information regarding a payment to be made to the second account from the one or more first accounts, block 1505 (FIG. 15) of sending, from the transaction system to the second financial institution, the payment information, such that a point-of-sale terminal at the store of the merchant receives a notification of payment for the transaction in real-time while the consumer remains at the store of the merchant, block 2401 (FIG. 24) of receiving a transaction amount and a preauthorization code from a first entity, block 2403 (FIG. 24) of sending an approval for the transaction to the first entity in real-time while the user remains at the point-of-sale terminal of the first entity, block 2703 (FIG. 27) of receiving, from the first financial institution, a request including the identifier of the first entity, block 2705 (FIG. 27) of sending the account identifier of the second account to the first financial institution, block 2706 (FIG. 27) of receiving, from the first financial institution, payment information regarding a payment to be made to the second account from the first account for the transaction, and/or block 2707 (FIG. 27) of sending the payment information to the second financial institution, to cause the point-of-sale terminal to receive a notification in real-time while the user remains at the point-of-sale terminal.

In some embodiments, account system 144 can at least partially perform block 302 (FIG. 3) of determining, at the first system, using the merchant account database, first information, block 1202 (FIG. 12) of determining, at the transaction system, an account identifier of the second account based on the merchant public identifier using a merchant account database, block 1502 (FIG. 15) of determining, at the transaction system, an account identifier of the second account of the merchant maintained by a second financial institution using a merchant account database, and/or block 2704 (FIG. 27) of determining an account identifier of a second account of the first entity maintained by the second financial institution based on the identifier of the first entity.

In a number of embodiments, transaction system 145 can at least partially perform block 305 (FIG. 3) of storing the payment information in the transaction database, block 1204 (FIG. 12) of receiving, at the transaction system from the first financial institution, payment information regarding a payment to be made to the second account from the first account, block 1205 (FIG. 12) of sending, from the transaction system to the second financial institution, the payment information, block 2706 (FIG. 27) of receiving, from the first financial institution, payment information regarding a payment to be made to the second account from the first account for the transaction, and/or block 2707 (FIG. 27) of sending the payment information to the second financial institution, to cause the point-of-sale terminal to receive a notification in real-time while the user remains at the point-of-sale terminal.

In some embodiments, account system 146 can at least partially perform generating the transaction code and/or merchant security transaction code.

In a number of embodiments, preauthorization system 147 can at least partially perform block 2402 (FIG. 24) of verifying the preauthorization code using the digital signature of the preauthorization code, block 2701 (FIG. 27) of receiving, at a transaction system being situated along a proxy communication channel extending from a point-of-sale terminal of a first entity to a mobile wallet provider, an encrypted transaction code, and/or block 2702 (FIG. 27) of sending the encrypted transaction code through the proxy communication channel to the mobile wallet provider, to cause the mobile wallet provider to decrypt the encrypted transaction code and verify the preauthorization from the user.

In many embodiments, proxy communication system 148 can at least partially perform transmitting the encrypted transaction code along the proxy communication channel.

Continuing with FIG. 1, as described above, financial institution 150 can include one or more systems, such as communication system 152, account system 153, and/or proxy communication system 154. Financial institution 150 and the systems therein are merely exemplary and are not limited to the embodiments presented herein. Financial institution 150 can be employed in many different embodiments or examples not specifically depicted or described herein. In some embodiments, certain elements, systems, or modules of financial institution 150 can perform various procedures, processes, and/or acts. In other embodiments, the procedures, processes, and/or acts can be performed by other suitable elements, systems, or modules.

In many embodiments, communication system 152 can at least partially perform block 601 (FIG. 6) of receiving, at a second financial institution from a first system, payment information regarding a payment to be made to a second account of a merchant maintained by the second financial institution from a first account of a consumer maintained by a first financial institution to pay the merchant for one or more items to be purchased from the merchant by the consumer for the payment amount, and/or block 603 (FIG. 6) of sending, from the second financial institution to the point-of-sale terminal, a notification to satisfy an expectation of the merchant for payment from the consumer.

In various embodiments, account system 153 can at least partially perform block 602 (FIG. 6) of crediting the second account with the payment amount.

In many embodiments, proxy communication system 154 can at least partially perform transmitting the encrypted transaction code along the proxy communication channel.

Continuing with FIG. 1, as described above, mobile wallet provider 160 can include one or more systems, such as proxy communication system 161. Mobile wallet provider 160 and the systems therein are merely exemplary and are not limited to the embodiments presented herein. Mobile wallet provider 160 can be employed in many different embodiments or examples not specifically depicted or described herein. In some embodiments, certain elements, systems, or modules of mobile wallet provider can perform various procedures, processes, and/or acts. In other embodiments, the procedures, processes, and/or acts can be performed by other suitable elements, systems, or modules.

In many embodiments, proxy communication system 161 can at least partially perform decrypting the encrypted transaction code, and/or verifying the preauthorization from the user.

Figure 8:
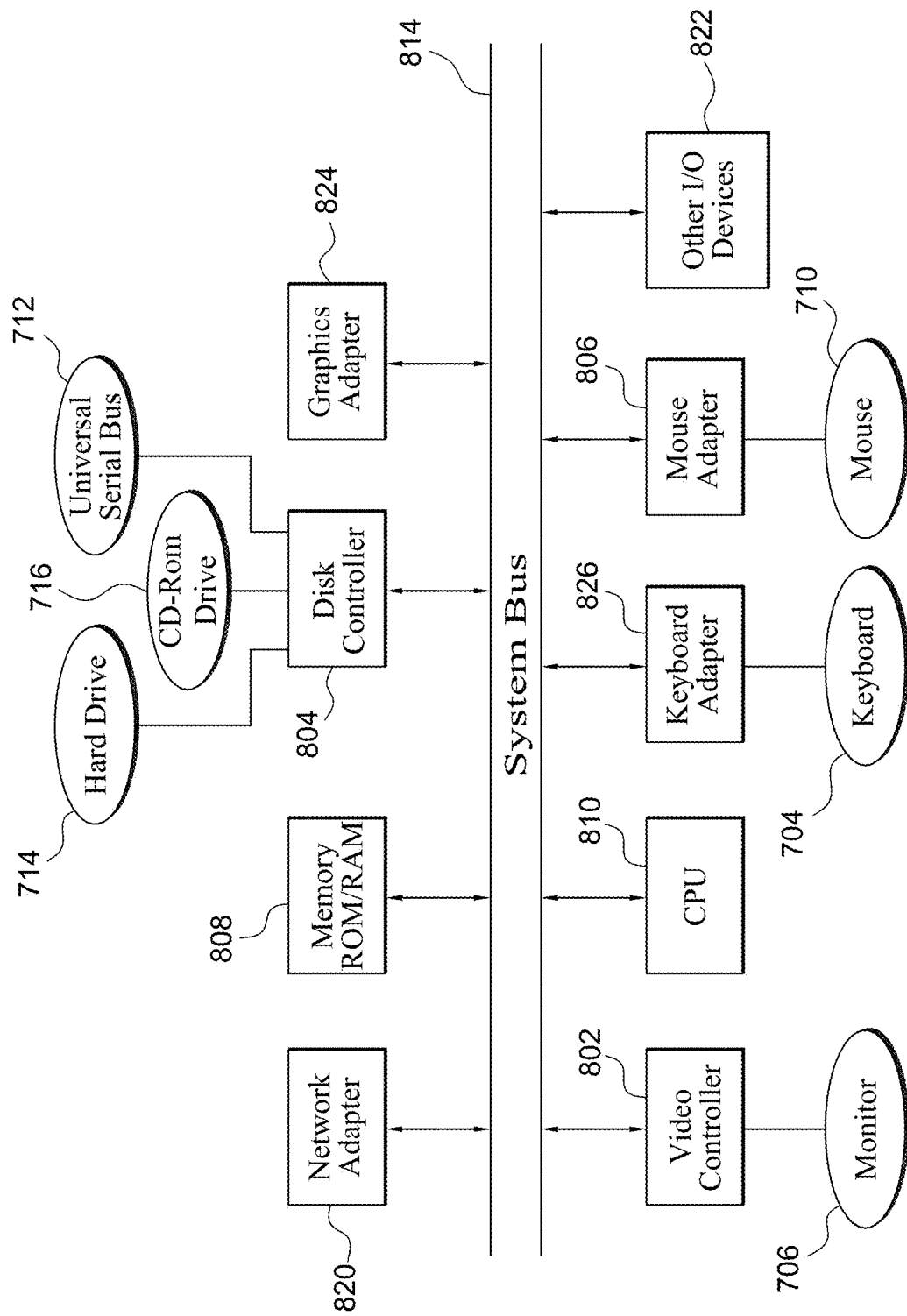
FIG. 8 illustrates a representative block diagram of an example of elements included in circuit boards inside a chassis of the computer of FIG. 7.

Turning ahead in the drawings, FIG. 7 illustrates a computer 700, all of which or a portion of which can be suitable for implementing an embodiment of at least a portion of point-of-sale terminal 110 (FIG. 1), mobile device 120 (FIG. 1), financial institution 130 (FIG. 1), transaction system 140 (FIG. 1), financial institution 150 (FIG. 1), and/or the techniques described in method 200 (FIG. 2), method 300 (FIG. 3), method 400 (FIG. 4), method 500 (FIG. 5), method 600 (FIG. 6), method 900 (FIG. 9), method 1000 (FIG. 10), method 1100 (FIG. 11), method 1200 (FIG. 12), method 1300 (FIG. 13), method 1400 (FIG. 14), method 1500 (FIG. 15), and/or method 1600 (FIG. 16). Computer 700 includes a chassis 702 containing one or more circuit boards (not shown), a USB (universal serial bus) port 712, a Compact Disc Read-Only Memory (CD-ROM) and/or Digital Video Disc (DVD) drive 716, and a hard drive 714. A representative block diagram of the elements included on the circuit boards inside chassis 702 is shown in FIG. 8. A central processing unit (CPU) 810 in FIG. 8 is coupled to a system bus 814 in FIG. 8. In various embodiments, the architecture of CPU 810 can be compliant with any of a variety of commercially distributed architecture families.

Continuing with FIG. 8, system bus 814 also is coupled to memory 808 that includes both read only memory (ROM) and random access memory (RAM). Non-volatile portions of memory storage unit 808 or the ROM can be encoded with a boot code sequence suitable for restoring computer 700 (FIG. 7) to a functional state after a system reset. In addition, memory 808 can include microcode such as a Basic Input-Output System (BIOS). In some examples, the one or more memory storage units of the various embodiments disclosed herein can comprise memory storage unit 808, a USB-equipped electronic device, such as, an external memory storage unit (not shown) coupled to universal serial bus (USB) port 712 (FIGS. 7-8), hard drive 714 (FIGS. 7-8), and/or CD-ROM or DVD drive 716 (FIGS. 7-8). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 810.

In the depicted embodiment of FIG. 8, various I/O devices such as a disk controller 804, a graphics adapter 824, a video controller 802, a keyboard adapter 826, a mouse adapter 806, a network adapter 820, and other I/O devices 822 can be coupled to system bus 814. Keyboard adapter 826 and mouse adapter 806 are coupled to a keyboard 704 (FIGS. 7 and 8) and a mouse 710 (FIGS. 7 and 8), respectively, of computer 700 (FIG. 7). While graphics adapter 824 and video controller 802 are indicated as distinct units in FIG. 8, video controller 802 can be integrated into graphics adapter 824, or vice versa in other embodiments. Video controller 802 is suitable for refreshing a monitor 706 (FIGS. 7 and 8) to display images on a screen 708 (FIG. 7) of computer 700 (FIG. 7). Disk controller 804 can control hard drive 714 (FIGS. 7 and 8), USB port 712 (FIGS. 7 and 8), and CD-ROM or DVD drive 716 (FIGS. 7 and 8). In other embodiments, distinct units can be used to control each of these devices separately.

In some embodiments, network adapter 820 can comprise and/or be implemented as a WNIC (wireless network interface controller) card (not shown) plugged or coupled to an expansion port (not shown) in computer system 700 (FIG. 7). In other embodiments, the WNIC card can be a wireless network card built into computer system 700 (FIG. 7). A wireless network adapter can be built into computer system 700 (FIG. 7) by having wireless communication capabilities integrated into the motherboard chipset (not shown), or implemented via one or more dedicated wireless communication chips (not shown), connected through a PCI (peripheral component interconnector) or a PCI express bus of computer system 700 (FIG. 7) or USB port 712 (FIG. 7). In other embodiments, network adapter 820 can comprise and/or be implemented as a wired network interface controller card (not shown).

Although many other components of computer 700 (FIG. 7) are not shown, such components and their interconnection are well known to those of ordinary skill in the art. Accordingly, further details concerning the construction and composition of computer 700 and the circuit boards inside chassis 702 (FIG. 7) need not be discussed herein.

When computer 700 in FIG. 7 is running, program instructions stored on a USB drive in USB port 712, on a CD-ROM or DVD in CD-ROM and/or DVD drive 716, on hard drive 714, or in memory 808 (FIG. 8) are executed by CPU 810 (FIG. 8). A portion of the program instructions, stored on these devices, can be suitable for carrying out all or at least part of the techniques described herein. In various embodiments, computer 700 can be reprogrammed with one or more modules, applications, and/or databases to convert a general purpose computer to a special purpose computer.

Although computer system 700 is illustrated as a desktop computer in FIG. 7, there can be examples where computer system 700 may take a different form factor while still having functional elements similar to those described for computer system 700. In some embodiments, computer system 700 may comprise a single computer, a single server, or a cluster or collection of computers or servers, or a cloud of computers or servers. Typically, a cluster or collection of servers can be used when the demand on computer system 700 exceeds the reasonable capability of a single server or computer. In certain embodiments, computer system 700 may comprise a portable computer, such as a laptop computer. In certain other embodiments, computer system 700 may comprise a mobile device, such as a smartphone. For example, mobile device 120 (FIG. 1) can be a mobile device, such as a smartphone. In certain additional embodiments, computer system 700 may comprise an embedded system.

Although secure real-time payment transactions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-28 may be modified, and that the foregoing discussion of certain of these embodiments does not necessarily represent a complete description of all possible embodiments. For example, one or more of the procedures, processes, or activities of FIGS. 2-6, 9-14, and/or 23-28 may include different procedures, processes, and/or activities and be performed by many different modules, in many different orders, and/or one or more of the procedures, processes, or activities of FIGS. 2-6, 9-14, and/or 23-28 may include one or more of the procedures, processes, or activities of another different one of FIGS. 2-6, 9-14, and/or 23-28.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors;
   a merchant account database comprising a plurality of merchant identifiers being associated with a plurality of merchants, a plurality of account identifiers associated with the plurality of merchants, and a mapping associating the plurality of merchant identifiers with the plurality of account identifiers;
   a transaction database; and
   one or more non-transitory computer-readable media storing computing instructions that, when executed by the one or more processors, cause the one or more processors to perform operations comprising:

receiving, at the system and based on a consumer using a mobile device to initiate a payment for one or more items to be purchased from a merchant by the consumer for a payment amount, a message comprising a merchant identifier of the plurality of merchant identifiers, the merchant identifier being associated with the merchant of the plurality of merchants, the mobile device obtaining the merchant identifier using a data communication protocol, the system being in data communication with a first financial institution and a second financial institution, and the system being maintained by an entity that is different from the merchant, the first financial institution, and the second financial institution;

determining, at the system and using the merchant account database, first information comprising a second account identifier for a second account of the merchant at the second financial institution, the second account identifier being associated with the merchant identifier in the merchant account database, and the plurality of account identifiers comprising the second account identifier;

sending the first information from the system to the first financial institution;

receiving in real-time over a network, at the system and from the first financial institution, payment information regarding the payment to the second account from a first account of the consumer at the first financial institution to pay the merchant the payment amount for the one or more items, the payment information comprising information about the second account identifier of the second account and the payment amount;

logging the payment information in the transaction database; and sending in real-time over the network, from the system to the merchant, a notification of the payment from the consumer to the merchant, wherein:
an account number of the first account of the consumer remains undisclosed to the merchant; and
the system uses a public-key cryptography signing algorithm associated with one or more messages to provide secure communications with the system.

2. The system of claim 1, wherein:
the first information further comprises a name of the merchant.

3. The system of claim 1, wherein:
the one or more items to be purchased comprise at least one of one or more products or one or more services.

4. The system of claim 1, wherein:
the payment information further comprises a transaction identifier.

5. The system of claim 1, wherein:
the payment information further comprises a set of personally identifiable information of the consumer.

6. The system of claim 5, wherein:
the set of personally identifiable information is at least partially based on privacy instructions sent by the consumer to the first financial institution.

7. The system of claim 1, wherein:
the mobile device of the consumer is configured to receive consumer account authentication information to facilitate processing the payment.

8. A method implemented by one or more processors, the method comprising:
receiving, at a system and based on a consumer using a mobile device to initiate a payment for one or more items to be purchased from a merchant by the consumer for a payment amount, a message comprising a merchant identifier of a plurality of merchant identifiers associated with a plurality of merchants in a merchant account database, the merchant identifier being associated with the merchant of the plurality of merchants, the merchant account database further comprising a plurality of account identifiers associate with the plurality of merchants and a mapping associating the plurality of merchants identifiers with the plurality of account identifiers, the mobile device obtaining the merchant identifier using a data communication protocol, the system being in data communication with a first financial institution and a second financial institution, and the system being maintained by an entity that is different from the merchant, the first financial institution, and the second financial institution;

determining, at the system and using the merchant account database, first information comprising a second account identifier for a second account of the merchant at the second financial institution, the second account identifier being associated with the merchant identifier in the merchant account database, and the plurality of account identifiers comprising the second account identifier;

sending the first information from the system to the first financial institution;

receiving in real-time over a network, at the system and from the first financial institution, payment information regarding the payment to the second account from a first account of the consumer at the first financial institution to pay the merchant the payment amount for the one or more items, the payment information comprising information about the second account identifier of the second account and the payment amount;

logging the payment information in a transaction database; and sending in real-time over the network, from the system to the merchant, a notification of the payment from the consumer to the merchant, wherein:
an account number of the first account of the consumer remains undisclosed to the merchant; and
the system uses a public-key cryptography signing algorithm associated with one or more messages to provide secure communications with the system.

9. The method of claim 8, wherein:
the first information further comprises a name of the merchant.

10. The method of claim 8, wherein:
the one or more items to be purchased comprise at least one of one or more products or one or more services.

11. The method of claim 8, wherein:
the payment information further comprises a transaction identifier.

12. The method of claim 8, wherein:
the payment information further comprises a set of personally identifiable information of the consumer.

13. The method of claim 12, wherein:
the set of personally identifiable information is at least partially based on privacy instructions sent by the consumer to the first financial institution.

14. The method of claim 8, wherein:
the mobile device of the consumer is configured to receive consumer account authentication information to facilitate processing the payment.

15. One or more non-transitory computer-readable media comprising computer instructions that, when executed by one or more processors, perform operations comprising:
receiving, at a system and based on a consumer using a mobile device to initiate a payment for one or more items to be purchased from a merchant by the consumer for a payment amount, a message comprising a merchant identifier of a plurality of merchant identifiers associated with a plurality of merchants in a merchant account database, the merchant identifier being associated with the merchant of the plurality of merchants, the merchant account database further comprising a plurality of account identifiers associate with the plurality of merchants and a mapping associating the plurality of merchants identifiers with the plurality of account identifiers, the mobile device obtaining the merchant identifier using a data communication protocol, the system being in data communication with a first financial institution and a second financial institution, and the system being maintained by an entity that is different from the merchant, the first financial institution, and the second financial institution;
determining, at the system and using the merchant account database, first information comprising a second account identifier for a second account of the merchant at the second financial institution, the second account identifier being associated with the merchant identifier in the merchant account database, and the plurality of account identifiers comprising the second account identifier;
sending the first information from the system to the first financial institution;
receiving in real-time over a network, at the system and from the first financial institution, payment information regarding the payment to the second account from a first account of the consumer at the first financial institution to pay the merchant the payment amount for the one or more items, the payment information comprising information about the second account identifier of the second account and the payment amount;
logging the payment information in a transaction database; and
sending in real-time over the network, from the system to the merchant, a notification of the payment from the consumer to the merchant,
wherein:
an account number of the first account of the consumer remains undisclosed to the merchant; and
the system uses a public-key cryptography signing algorithm associated with one or more messages to provide secure communications with the system.

16. The one or more non-transitory computer-readable media of claim 15, wherein:
the first information further comprises a name of the merchant.

17. The one or more non-transitory computer-readable media of claim 15, wherein:
the one or more items to be purchased comprise at least one of one or more products or one or more services.

18. The one or more non-transitory computer-readable media of claim 15, wherein:
the payment information further comprises a transaction identifier.

19. The one or more non-transitory computer-readable media of claim 15, wherein:
the payment information further comprises a set of personally identifiable information of the consumer; and
the set of personally identifiable information is at least partially based on privacy instructions sent by the consumer to the first financial institution.

20. The one or more non-transitory computer-readable media of claim 15, wherein:
the mobile device of the consumer is configured to receive consumer account authentication information to facilitate processing the payment.

* * * * *